(12) United States Patent
Awazu et al.

(10) Patent No.: US 11,150,337 B2
(45) Date of Patent: Oct. 19, 2021

(54) OBJECT DETECTION DEVICE, OBJECT DETECTION METHOD, AND SENSOR DEVICE

(71) Applicant: Mitsubishi Electric Corporation, Tokyo (JP)

(72) Inventors: Hideyuki Awazu, Tokyo (JP); Yasunori Kato, Tokyo (JP); Ryuhei Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 296 days.

(21) Appl. No.: 16/322,343

(22) PCT Filed: Aug. 16, 2016

(86) PCT No.: PCT/JP2016/073913
§ 371 (c)(1),
(2) Date: Jan. 31, 2019

(87) PCT Pub. No.: WO2018/033961
PCT Pub. Date: Feb. 22, 2018

(65) Prior Publication Data
US 2020/0182993 A1 Jun. 11, 2020

(51) Int. Cl.
*G01S 13/34* (2006.01)
*G01S 13/58* (2006.01)
(Continued)

(52) U.S. Cl.
CPC ............ *G01S 13/584* (2013.01); *G01S 7/414* (2013.01); *G01S 13/0218* (2013.01); *G01S 13/34* (2013.01); *G01S 13/89* (2013.01)

(58) Field of Classification Search
CPC .... G01S 13/0218; G01S 13/34; G01S 13/345; G01S 13/42; G01S 13/582; G01S 13/584;
(Continued)

(56) References Cited

U.S. PATENT DOCUMENTS

| | | | | |
|---|---|---|---|---|
| 3,967,283 A | * | 6/1976 | Clark | G01S 13/343 342/28 |
| 2008/0100498 A1 | * | 5/2008 | Fullerton | G01S 13/04 342/21 |

(Continued)

FOREIGN PATENT DOCUMENTS

| JP | 2000-206235 A | 7/2000 |
|---|---|---|
| JP | 2014-145897 A | 8/2014 |

OTHER PUBLICATIONS

International Search Report (PCT/ISA/210) issued in PCT/JP2016/073913, dated Nov. 15, 2016.
(Continued)

*Primary Examiner* — Timothy A Brainard
(74) *Attorney, Agent, or Firm* — Birch, Stewart, Kolasch & Birch, LLP

(57) ABSTRACT

A search area width setting unit for setting a search area width having a frequency corresponding to a signal component of an object by using detection information of the object is included, and a signal component selecting unit determines a search area having the search area width set by the search area width setting unit and selects a signal component a frequency of which is included in the search area from each of a signal received by a signal receiving unit and signals received by object detection devices. As a result, an increase in the false detection probability of the object can be suppressed even in a case where the reception signals have low signal power-to-noise power ratios.

7 Claims, 21 Drawing Sheets

(51) Int. Cl.
  *G01S 7/41* (2006.01)
  *G01S 13/02* (2006.01)
  *G01S 13/89* (2006.01)

(58) Field of Classification Search
  CPC ...... G01S 13/589; G01S 13/878; G01S 13/88;
  G01S 13/89; G01S 2007/356; G01S
  7/2922; G01S 7/354; G01S 7/414
  See application file for complete search history.

(56) References Cited

U.S. PATENT DOCUMENTS

| | | | |
|---|---|---|---|
| 2011/0001658 A1* | 1/2011 | Noble | G01S 13/524 |
| | | | 342/107 |
| 2016/0084943 A1* | 3/2016 | Arage | G01S 13/42 |
| | | | 342/102 |

OTHER PUBLICATIONS

Japanese Office Action dated May 9, 2017 in Japanese Application No. 2017-504436.
Kato et al., "A study on diversity receiver of radar to detect by beat frequency," Proceedings of the 2016 IEICE General Conference, The Institute of Electronics, Information and Communication Engineers, B-1-198, Mar. 2016.
Liang et al., "Design and Analysis of Distributed Radar Sensor Networks," IEEE Transactions on Parallel and Distributed Systems, vol. 22, No. 11, pp. 1926-1933, Nov. 2011.

* cited by examiner

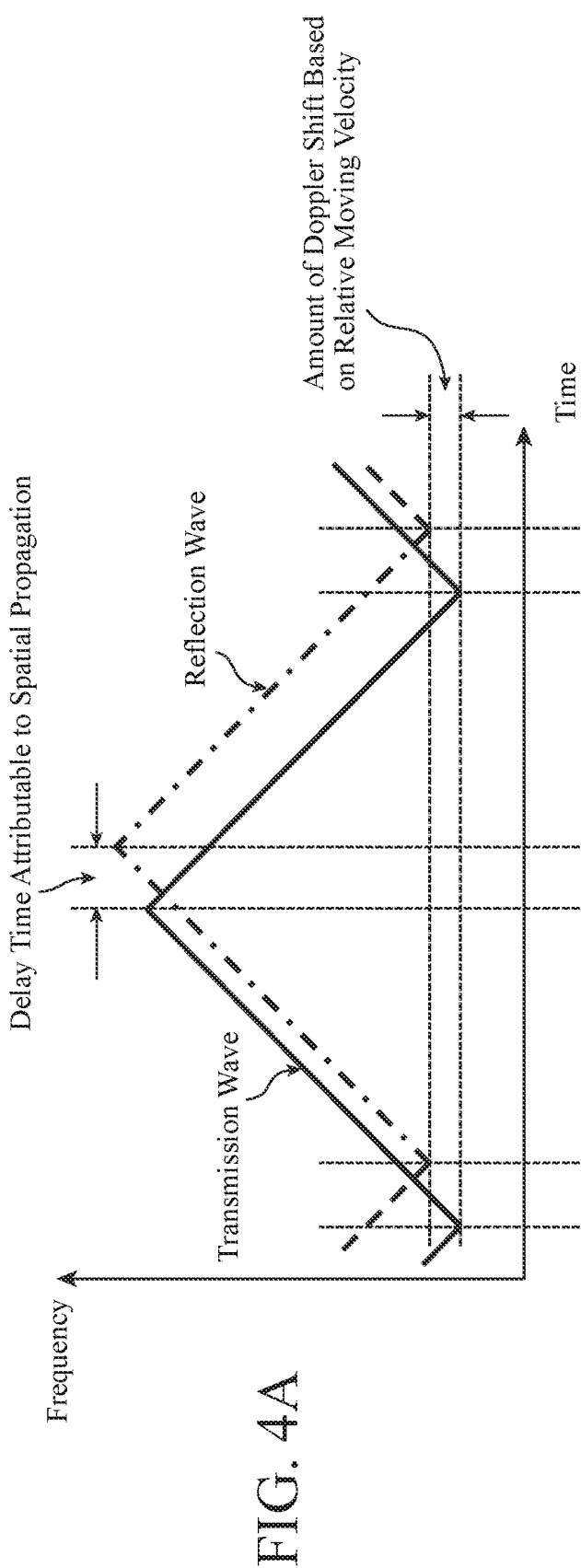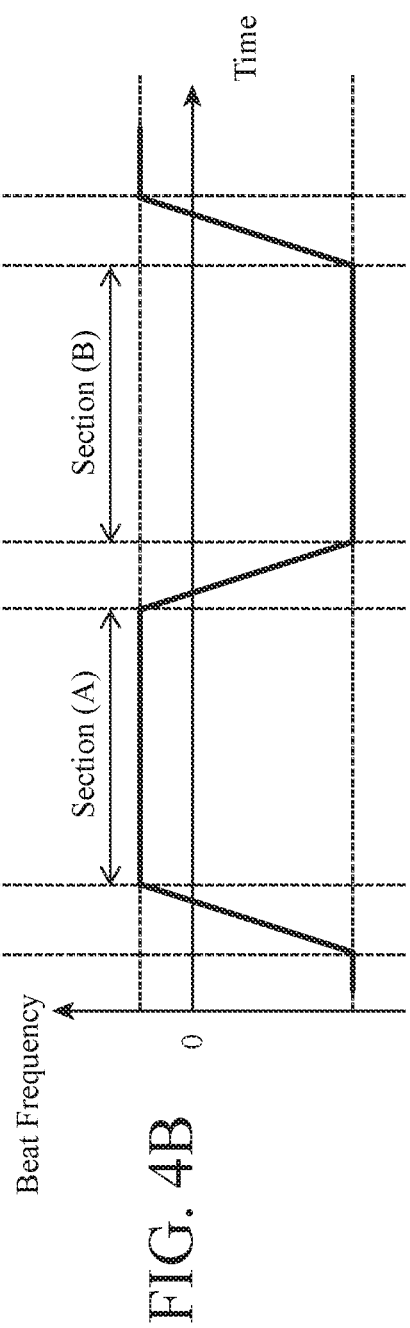
FIG. 4A
FIG. 4B

OBJECT DETECTION DEVICE, OBJECT DETECTION METHOD, AND SENSOR DEVICE

TECHNICAL FIELD

The present invention relates to an object detection device, an object detection method for detecting an object present in space, and a sensor device mounted with the object detection device.

BACKGROUND ART

The following method is known as a method for increasing the detection probability of an object detection device for detecting an object present in space.

First, a plurality of object detection devices receive signals reflected by an object present in the space.

Out of the plurality of object detection devices, one or more object detection devices synthesize reception signals received by the plurality of object detection devices.

Then the one or more object detection devices detect an object from a synthesized signal of the reception signals of the plurality of object detection devices, which enhances the detection probability of an object than in the case of detecting an object from a reception signal of a single object detection device.

A Doppler frequency is generated corresponding to a relative velocity between an object detection device and an object to be detected. This Doppler frequency is included in reception signals of the plurality of object detection devices.

Therefore, if frequency components of the reception signals in the plurality of object detection devices are corrected corresponding to the Doppler frequency before the one or more object detection devices synthesize the reception signals in the plurality of object detection devices, the detection probability of an object can be further enhanced.

As a result, if the Doppler frequency is known, the detection probability of an object can be enhanced.

The following non-patent literature 1 discloses a technique that enhances the detection probability of an object even in a case where a Doppler frequency is unknown.

That is, the following non-patent literature 1 discloses a technique that allows an object detection device to set a range of Doppler frequencies from a detectable distance range of an object and a detectable relative velocity range of an object.

CITATION LIST

Non-Patent Literature

Non-Patent Literature 1: "A study on diversity receiver of radar to detect by beat frequency," Proceedings of the 2016 IEICE General Conference, The Institute of Electronics, Information and Communication Engineers, B-1-198, March 2016.

SUMMARY OF INVENTION

Technical Problem

Since conventional object detection devices are configured as described above, the detection probability of an object can be enhanced even when a Doppler frequency is unknown; however, in a case where the signal power-to-noise power ratios of reception signals in a plurality of object detection devices are low, there is a problem that the false detection probability of an object disadvantageously rises.

The false detection probability of an object refers to the probability of erroneously detecting an object which is not a detection target.

The present invention has been devised in order to solve the problem as described above, and an object is to provide an object detection device and an object detection method capable of suppressing a rise in the false detection probability of an object even in a case where a reception signal has a low signal power-to-noise power ratio.

Another object of the present invention is to provide a sensor device mounted with an object detection device capable of suppressing a rise in the false detection probability of an object even in a case where a signal power-to-noise power ratio of a reception signal is low.

Solution to Problem

An object detection device according to the present invention includes: a signal receiving unit for receiving a signal reflected by an object to be detected; a first search area width setting unit for calculating a minimum value and a maximum value of a frequency or a range that is a signal component of the object by using detection information of a position of the object, a velocity of the object, and an angle indicating a moving direction of the object and an error included in the detection information and setting a difference between the minimum value and the maximum value as a search area width of the frequency or the range corresponding to the signal component of the object; a signal component selecting unit for determining a search area having the search area width set by the first search area width setting unit and selecting a signal component a frequency or a range of which is included in the search area from each of the signal received by the signal receiving unit and a signal received by another object detection device; a synthesizing unit for performing processing for combining one or more signal components selected by the signal component selecting unit or performing processing for combining the signal received by the signal receiving unit and the signal received by the other object detection device by using one or more signal components selected by the signal component selecting unit; and an object detecting unit for detecting the object from the signal component combined by the synthesizing unit or the signal combined by the synthesizing unit.

Advantageous Effects of Invention

According to the present invention, the first search area width setting unit for calculating a minimum value and a maximum value of a frequency or a range that is a signal component of the object by using detection information of a position of the object, a velocity of the object, and an angle indicating a moving direction of the object and an error included in the detection information and setting a difference between the minimum value and the maximum value as a search area width of the frequency or the range corresponding to the signal component of the object is included, and the signal component selecting unit determines a search area having the search area width set by the first search area width setting unit and selects a signal component a frequency or a range of which is included in the search area from each of the signal received by the signal receiving unit and a signal received by another object detection device. This results in an effect of suppressing an increase in the probability of false detection of the object even in a case where the reception signals have low signal power-to-noise power ratios.

BRIEF DESCRIPTION OF DRAWINGS

FIG. 4 is an explanatory diagram illustrating a transmission wave, a reflection wave, and a beat signal.

FIG. 7 is a hardware configuration diagram of a computer in the case where the signal processing circuit 20 is implemented by software, firmware, or the like.

FIG. 8 is a flowchart illustrating a part of an object detection method which is a processing procedure in the case where the signal processing circuit 20 is implemented by software, firmware, or the like.

FIG. 19 is a flowchart illustrating a part of an object detection method which is a processing procedure in the case where the signal processing circuit 82 is implemented by software, firmware, or the like.

FIG. 20 is an explanatory diagram illustrating a search area of a range for the object detection device 1a.

DESCRIPTION OF EMBODIMENTS

To describe the invention further in detail, embodiments for carrying out the invention will be described below along with the accompanying drawings.

First Embodiment

Figure 1:
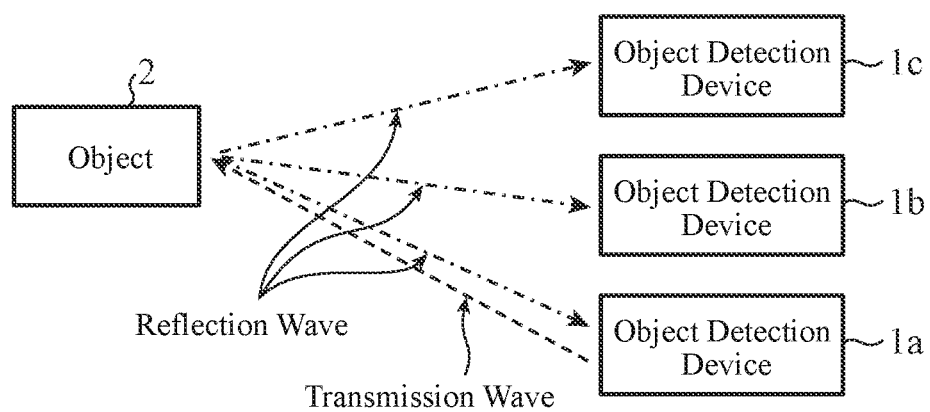
FIG. 1 is an explanatory diagram illustrating a relationship between a plurality of object detection devices according to a first embodiment of the present invention and an object to be detected.

FIG. 1 is an explanatory diagram illustrating a relationship between a plurality of object detection devices according to a first embodiment of the present invention and an object to be detected.

Although in FIG. 1 an example using three object detection devices 1a, 1b, and 1c is illustrated, it is sufficient that two or more object detection devices are used without limiting to three.

The example of FIG. 1 illustrates that, after the object detection device 1a emits a transmission wave such as a radio frequency (RF) signal into a space, the transmission wave reflected by an object 2 to be detected arrives at the object detection device 1a, the object detection device 1b, and the object detection device 1c as a reflection wave.

In this first embodiment, when not distinguished from one another, the object detection devices 1a, 1b, and 1c may be referred to as the object detection device(s) 1.

Figure 2:
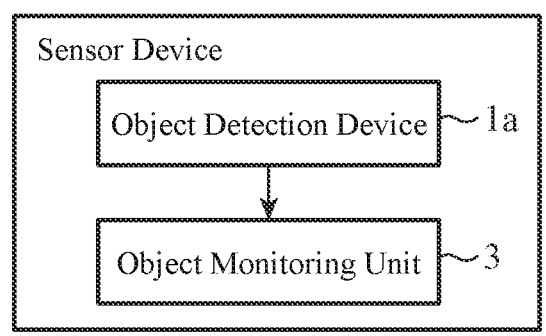
FIG. 2 is a configuration diagram illustrating a sensor device mounted with an object detection device 1a according to the first embodiment of the present invention.

FIG. 2 is a configuration diagram illustrating a sensor device mounted with the object detection device 1a according to the first embodiment of the present invention.

Although FIG. 2 is a configuration diagram illustrating the sensor device mounted with the object detection device 1a, a configuration diagram illustrating a sensor device mounted with the object detection device 1b as well as a configuration diagram illustrating a sensor device mounted with the object detection device 1c are also similar to FIG. 2.

In FIG. 2, an object monitoring unit 3 is a processing unit for performing processing for monitoring the object 2 detected by the object detection device 1a.

The monitoring processing of the object 2 by the object monitoring unit 3 includes monitoring the change in the position or velocity of the object 2 while recording the distance to the object 2 detected by the object detection device 1a and the relative velocity between the object detection device 1a and the object 2 as well as prediction processing for predicting the future position and velocity of the object 2. Since the processing for monitoring the change in the position or velocity of the object 2 and the prediction processing for predicting the position and velocity of the object 2 are well-known techniques, detailed description is omitted here.

Note that the object monitoring unit 3 included in the sensor device of FIG. 2 corresponds to an object monitoring device such as a target tracking device or a radar device, for example.

In the first embodiment, an example in which the object detection devices 1a, 1b, and 1c detect the object 2 by a distance measurement method called a frequency modulation continuous wave (FMCW) method will be described.

Figure 3:
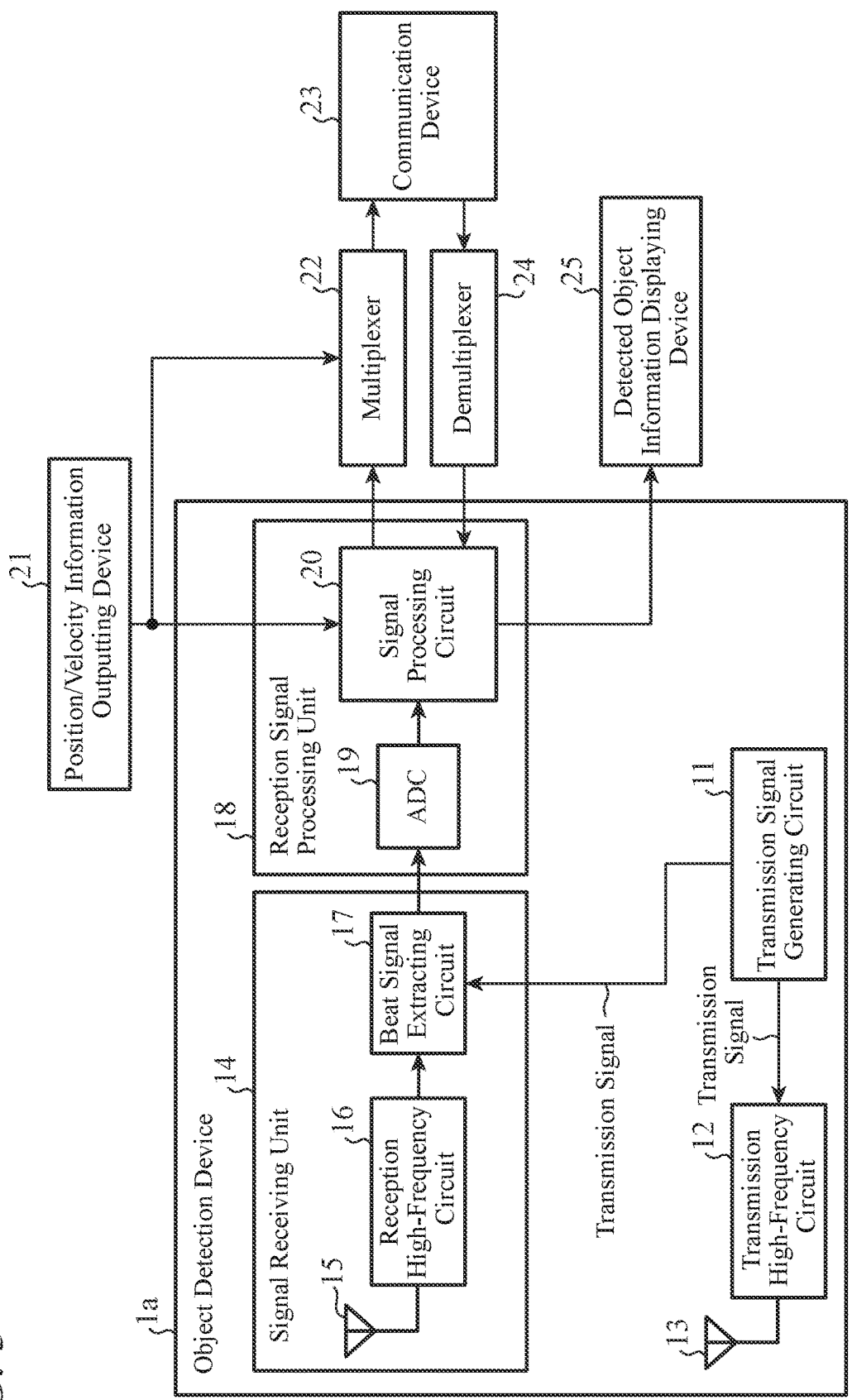
FIG. 3 is a configuration diagram illustrating the object detection device 1a according to the first embodiment of the invention.

FIG. 3 is a configuration diagram illustrating the object detection device 1a according to the first embodiment of the invention.

Although the configuration of the object detection device 1a will be described below, it is assumed that configuration diagrams of the object detection devices 1b and 1c, which are the other object detection devices, are those illustrated in FIG. 2 like the object detection device 1a.

In FIG. 3, a transmission signal generating circuit 11 of the object detection device 1a is implemented by, for example, a synthesizer, an oscillator, a processor, a digital to analog converter (DAC), and the like.

The transmission signal generating circuit 11 generates a transmission signal having been subjected to frequency modulation in which the frequency varies with time and outputs the transmission signal to a transmission high-frequency circuit 12 and a beat signal extracting circuit 17.

As the processor, for example, a field-programmable gate array (FPGA), a digital signal processor (DSP), a central processing unit (CPU), or the like may be employed.

Note that in a case where the transmission signal generating circuit 11 is mounted with a DAC, a filter for removing higher harmonics may be applied to an output side of the DAC in some cases.

The transmission high-frequency circuit 12 of the object detection device 1a performs frequency conversion processing for converting the frequency of the transmission signal output from the transmission signal generating circuit 11 into a carrier frequency.

In addition, the transmission high-frequency circuit 12 also performs filtering processing for removing an out-of-band frequency or spurious of the transmission signal, power amplification processing for amplifying the power of the transmission signal, and other processing and outputs the transmission signal having been subjected to the above processing to a transmission antenna 13 as a transmission wave.

The transmission antenna 13 of the object detection device 1a radiates the transmission wave output from the transmission high-frequency circuit 12 to the space.

In FIG. 1, although the example in which only the object detection device 1a out of the three object detection devices 1a, 1b, and 1c radiates the transmission wave to the space while the object detection devices 1b and 1c do not radiate a transmission wave to the space is illustrated, it is assumed that the object detection devices 1b and 1c are also mounted with a transmission signal generating circuit 11, a transmission high-frequency circuit 12, and a transmission antenna 13 like the object detection device 1a.

However, in a case where the object detection device 1 that radiates a transmission wave to the space is always limited to the object detection device 1a and the object detection devices 1b and 1c do not radiate a transmission wave to the space, the object detection devices 1b and 1c may not be mounted with a transmission signal generating circuit 11, a transmission high-frequency circuit 12, nor a transmission antenna 13. However, even in this case, the object detection devices 1b and 1c need to extract a beat signal from a reception signal and thus need to acquire the transmission signal generated by the object detection device 1a by communication or other means.

A signal receiving unit 14 of the object detection device 1a includes a reception antenna 15, a reception high-frequency circuit 16, and a beat signal extracting circuit 17.

After the transmission wave is radiated from the transmission antenna 13 of the object detection device 1a to the space, the signal receiving unit 14 receives a reflection wave of the transmission wave reflected by and returning from the object 2 to be detected and extracts a beat signal from the reception signal of the reflection wave.

After the transmission wave is radiated from the transmission antenna 13 of the object detection device 1a to the space, the reception antenna 15 receives a reflection wave of the transmission wave reflected by the object 2 to be detected and returning.

The reception high-frequency circuit 16 performs frequency conversion processing for converting the frequency of the reception signal of the reflection wave received by the reception antenna 15 into, for example, an intermediate frequency (IF).

The reception high-frequency circuit 16 further performs filter processing for removing an undesired frequency included in the reception signal or an image at the time of frequency conversion, power amplification processing for amplifying the power of the reception signal by an amplifier such as a low noise amplifier (LNA), and other processing and outputs the reception signal after these processings to the beat signal extracting circuit 17.

The beat signal extracting circuit 17 is implemented by, for example, a mixer or the like, and calculates a beat signal by multiplying the reception signal output from the reception high-frequency circuit 16 and the transmission signal output from the transmission signal generating circuit 11.

This beat signal indicates a difference between the frequency modulation component of the transmission signal and the frequency of the reception signal.

Here, FIG. 4 is an explanatory diagram illustrating a transmission wave, a reflection wave, and a beat signal in the object detection device 1a.

In FIG. 4A the transmission wave and the reflection wave frequencies of which change with time are illustrated, and in FIG. 4B the beat signal a beat frequency of which changes with time is illustrated.

The reflection wave received by the reception antenna 15 of the object detection device 1a is delayed by time corresponding to spatial propagation of the transmission wave between the object detection device 1a and the object 2 to be detected. Moreover, the reflection wave received by the reception antenna 15 of the object detection device 1a is subjected to a Doppler shift attributable to the relative moving velocity between the object detection device 1a and the object 2 to be detected.

For this reason, the reflection wave received by the reception antenna 15 of the object detection device 1a is received at a frequency different from the frequency of the transmission wave.

Incidentally, the reflection wave received by the reception antenna 15 of the object detection device 1a is subjected to a frequency shift that is double a Doppler shift attributable to the relative moving velocity in a direction along a linear line connecting the object detection device 1a and the object 2 to be detected.

The reflection wave received by the reception antenna 15 of the object detection device 1b is subjected to a frequency shift that is the sum of the Doppler shift attributable to the relative moving velocity in a direction along a linear line connecting the object detection device 1a and the object 2 to be detected and a Doppler shift attributable to the relative moving velocity in a direction along a linear line connecting the object detection device 1b and the object 2 to be detected.

The reflection wave received by the reception antenna 15 of the object detection device 1c is subjected to a frequency shift that is the sum of the Doppler shift attributable to the relative moving velocity in a direction along a linear line connecting the object detection device 1a and the object 2 to be detected and a Doppler shift attributable to the relative moving velocity in a direction along a linear line connecting the object detection device 1c and the object 2 to be detected.

The reception signal processing unit 18 of the object detection device 1a includes an analog to digital converter (ADC) 19 and a signal processing circuit 20.

The reception signal processing unit 18 performs processing for detecting the object 2 to be detected from the beat signal extracted by the signal receiving unit 14 and beat signals extracted by the object detection devices 1b and 1c which are the other object detection devices.

The ADC 19 converts the beat signal extracted by the signal receiving unit 14 into a digital signal and outputs the digital beat signal to the signal processing circuit 20.

The signal processing circuit 20 performs processing for detecting the object 2 to be detected from the digital beat signal output from the ADC 19 and digital beat signals transmitted from the object detection devices 1b and 1c.

A position/velocity information outputting device 21 connected to the object detection device 1a is implemented by, for example, a global positioning system (GPS) receiver, a velocity meter, or the like and detects the position and velocity of the object detection device 1a to output position/velocity information representing the position and velocity of the object detection device 1a to the reception signal processing unit 18 and a multiplexer 22.

It is desirable that the position of the object detection device 1a be highly accurate, but it is sufficient if the position accuracy is as high as that of a GPS signal received by a GPS receiver.

Figure 5:
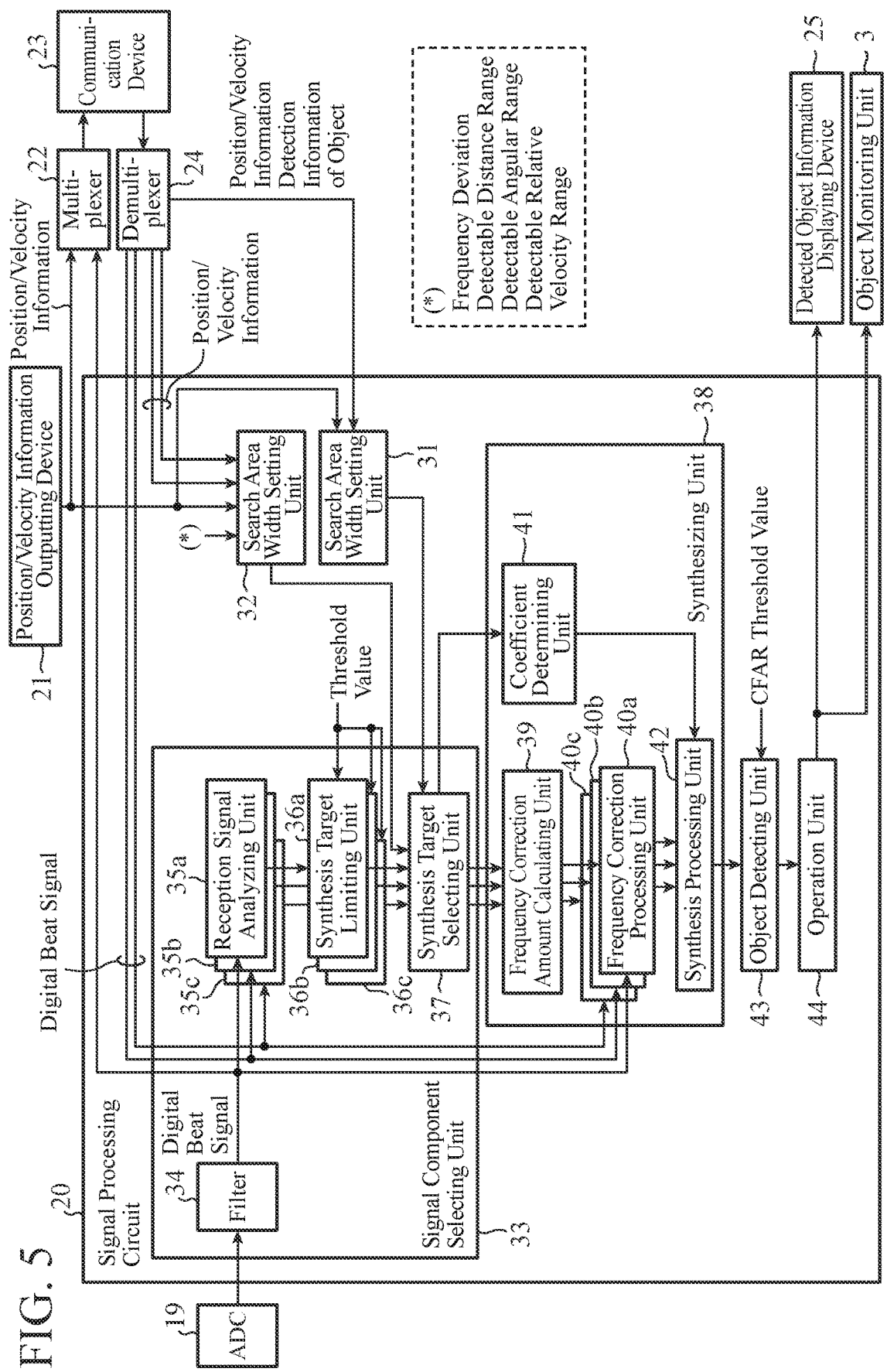
FIG. 5 is a configuration diagram illustrating a signal processing circuit 20 of the object detection device 1a according to the first embodiment of the invention.

The multiplexer 22 connected to the object detection device 1a multiplexes the digital beat signal having passed through a filter 34 of the signal processing circuit 20 illustrated in FIG. 5 and the position/velocity information output from the position/velocity information outputting device 21 and outputs the multiplexed signal including the digital beat signal and the position/velocity information to a communication device 23.

The communication device 23 transmits the multiplexed signal output from the multiplexer 22 to the object detection devices 1b and 1c, receives multiplexed signals transmitted from the object detection devices 1b and 1c, and outputs the received multiplexed signals to a demultiplexer 24.

In addition to the multiplexed signals transmitted from the object detection devices 1b and 1c, the communication device 23 receives detection information of the object 2 detected by a radar device or devices other than the object detection devices 1a, 1b, or 1c, and outputs the detection information to the demultiplexer 24.

As the detection information of the object 2, information such as the position, velocity, and angle indicating a moving direction of the object 2 may be used.

The position, velocity, and angle of the object 2 indicated by the detection information of the object 2 are detection values each having a width attributable to an error, the monitoring accuracy, or the like.

Communication of the multiplexed signal, the position/velocity information, and the detection information of the object 2 by the communication device 23 may be wired or wireless.

The demultiplexer 24 connected to the object detection device 1a demultiplexes the multiplexed signals received by the communication device 23 and outputs digital beat signals and the position/velocity information to the signal processing circuit 20 of the object detection device 1a.

The demultiplexer 24 connected to the object detection device 1a also outputs the detection information of the object 2 received by the communication device 23 to the signal processing circuit 20 of the object detection device 1a.

The detected object information displaying device 25 connected to the object detection device 1a is implemented by, for example, a display, a graphics processing circuit, or the like, and displays information such as the distance from the object detection devices 1a, 1b, and 1c to the object 2 detected by the signal processing circuit 20 and the relative velocity between the object detection devices 1a, 1b, and 1c and the object 2.

Figure 6:
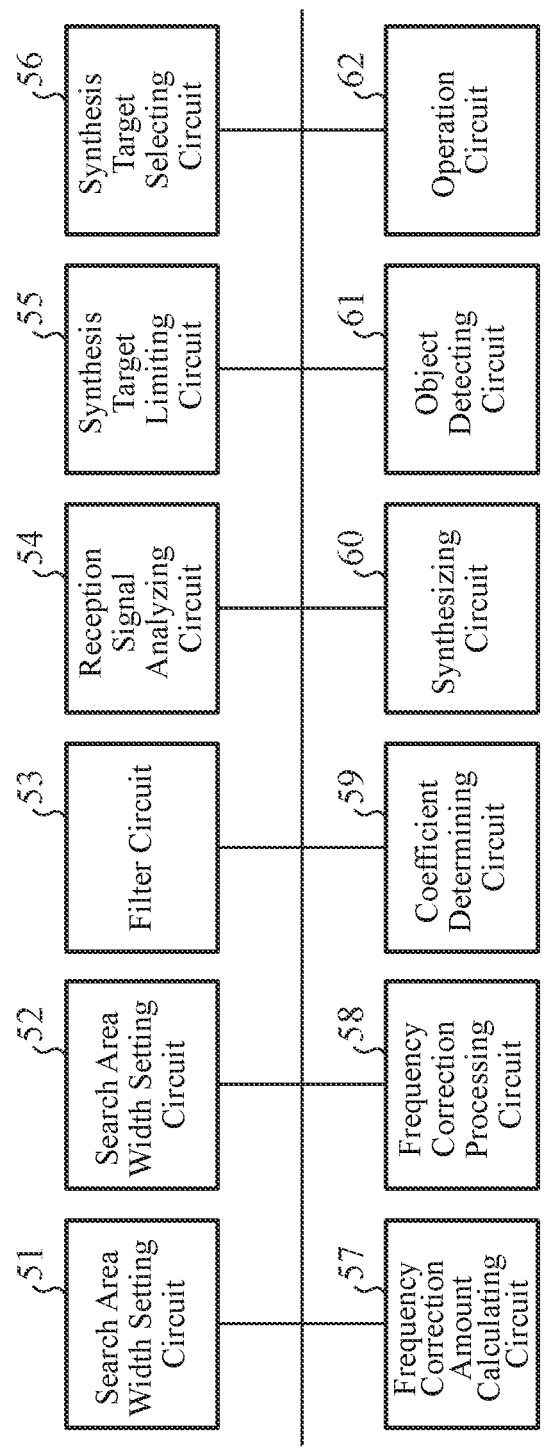
FIG. 6 is a hardware configuration diagram of the signal processing circuit 20 of the object detection device 1a according to the first embodiment of the invention.

FIG. 5 is a configuration diagram illustrating the signal processing circuit 20 of the object detection device 1a according to the first embodiment of the present invention, and FIG. 6 is a hardware configuration of the signal processing circuit 20 of the object detection device 1a according to the first embodiment of the present invention.

Although the configuration of the signal processing circuit 20 of the object detection device 1a will be described below, it is assumed that configuration diagrams and hardware configuration diagrams of the signal processing circuits 20 of the object detection devices 1b and 1c, which are the other object detection devices, are those illustrated in FIGS. 5 and 6 like the object detection device 1a.

In FIGS. 5 and 6, a search area width setting unit 31 is implemented by a search area width setting circuit 51, for example.

The search area width setting unit 31 is a first search area width setting unit for setting a search area width of a frequency corresponding to the spectral component (signal component) of the object 2 using the detection information of the object 2 output from the demultiplexer 24.

That is, the search area width setting unit 31 obtains the distances between the object detection device 1a and the object detection devices 1b and 1c from the position of the object detection device 1a indicated by the position/velocity information output from the position/velocity information outputting device 21 and the position of the object detection devices 1b and 1c indicated by the position/velocity information output from the demultiplexer 24.

Then, the search area width setting unit 31 sets the search area width of a frequency for the object detection devices 1a, 1b, and 1c using the distances between the object detection device 1a and the object detection devices 1b and 1c, the velocity of the object detection device 1a indicated by the position/velocity information output from the position/velocity information outputting device 21, velocities of the object detection devices 1b and 1c indicated by the position/velocity information output from the demultiplexer 24, and the position and velocity of the object 2 indicated by the detection information of the object 2 output from the demultiplexer 24.

A search area width setting unit 32 is implemented by a search area width setting circuit 52, for example, and is a second search area width setting unit for setting a search area width of a frequency corresponding to a spectral component of the object 2.

That is, the search area width setting unit 32 obtains the distances between the object detection device 1a and the object detection devices 1b and 1c from the position of the object detection device 1a indicated by the position/velocity information output from the position/velocity information outputting device 21 and the position of the object detection devices 1b and 1c indicated by the position/velocity information output from the demultiplexer 24.

Then, the search area width setting unit 32 sets the search area width of a frequency of the object detection devices 1a, 1b, and 1c using the distances between the object detection device 1a and the object detection devices 1b and 1c, the velocity of the object detection device 1a indicated by the position/velocity information output from the position/velocity information outputting device 21, the velocities of the object detection devices 1b and 1c indicated by the position/velocity information output from the demultiplexer 24, a detectable distance range of the object 2, a detectable angular range of the object 2, a detectable relative velocity range of the object 2, and internal frequency deviations in the object detection devices 1a, 1b, and 1c.

A signal component selecting unit 33 includes the filter 34, reception signal analyzing units 35a, 35b, and 35c, synthesis target limiting units 36a, 36b, and 36c, and a synthesis target selecting unit 37.

The signal component selecting unit 33 performs processing for determining a search area having the search area width set by the search area width setting unit 31 when the detection information of the object 2 is obtained or, determining a search area having the search area width set by the search area width setting unit 32 when the detection information of the object 2 cannot be obtained.

The signal component selecting unit 33 also performs processing for selecting a spectral component a frequency of which is included in the search area from each of the digital beat signal output from the ADC 19 and the digital beat signals output from the demultiplexer 24.

The filter 34 is implemented by, for example, a filter circuit 53 acting as a high-pass filter and removes clutter included in the digital beat signal output from the ADC 19.

The reception signal analyzing units 35a, 35b, and 35c are implemented by a reception signal analyzing circuit 54, for example.

The reception signal analyzing unit 35a performs processing for analyzing a spectrum of the digital beat signal from which the clutter has been removed by the filter 34.

The reception signal analyzing units 35b and 35c perform processing for analyzing spectra of the digital beat signals output from the demultiplexer 24, that is, the digital beat signals from which clutter has been removed by the filters 34 of the object detection devices 1b and 1c.

Although in the first embodiment the signal processing circuit 20 includes three reception signal analyzing units 35 since three object detection devices 1 are assumed, in a case where there are N (N is an integer larger than or equal to 2) object detection devices 1, a signal processing circuit 20 includes N reception signal analyzing units 35.

The synthesis target limiting units 36a, 36b, and 36c are implemented by, for example, a synthesis target limiting circuit 55.

The synthesis target limiting unit 36a performs processing for comparing spectral components of a plurality of frequencies included in the spectrum analyzed by the reception signal analyzing unit 35a with a preset threshold value and selecting, from a plurality of spectral components, a spectral component larger than the threshold value.

The synthesis target limiting unit 36b performs processing for comparing spectral components of a plurality of frequencies included in the spectrum analyzed by the reception signal analyzing unit 35b with a preset threshold value and selecting, from a plurality of spectral components, a spectral component larger than the threshold value.

The synthesis target limiting unit 36c performs processing for comparing spectral components of a plurality of frequencies included in the spectrum analyzed by the reception signal analyzing unit 35c with a preset threshold value and selecting, from a plurality of spectral components, a spectral component larger than the threshold value.

Although in the first embodiment the signal processing circuit 20 includes three synthesis target limiting units 36 since three object detection devices 1 are assumed, in a case where there are N (N is an integer larger than or equal to 2) object detection devices 1, a signal processing circuit 20 includes N synthesis target limiting units 36.

The synthesis target selecting unit 37 is implemented by, for example, a synthesis target selecting circuit 56.

When the detection information of the object 2 is obtained, the synthesis target selecting unit 37 performs processing for determining a search area having the search area width set by the search area width setting unit 31 as a search area of a frequency for the object detection devices 1a, 1b, and 1c.

When the detection information of the object 2 cannot be obtained, the synthesis target selecting unit 37 compares the spectral components selected by the synthesis target limiting units 36a, 36b, and 36c to specify a relatively large spectral component.

The synthesis target selecting unit 37 further determines a frequency of the specified spectral component as the center frequency of the search area.

The synthesis target selecting unit 37 determines a search area of a frequency for the object detection device 1a by setting, as the width of the search area for which the center frequency has been determined, the search area width for the object detection device 1a set by the search area width setting unit 32.

The synthesis target selecting unit 37 also determines a search area of a frequency for the object detection device 1b by setting, as the width of the search area for which the center frequency has been determined, the search area width for the object detection device 1b set by the search area width setting unit 32.

Furthermore, the synthesis target selecting unit 37 determines a search area of a frequency for the object detection device 1c by setting, as the width of the search area for which the center frequency has been determined, the search area width for the object detection device 1c set by the search area width setting unit 32.

The synthesis target selecting unit 37 performs processing for selecting a relatively large spectral component from among spectral components a frequency of which is included in the search area for the object detection device 1a out of the spectral components selected by the synthesis target limiting unit 36a.

The synthesis target selecting unit 37 also performs processing for selecting a relatively large spectral component from among spectral components a frequency of which is included in the search area for the object detection device 1b out of the spectral components selected by the synthesis target limiting unit 36b.

The synthesis target selecting unit 37 also performs processing for selecting a relatively large spectral component from among spectral components a frequency of which is included in the search area for the object detection device 1c out of the spectral components selected by the synthesis target limiting unit 36c.

A synthesizing unit 38 includes a frequency correction amount calculating unit 39, frequency correction processing units 40a, 40b, and 40c, a coefficient determining unit 41, and a synthesis processing unit 42.

The synthesizing unit 38 performs processing for combining the digital beat signal from which the clutter has been removed by the filter 34 depending on the frequencies of the spectral components each selected by the signal component selecting unit 33 and the digital beat signals output from the demultiplexer 24, that is, the digital beat signals from which clutter has been removed by the filters 34 of the other object detection devices 1b and 1c.

The frequency correction amount calculating unit 39 is implemented by a frequency correction amount calculating circuit 57, for example.

The frequency correction amount calculating unit 39 performs processing for setting, as a reference frequency, a frequency of one of the spectral components each selected by the synthesis target selecting unit 37 and separately calculating a frequency correction amount from a difference between the reference frequency and each of frequencies of the spectral components each selected by the synthesis target selecting unit 37.

The frequency correction processing units 40a, 40b, and 40c are implemented by a frequency correction processing circuit 58, for example.

The frequency correction processing unit 40a performs processing for correcting a frequency of the digital beat signal from which the clutter has been removed by the filter 34 on the basis of the frequency correction amount calculated by the frequency correction amount calculating unit 39.

The frequency correction processing unit 40b performs processing for correcting a frequency of the digital beat signal output from the demultiplexer 24, that is, the digital beat signal from which the clutter has been removed by the filter 34 of the object detection device 1b, on the basis of the frequency correction amount calculated by the frequency correction amount calculating unit 39.

The frequency correction processing unit 40c performs processing for correcting a frequency of the digital beat signal output from the demultiplexer 24, that is, the digital beat signal from which the clutter has been removed by the filter 34 of the object detection device 1c, on the basis of the frequency correction amount calculated by the frequency correction amount calculating unit 39.

Although in the first embodiment the signal processing circuit 20 includes three frequency correction processing units 40 since three object detection devices 1 are assumed, in a case where there are N object detection devices 1, a signal processing circuit 20 includes N frequency correction processing units 40.

The coefficient determining unit 41 is implemented by a coefficient determining circuit 59, for example.

The coefficient determining unit 41 performs processing for determining, from the spectral components each selected by the synthesis target selecting unit 37, weighting coefficients for combining the digital beat signal from which the clutter has been removed by the filter 34 and the digital beat signals output from the demultiplexer 24.

The synthesis processing unit 42 is implemented by, for example, a synthesizing circuit 60.

The synthesis processing unit 42 performs processing for combining the plurality of digital beat signals frequencies of which have been corrected separately by the frequency correction processing units 40a, 40b, and 40c using the weighting coefficients determined by the coefficient determining unit 41.

An object detecting unit 43 is implemented by, for example, an object detecting circuit 61, and detects the object 2 by executing constant false alarm rate (CFAR) processing on the beat signal combined by the synthesis processing unit 42.

CFAR is processing for allowing the probability of erroneously detecting the noise to be constant on the basis of a CFAR threshold value by estimating the magnitude of noise from a frequency obtained by adding the reflection wave and the noise and a frequency of the noise only.

An operation unit 44 is implemented by, for example, an operation circuit 62, and performs processing for calculating distances from each of the object detection devices 1a, 1b, and 1c to the object 2 detected by the object detecting unit 43, calculating relative velocities between each of the object detection devices 1a, 1b, and 1c and the object 2, and outputting the distances and the relative velocities to a detected object information displaying device 25 and an object monitoring unit 3.

In FIG. 5, it is assumed that the search area width setting units 31 and 32, the filter 34, the reception signal analyzing units 35a, 35b, and 35c, the synthesis target limiting units 36a, 36b, and 36c, the synthesis target selecting unit 37, the frequency correction amount calculating unit 39, the frequency correction processing units 40a, 40b, and 40c, the coefficient determining unit 41, the synthesis processing unit 42, the object detecting unit 43, and the operation unit 44, which are components of the signal processing circuit 20, are configured by the dedicated hardware as illustrated in FIG. 6, that is, the search area width setting circuits 51 and 52, the filter circuit 53, the reception signal analyzing circuit 54, the synthesis target limiting circuit 55, the synthesis target selecting circuit 56, the frequency correction amount calculating circuit 57, the frequency correction processing circuit 58, the coefficient determining circuit 59, the synthesizing circuit 60, the object detecting circuit 61, and the operation circuit 62, respectively.

Here, the search area width setting circuits 51 and 52, the filter circuit 53, the reception signal analyzing circuit 54, the synthesis target limiting circuit 55, the synthesis target selecting circuit 56, the frequency correction amount calculating circuit 57, the frequency correction processing circuit 58, the coefficient determining circuit 59, the synthesizing circuit 60, the object detecting circuit 61, and the operation circuit 62 may be a single circuit, a composite circuit, a programmed processor, a parallel-programmed processor, an application specific integrated circuit (ASIC), an FPGA, or a combination thereof.

The components of the signal processing circuit 20 are not limited to those implemented by dedicated hardware, and the signal processing circuit 20 may be implemented by software, firmware, or a combination of software and firmware.

The software or the firmware is stored in a memory of a computer as a program. A computer refers to hardware for executing the program and may be, for example, a CPU, a central processing device, a processing device, an arithmetic device, a microprocessor, a microcomputer, a processor, a DSP, or the like.

The memory of the computer may be a nonvolatile or volatile semiconductor memory such as a random access memory (RAM), a read only memory (ROM), a flash memory, an erasable programmable read only memory (EPROM), or an electrically erasable programmable read only memory (EEPROM); a magnetic disk, a flexible disk, an optical disc, a compact disc, a mini disc, a digital versatile disc (DVD), or the like.

Figure 7:
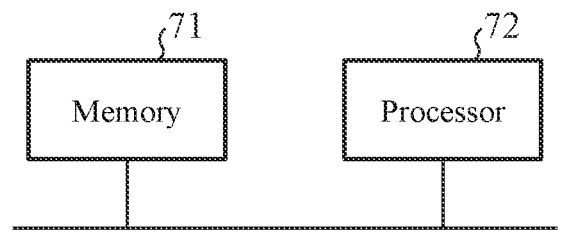

FIG. 7 is a hardware configuration diagram of a computer in the case where the signal processing circuit 20 is implemented by software, firmware, or the like.

In the case where the signal processing circuit 20 is implemented by software, firmware, or the like, it is only required that a program for causing the computer to execute processing procedures of the search area width setting units 31 and 32, the filter 34, the reception signal analyzing units 35a, 35b, and 35c, the synthesis target limiting units 36a, 36b, and 36c, the synthesis target selecting unit 37, the frequency correction amount calculating unit 39, the frequency correction processing units 40a, 40b, and 40c, the coefficient determining unit 41, the synthesis processing unit 42, the object detecting unit 43, and the operation unit 44 be stored in a memory 71 and that a processor 72 of the computer execute the program stored in the memory 71.

Figure 8:
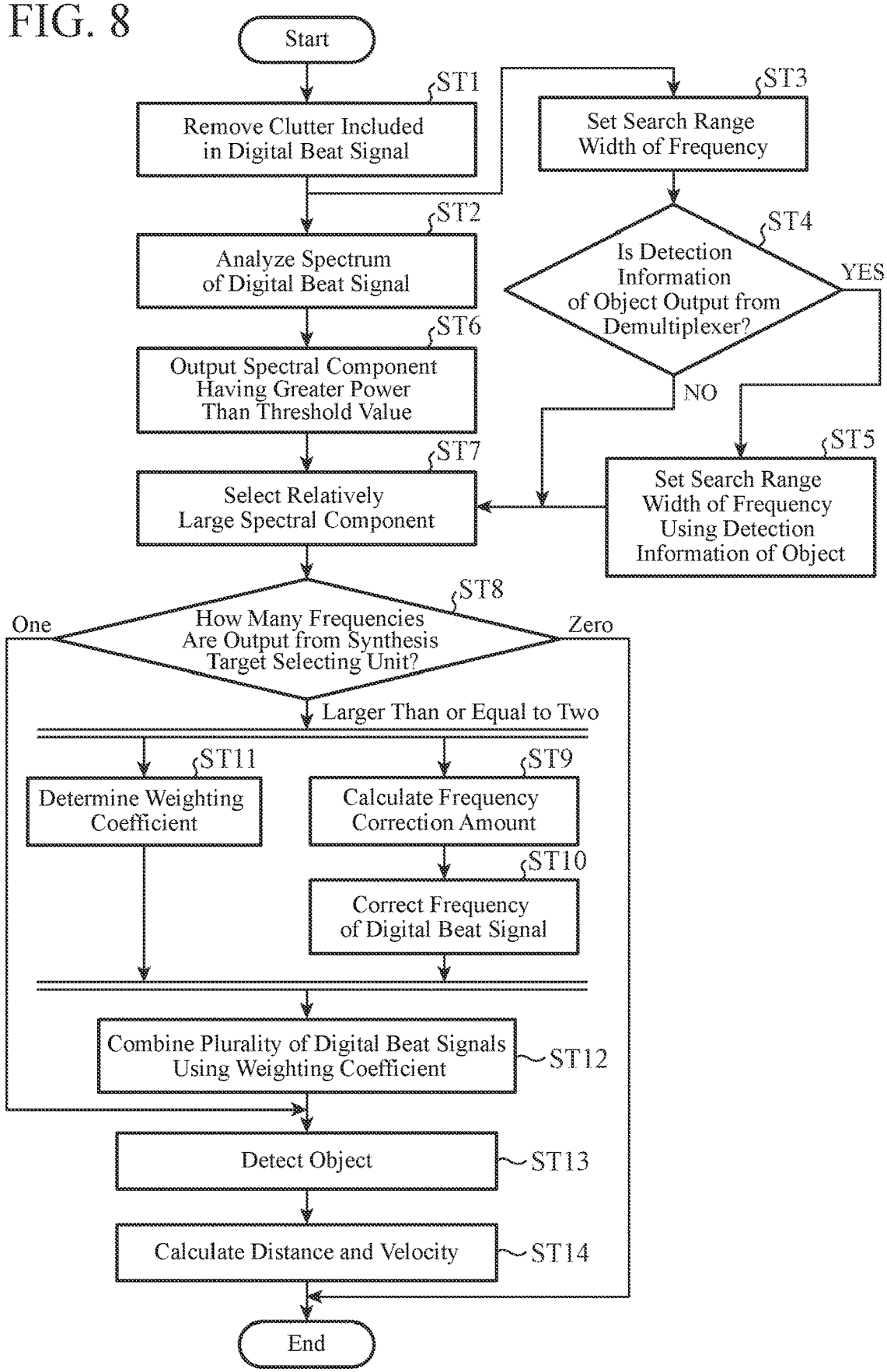

FIG. 8 is a flowchart illustrating a part of an object detection method which is a processing procedure in the case where the signal processing circuit 20 is implemented by software, firmware, or the like.

FIG. 6 illustrates the example in which each of the components of the signal processing circuit 20 is implemented by dedicated hardware, and FIG. 7 illustrates the example in which the signal processing circuit 20 is implemented by software, firmware, or the like. However, a part of the components of the signal processing circuit 20 may be implemented by dedicated hardware while the rest of the components may be implemented by software, firmware, or the like.

Next, the operation will be described.

The transmission signal generating circuit 11 of the object detection device 1a generates a transmission signal having been subjected to frequency modulation in which the frequency varies with time and outputs the transmission signal to the transmission high-frequency circuit 12 and the beat signal extracting circuit 17.

When receiving the transmission signal from the transmission signal generating circuit 11, the transmission high-frequency circuit 12 of the object detection device 1a performs frequency conversion processing for converting the frequency of the transmission signal into a carrier frequency, filtering processing for removing an out-of-band frequency or spurious of the transmission signal, power amplification processing for amplifying the power of the transmission signal, and other processing and outputs the transmission signal having been subjected to the above processing to the transmission antenna 13 as a transmission wave.

As a result, a transmission wave as illustrated in FIG. 4A is radiated to space from the transmission antenna 13 of the object detection device 1a.

After the transmission wave is radiated from the transmission antenna 13 to space, the reception antenna 15 of the object detection device 1a receives a reflection wave of the transmission wave reflected by and returning from the object 2 to be detected and outputs a reception signal of the reflection wave to the reception high-frequency circuit 16.

When receiving the reception signal from the reception antenna 15, the reception high-frequency circuit 16 of the object detection device 1a performs frequency conversion processing for converting the frequency of the reception signal into, for example, an IF frequency, filter processing for removing an undesired frequency included in the reception signal or an image at the time of frequency conversion, power amplification processing for amplifying the power of the reception signal, and other processing and outputs the reception signal after the processing to the beat signal extracting circuit 17.

When receiving the reception signal from the reception high-frequency circuit 16, the beat signal extracting circuit 17 of the object detection device 1a calculates a beat signal by multiplying the reception signal and the transmission signal output from the transmission signal generating circuit 11 and outputs the beat signal to the reception signal processing unit 18.

This beat signal represents a difference between a frequency modulation component of the transmission signal and a frequency of the reception signal, and an absolute value of the beat frequency of the beat signal increases as delay time becomes longer as illustrated in FIGS. 4A and 4B.

Here, differences in a frequency occurs among the beat frequencies of the reflection waves received by the object detection devices 1a, 1b, and 1c.

In other words, the Doppler shift, differences in delay time attributable to the spatial propagation, and internal frequency deviations in the object detection devices 1a, 1b, and 1c result in the differences in a frequency among the beat frequencies of the reflection waves received by the object detection devices 1a, 1b, and 1c.

FIG. 9 is an explanatory diagram for explaining a difference between a beat frequency of a reflection wave received by the object detection device 1a and each of beat frequencies of reflection waves received by the object detection devices 1b and 1c.

Figure 9A:
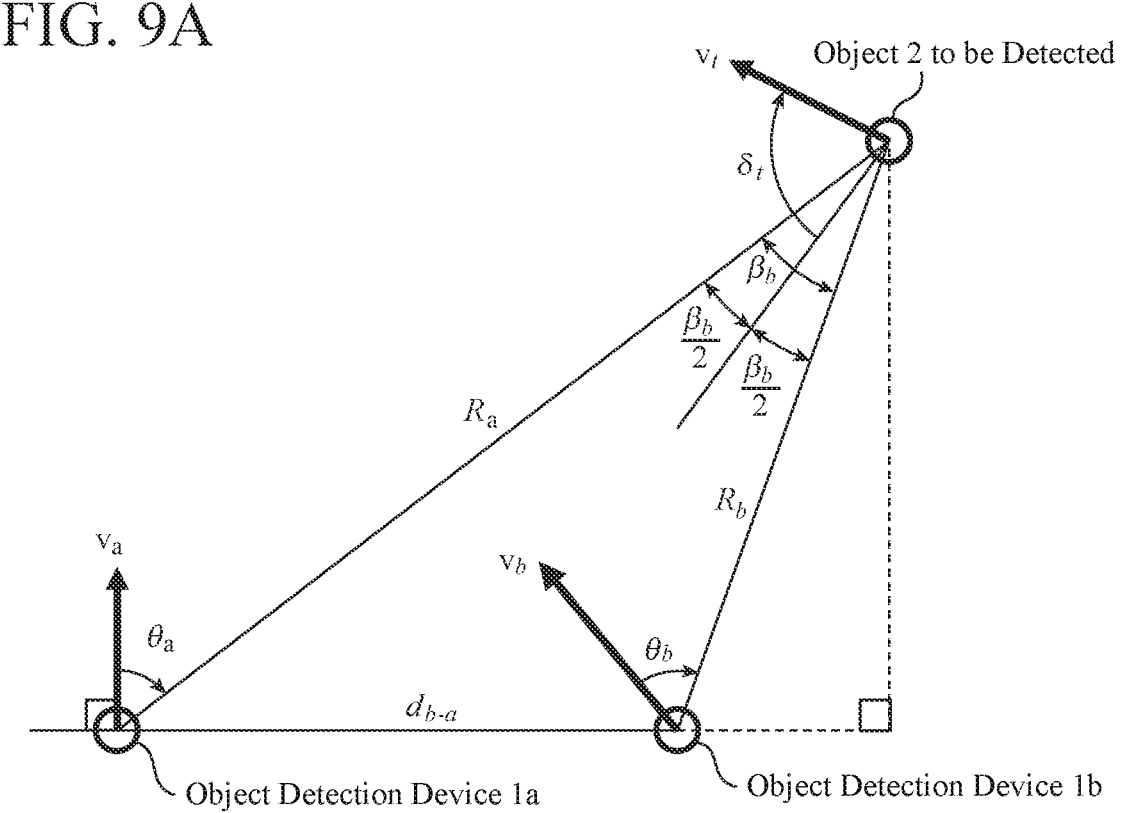
FIG. 9A is an explanatory diagram for explaining the difference between a beat frequency of a reflection wave received by the object detection device 1a and a beat frequency of a reflection wave received by the object detection device 1b.
Figure 9B:
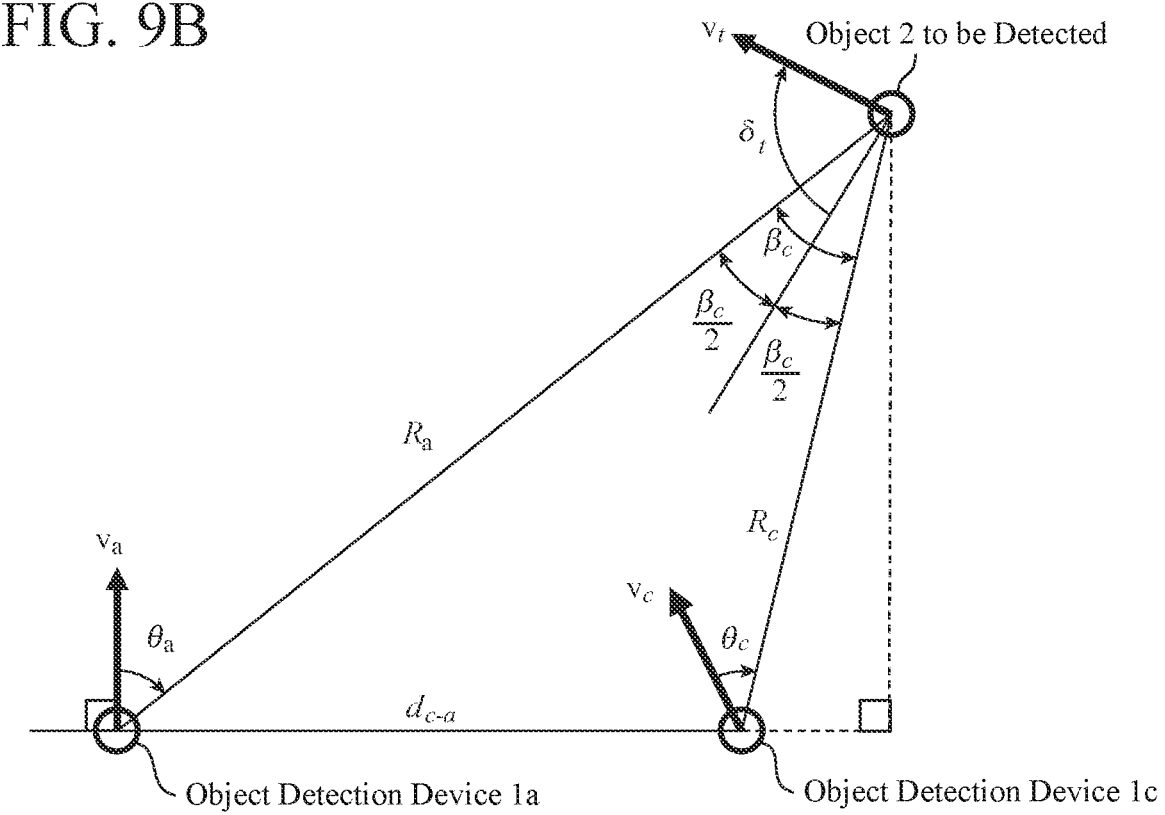
FIG. 9B is an explanatory diagram for explaining the difference between the beat frequency of the reflection wave received by the object detection device 1a and a beat frequency of a reflection wave received by the object detection device 1c.

FIG. 9A is an explanatory diagram for explaining the difference between a beat frequency of a reflection wave received by the object detection device 1a and a beat frequency of a reflection wave received by the object detection device 1b, and FIG. 9B is an explanatory diagram for explaining the difference between the beat frequency of the reflection wave received by the object detection device 1a and a beat frequency of a reflection wave received by the object detection device 1c.

The Doppler shift which is one of the factors affecting the beat frequency will be described.

Where a Doppler shift occurring in the reflection wave received by the object detection device 1a is denoted as $f_{da}$, a Doppler shift occurring in the reflection wave received by the object detection device 1b is denoted as $f_{db}$, a Doppler shift occurring in the reflection wave received by the object detection device 1c is denoted as $f_{dc}$, the Doppler shifts $f_{da}$, $f_{db}$, and $f_{dc}$ are expressed as the following expressions (1) to (3).

$$f_{da} = \frac{v_{ra} + v_{ra}}{\lambda} \quad (1)$$

$$f_{db} = \frac{v_{ra} + v_{rb}}{\lambda} \quad (2)$$

$$f_{dc} = \frac{v_{ra} + v_{rc}}{\lambda} \quad (3)$$

In the equations (1) to (3), $\lambda$ denotes the wavelength of a transmission wave and a reflection wave as a carrier wave.

Letter $v_{ra}$ denotes the relative velocity between the object detection device 1a and the object 2 to be detected, $v_{rb}$ denotes the relative velocity between the object detection device 1b and the object 2 to be detected, and $v_{rc}$ denotes the relative velocity between the object detection device 1c and the object 2 to be detected.

Therefore, the difference $\Delta f_{d,\,b\text{-}a}$ between the Doppler shift $f_{da}$ occurring in the reflection wave received by the object detection device 1a and the Doppler shift $f_{db}$ occurring in the reflection wave received by the object detection device 1b is expressed as the following equation (4).

Also, the difference $\Delta f_{d,\,c\text{-}a}$ between the Doppler shift $f_{da}$ occurring in the reflection wave received by the object detection device 1a and the Doppler shift $f_{dc}$ occurring in the reflection wave received by the object detection device 1c is expressed as the following equation (5).

$$\Delta f_{d,b-a} = f_{db} - f_{da} = \frac{v_{rb} - v_{ra}}{\lambda} \quad (4)$$

$$\Delta f_{d,c-a} = f_{dc} - f_{da} = \frac{v_{rc} - v_{ra}}{\lambda} \quad (5)$$

Let a vector $v_a$ be a motion vector of the object detection device 1a, a vector $v_b$ be a motion vector of the object detection device 1b, a vector $v_c$ be a motion vector of the object detection device 1c, and a vector $v_t$ be a motion vector of the object 2 to be detected. Here, since a symbol of "→" indicating a vector cannot be placed over a character due to the electronic filing, a vector is expressed as a vector v.

Where |vector $v_a$|=$v_a$, |vector $v_b$|=$v_b$, |vector $v_c$|=$v_c$, and |vector $v_t$|=$v_t$ are given, the relative velocity $v_{ra}$ between the object detection device 1a and the object 2 to be detected is expressed as the following equation (6).

Moreover, the relative velocity $v_{rb}$ between the object detection device 1b and the object 2 to be detected is expressed as the following equation (7), and the relative velocity $v_{rc}$ between the object detection device 1c and the object 2 to be detected is expressed as the following equation (8).

$$v_{ra} = v_a \cos(\theta_a) + v_t \cos(\delta_t - \beta_b/2) \quad (6)$$

$$v_{rb} = v_b \cos(\theta_b) + v_t \cos(\delta_t + \beta_b/2) \quad (7)$$

$$v_{rc} = v_c \cos(\theta_c) + v_t \cos(\delta_t + \beta_c/2) \quad (8)$$

$$\beta_b = \theta_a - \tan^{-1}\left(\frac{R_a \sin(\theta_a) - d_{b-a}}{R_a \sin(\theta_a)}\right) \quad (9)$$

$$\beta_c = \theta_a - \tan^{-1}\left(\frac{R_a \sin(\theta_a) - d_{c-a}}{R_a \sin(\theta_a)}\right) \quad (10)$$

Therefore, the difference $\Delta f_{d,\,b\text{-}a}$ between the Doppler shift $f_{da}$ occurring in the reflection wave received by the object detection device 1a and the Doppler shift $f_{db}$ occurring in the reflection wave received by the object detection device 1b can be expressed by the following parameters.

Velocity $v_a$ of object detection device 1a

Direction $\theta_a$ from object detection device 1a to object 2 to be detected

Velocity $v_b$ of object detection device 1b

Direction $\theta_b$ from object detection device 1b to object 2 to be detected

Distance $d_{b\text{-}a}$ between object detection device 1a and object detection device 1b Velocity $v_t$ of object 2 to be detected Angle $\delta_t$ representing moving direction of object 2 to be detected Distance $R_a$ between object detection device 1a and object 2 to be detected Furthermore, the difference $\Delta f_{d,\,c\text{-}a}$ between the Doppler shift $f_{da}$ occurring in the reflection wave received by the object detection device 1a and the Doppler shift $f_{dc}$ occurring in the reflection wave received by the object detection device 1c can be expressed by the following parameters.

Velocity $v_a$ of object detection device 1a

Direction $\theta_a$ from object detection device 1a to object 2 to be detected velocity $v_c$ of object detection device 1c Direction $\theta_c$ from object detection device 1c to object 2 to be detected Distance $d_{c\text{-}a}$ between object detection device 1a and object detection device 1c Velocity $v_t$ of object 2 to be detected Angle $\delta_t$ representing moving direction of object 2 to be detected Distance $R_a$ between object detection device 1a and object 2 to be detected Among these parameters, the distances $d_{b\text{-}a}$ and $d_{c\text{-}a}$ between the object detection device 1a and each of the object detection devices 1b and 1c can be calculated from the position/velocity information output from the position/velocity information outputting device 21 connected to the object detection device 1a and position/velocity information included in the multiplexed signals transmitted from the object detection devices 1b and 1c.

The velocity $v_a$ of the object detection device 1a can also be calculated from the position/velocity information output from the position/velocity information outputting device 21 connected to the object detection device 1a. The velocities $v_b$ and $v_c$ of the object detection devices 1b and 1c can also be calculated from the position/velocity information included in the multiplexed signals transmitted from the object detection devices 1b and 1c.

If the reception antennas 15 of the object detection devices 1a, 1b, and 1c are directional antennas, a direction $\theta_a$ from the object detection device 1a to the object 2 to be detected corresponds to an orientation direction of a beam of the reception antenna 15 of the object detection device 1a, and a direction θ$_b$ from the object detection device 1b to the object 2 to be detected corresponds to an orientation direction of a beam of the reception antenna 15 of the object detection device 1b. Moreover, a direction θ$_c$ from the object detection device 1c to the object 2 to be detected corresponds to an orientation direction of a beam of the reception antenna 15 of the object detection device 1c.

Therefore, it is desirable that the reception antennas 15 of the object detection devices 1a, 1b, and 1c have high directivity.

In the first embodiment, it is assumed that the directions θ$_a$, θ$_b$, and θ$_c$ from the object detection devices 1a, 1b, and 1c, respectively, to the object 2 to be detected are known in the object detection device 1a.

Furthermore, it is assumed in the first embodiment that the communication device 23 receives the detection information of the object 2 monitored by a radar device or devices other than the object detection devices 1a, 1b, or 1c and that the demultiplexer 24 of the object detection device 1a outputs detection information of the object 2 received by the communication device 23 to the signal processing circuit 20 of the object detection device 1a. However, it is not always possible for the radar device or devices other than the object detection devices 1a, 1b, or 1c to monitor the detection information of the object 2, and there are cases where the detection information of the object 2 cannot be monitored depending on the positional relationship between the radar device and the object 2.

Next, delay time which is one of the factors affecting the beat frequency will be described.

As illustrated in FIGS. 4A and 4B, an absolute value of the beat frequency of the beat signal increases as delay time becomes longer.

A difference in beat frequencies $\Delta f_{p, b-a}$ attributable to a difference in propagation delays $\Delta R_{b-a}$, which is a difference between a propagation delay in the object detection device 1a and a propagation delay in the object detection device 1b, is expressed as the following equation (11), where the amount of change in a frequency with respect to a time change of the frequency modulation component of the transmission signal output from the transmission signal generating circuit 11 per unit time is denoted as ξ [Hz/sec].

Furthermore, a difference in beat frequencies $\Delta f_{p, c-a}$ attributable to a difference in propagation delays $\Delta R_{c-a}$, which is a difference between a propagation delay in the object detection device 1a and a propagation delay in the object detection device 1c, is expressed as the following equation (12)

$$\Delta f_{p,b-a} = \frac{\Delta R_{b-a}}{c} \xi \tag{11}$$

$$\Delta f_{p,c-a} = \frac{\Delta R_{c-a}}{c} \xi \tag{12}$$

In the equations (11) and (12), c represents the velocity of light.

The propagation delay difference $\Delta R_{b-a}$ in the equation (11) is expressed as the following expression (13), and the propagation delay difference $\Delta R_{c-a}$ in the equation (12) is expressed as the following expression (14).

$$\Delta R_{b-a} = R_b - R_a = \sqrt{(R_a \cos(\theta_a))^2 + (R_a \cos(\theta_a) - d_{b-a})^2} - R_a \tag{13}$$

$$\Delta R_{c-a} = R_c - R_a = \sqrt{(R_a \cos(\theta_a))^2 + (R_a \cos(\theta_a) - d_{c-a})^2} - R_a \tag{14}$$

Like in the case of the Doppler shift, the distances $d_{b-a}$ and $d_{c-a}$ between the object detection device 1a and each of the object detection devices 1b and 1c, respectively, and the direction θ$_a$ from the object detection device 1a to the object 2 to be detected are known.

Although the distance $R_a$ between the object detection device 1a and the object 2 is unknown in the object detection device 1a, the distance $R_a$ is obtained from the detection information of the object 2 transmitted from the radar device other than the object detection devices 1a, 1b, or 1c like in the case of Doppler shift.

The internal frequency deviation in the object detection devices 1a, 1b, and 1c which is one of the factors affecting the beat frequency will be described.

The internal frequency deviation in the object detection devices 1a, 1b, and 1c is the total frequency difference of frequency modulation components in the transmission signal generating circuit 11, the transmission high-frequency circuit 12, and the reception high-frequency circuit 16, and the internal frequency deviations in the object detection devices 1a, 1b, and 1c can be defined by a device design.

Here, it is assumed that the internal frequency deviation in the object detection device 1a, the internal frequency deviation in the object detection device 1b, and the internal frequency deviation in the object detection device 1c are the same $\Delta f_s$.

The beat frequency $\Delta f_{a, a-a}$ of the beat signal representing the difference between the frequency modulation component of the transmission signal in the object detection device 1a and the frequency of the reception signal in the signal receiving unit 14 in the object detection device 1a is expressed as the following equation (15). Note that, for the convenience of the following description, $\Delta f_{a, a-a}$ is referred to as a beat frequency difference.

The beat frequency difference $\Delta f_{b, b-a}$, which is a difference between a beat frequency of the reflection wave received by the object detection device 1a and a beat frequency of the reflection wave received by the object detection device 1b, is expressed as the following equation (16).

Moreover, the beat frequency difference $\Delta f_{b, c-a}$, which is a difference between a beat frequency of the reflection wave received by the object detection device 1a and a beat frequency of the reflection wave received by the object detection device 1c, is expressed as the following equation (17).

$$\Delta f_{b,a-a} = \Delta f_s \tag{15}$$

$$\Delta f_{b,b-a} = \Delta f_{d,b-a} + \Delta f_{p,b-a} + \Delta f_s \tag{16}$$

$$\Delta f_{b,c-a} = \Delta f_{d,c-a} + \Delta f_{p,c-a} + \Delta f_s \tag{17}$$

Therefore, the beat frequency difference $\Delta f_{b, b-a}$, which is a difference between the beat frequency of the reflection wave received by the object detection device 1a and the beat frequency of the reflection wave received by the object detection device 1b, is defined by the velocity $v_t$ of the object 2, the angle δ$_t$ indicating the moving direction of the object 2, and the distance $R_a$ between the object detecting device 1a and the object 2.

Moreover, the beat frequency difference $\Delta f_{b, c-a}$, which is a difference between the beat frequency of the reflection wave received by the object detection device 1a and the beat frequency of the reflection wave received by the object detection device 1c, is defined by the velocity $v_t$ of the object 2, the angle $\delta_t$ indicating the moving direction of the object 2, and the distance $R_a$ between the object detecting device 1a and the object 2.

When having received the beat signal from the beat signal extracting circuit 17 of the signal receiving unit 14, the ADC 19 of the reception signal processing unit 18 in the object detection device 1a converts the beat signal into a digital signal and outputs the digital beat signal to the filter 34 of the signal processing circuit 20.

When having received the digital beat signal from the ADC 19, the filter 34 of the signal processing circuit 20 in the object detection device 1a removes the clutter included in the digital beat signal (step ST1 in FIG. 8).

The digital beat signal from which the clutter has been removed by the filter 34 is output to the reception signal analyzing unit 35a, the frequency correction processing unit 40a, and the multiplexer 22.

The position/velocity information outputting device 21 connected to the object detection device 1a detects the position and velocity of the object detection device 1a and outputs the position/velocity information indicating the position and velocity of the object detection device 1a to the search area width setting units 31 and 32 of the signal processing circuit 20 and the multiplexer 22.

The multiplexer 22 connected to the object detection device 1a multiplexes the digital beat signal output from the filter 34 and the position/velocity information output from the position/velocity information outputting device 21 and outputs the multiplexed signal including the digital beat signal and the position/velocity information to the communication device 23.

When having received the multiplexed signal from the multiplexer 22, the communication device 23 transmits the multiplexed signal to the object detection devices 1b and 1c which are the other object detection devices.

That is, in the case where the object detection devices 1b and 1c combines a plurality of digital beat signals like the object detection device 1a does and perform detection processing of the object 2 from the synthesized signal, the communication device 23 transmits the multiplexed signal to the object detection devices 1b and 1c.

However, for the sake of simplicity of explanation, in the first embodiment it is assumed that only the object detection device 1a performs the detection processing of the object 2 and that the object detection devices 1b and 1c do not perform the detection processing of the object 2, and thus there is no need for the communication device 23 to transmit the multiplexed signal to the object detection devices 1b and 1c.

Communication devices 23 of the object detection devices 1b and 1c transmit multiplexed signals including the digital beat signal and the position/velocity information to the object detection device 1a that performs the detection processing of the object 2.

The communication device 23 receives the multiplexed signals transmitted from the object detection devices 1b and 1c which are the other object detection devices. In a situation where a radar device or devices other than the object detection devices 1a, 1b, or 1c can monitor the detection information of the object 2, the communication device 23 receives the detection information of the object 2 transmitted from the radar device or devices other than the object detection devices 1a, 1b, or 1c When the communication device 23 receives the multiplexed signal transmitted from the object detection device 1b, the demultiplexer 24 connected to the object detection device 1a demultiplexes the multiplexed signal and outputs the digital beat signal included in the multiplexed signal to the reception signal analyzing unit 35b and the frequency correction processing unit 40b of the signal processing circuit 20 in the object detection device 1a.

Furthermore, the demultiplexer 24 connected to the object detection device 1a outputs the position/velocity information included in the multiplexed signal to the search area width setting units 31 and 32 of the signal processing circuit 20 in the object detection device 1a.

When the communication device 23 receives the multiplexed signal transmitted from the object detection device 1c, the demultiplexer 24 connected to the object detection device 1a demultiplexes the multiplexed signal and outputs the digital beat signal included in the multiplexed signal to the reception signal analyzing unit 35c and the frequency correction processing unit 40c of the signal processing circuit 20 in the object detection device 1a.

Furthermore, the demultiplexer 24 connected to the object detection device 1a outputs the position/velocity information included in the multiplexed signal to the search area width setting units 31 and 32 of the signal processing circuit 20 in the object detection device 1a.

When the communication device 23 receives the detection information of the object 2 transmitted from the radar device or devices other than the object detection devices 1a, 1b, or 1c, the demultiplexer 24 connected to the object detection device 1a outputs the detection information of the object 2 to the search area width setting unit 31 of the signal processing circuit 20 in the object detection device 1a.

When receiving the digital beat signal from the filter 34, the reception signal analyzing unit 35a of the signal processing circuit 20 in the object detection device 1a analyzes the spectrum of the digital beat signal (step ST2 in FIG. 8).

When receiving the digital beat signals from the demultiplexer 24, that is, when receiving the digital beat signals from which the clutter has been removed by the filters 34 of the object detection devices 1b and 1c, the reception signal analyzing units 35b and 35c analyze the spectrum of the digital beat signals (step ST2 in FIG. 8).

As spectral analysis processing of a digital beat signal, for example, discrete Fourier transform processing or fast Fourier transform processing are performed.

A spectrum analysis result includes the amplitude or power information as spectral components for each frequency as well as phase information for each frequency.

In the example of FIG. 4B, spectrum analysis of a digital beat signal in section (A) and spectrum analysis of a digital beat signal in section (B) are performed.

The search area width setting unit 32 of the signal processing circuit 20 in the object detection device 1a calculates the distance $d_{b-a}$ between the object detection device 1a and the object detection device 1b and the distance $d_{c-a}$ between the object detection device 1a and the object detection device 1c from the position of the object detection device 1a indicated by the position/velocity information output from the position/velocity information outputting device 21 and the positions of the object detection devices 1b and 1c indicated by the position/velocity information output from the demultiplexer 24.

Next, the search area width setting unit 32 calculates $\Delta f_w^a$ as expressed by the following equation (18) using the velocity $v_a$ of the object detection device 1a indicated by the position/velocity information output from the position/velocity information outputting device 21, the direction $\theta_a$ from the object detection device 1a to the object 2 to be detected, which is the orientation direction of the beam of the reception antenna 15 in the object detection device 1a, a detectable distance range of the object 2 externally provided thereto, a detectable angular range of the object 2 externally provided thereto, and the detectable relative velocity range of the object 2 externally provided thereto. Details of the calculation processing of $\Delta f_w^a$ will be described later.

$$\Delta f_w^a = \max(\Delta f_{b,a-a}(R_a, \delta_t, v_t, \theta_a, v_a)) \quad (18)$$

The search area width setting unit 32 further calculates $\Delta f_w^b$ as expressed by the following equation (19) using the calculated distance $d_{b-a}$ between the object detection device 1a and the object detection device 1b, the velocity $v_a$ of the object detection device 1a indicated by the position/velocity information output from the position/velocity information outputting device 21, the velocity $v_b$ of the object detection device 1b indicated by the position/velocity information output from the demultiplexer 24, the direction $\theta_a$ from the object detection device 1a to the object 2 to be detected, which is the orientation direction of the beam of the reception antenna 15 in the object detection device 1a, the detectable distance range of the object 2 externally provided thereto, the detectable angular range of the object 2 externally provided thereto, and the detectable relative velocity range of the object 2 externally provided thereto. Details of the calculation processing of $\Delta f_w^b$ will be described later.

$$\Delta f_w^b = \max(\Delta f_{b,b-a}(R_a, \delta_t, v_t, d_{b-a}, \theta_a, v_a, v_b)) \quad (19)$$

Moreover, the search area width setting unit 32 of the object detection device 1a further calculates $\Delta f_w^c$ as expressed by the following equation (20) using the calculated distance $d_{c-a}$ between the object detection device 1a and the object detection device 1c, the velocity $v_a$ of the object detection device 1a indicated by the position/velocity information output from the position/velocity information outputting device 21, the velocity $v_c$ of the object detection device 1c indicated by the position/velocity information output from the demultiplexer 24, the direction $\theta_a$ from the object detection device 1a to the object 2 to be detected, which is the orientation direction of the beam of the reception antenna 15 in the object detection device 1a, the detectable distance range of the object 2 externally provided thereto, the detectable angular range of the object 2 externally provided thereto, and the detectable relative velocity range of the object 2 externally provided thereto. Details of the calculation processing of $\Delta f_w^c$ will be described later.

$$\Delta f_w^c = \max(\Delta f_{b,c-a}(R_a, \delta_t, v_t, d_{c-a}, \theta_a, v_a, v_c)) \quad (20)$$

After calculating $\Delta f_w^a$, $\Delta f_w^b$, and $\Delta f_w^c$, the search area width setting unit 32 of the object detection device 1a sets $\Delta f_w^a \times 2$, $\Delta f_w^b \times 2$, and $\Delta f_w^c \times 2$ as search area widths of a frequency (step ST3 in FIG. 8).

That is, the search area width setting unit 32 sets the search area width $\Delta f_w^a \times 2$ for the frequency of the object detection device 1a, the search area width $\Delta f_w^b \times 2$ for the frequency of the object detection device 1b, and the search area width $\Delta f_w^c \times 2$ for the frequency of the object detection device 1c.

Hereinafter, setting processing of the search area widths $\Delta f_w^a \times 2$, $\Delta f_w^b \times 2$, and $\Delta f_w^c \times 2$ for the frequency by the search area width setting unit 32 will be specifically described.

As expressed in the equation (15), the search area width setting unit 32 sets the internal frequency deviation $\Delta f_s$ in the object detection device 1a as the beat frequency difference $\Delta f_{b, a-a}$.

Next, the search area width setting unit 32 uses the beat frequency difference $\Delta f_{b, a-a}$ indicated in the equation (15) as the beat frequency difference $\Delta f_{b, a-a}$ on the right side of the equation (18).

Then, the search area width setting unit 32 substitutes the velocity $v_a$ of the object detection device 1a and the direction $\theta_a$ from the object detection device 1a to the object 2 to be detected as parameters of the beat frequency difference $\Delta f_{b, a-a}$ on the right side of the equation (18).

The search area width setting unit 32 further calculates $\Delta f_w^a$ of the equation (18) repetitively while changing the velocity $v_t$ of the object 2 which is an unknown value, the angle $\delta_t$ indicating the moving direction of the object 2 which is an unknown value, and the distance $R_a$ between the object detection device 1a and the object 2 which is an unknown value as parameters of the beat frequency difference $\Delta f_{b, a-a}$ on the right side of the equation (18).

The search area width setting unit 32 specifies the largest $\Delta f_w^a$ among the repetitively calculated $\Delta f_w^a$ and sets $\Delta f_w^a \times 2$ which is double the largest $\Delta f_w^a$ as the search area width of a frequency of the object detection device 1a.

The velocity $v_t$ of the object 2 varies within a range in which the relative velocity between the object detection device 1a and the object 2 does not deviate from the detectable relative velocity range of the object 2.

The angle $\delta_t$ indicating the moving direction of the object 2 varies within a range that does not deviate from the detectable angular range of the object 2 that is externally provided.

The distance $R_a$ between the object detection device 1a and the object 2 varies within a range that does not deviate from the detectable distance range of the object 2 that is externally provided.

The search area width setting unit 32 also repetitively calculates beat frequency differences $\Delta f_{b, b-a}$ and $\Delta f_{b, c-a}$ expressed in the equations (16) to (17) while changing the velocity $v_t$ of the object 2 which is an unknown value and the angle $\delta_t$ indicating the moving direction of the object 2 which is an unknown value.

The velocity $v_t$ of the object 2 varies within a range in which the relative velocity between the object detection device 1a and the object 2 does not deviate from the detectable relative velocity range of the object 2.

The angle $\delta_t$ indicating the moving direction of the object 2 varies within a range that does not deviate from the detectable angular range of the object 2 that is externally provided.

The search area width setting unit 32 specifies the largest beat frequency difference $\Delta f_{b, b-a}$ among the repetitively calculated beat frequency differences $\Delta f_{b, b-a}$.

The search area width setting unit 32 uses the specified largest beat frequency difference $\Delta f_{b, b-a}$ as the beat frequency difference $\Delta f_{b, b-a}$ on the right side of the equation (19).

As parameters of the beat frequency difference $\Delta f_{b, b-a}$ in the right side of the equation (19), the search area width setting unit 32 substitutes the calculated distance $d_{b-a}$ between the object detection device 1a and the object detection device 1b, the velocity $v_a$ of the object detection device 1a, the velocity $v_b$ of the object detection device 1b, and the direction $\theta_a$ from the object detection device 1a to the object 2 to be detected.

In addition, the search area width setting unit 32 substitutes the velocity $v_t$ of the object 2 and the angle $\delta_t$ indicating the moving direction of the object 2 which give the specified largest beat frequency difference $\Delta f_{b, b-a}$ as parameters of the beat frequency difference $\Delta f_{b, b-a}$ on the right side of the equation (19).

Then, the search area width setting unit 32 repetitively calculates $\Delta f_w^b$ of the equation (19) while changing the distance $R_a$ between the object detection device 1a and the object 2 which is an unknown value as a parameter of the beat frequency difference $\Delta f_{b,\ b-a}$ on the right side of the equation (19).

The search area width setting unit 32 specifies the largest $\Delta f_w^b$ among the repetitively calculated $\Delta f_w^b$ and sets $\Delta f_w^b \times 2$ which is double the largest $\Delta f_w^b$ as the search area width of a frequency of the object detection device 1b.

The search area width setting unit 32 specifies the largest beat frequency difference $\Delta f_{b,\ c-a}$ among the repetitively calculated beat frequency differences $\Delta f_{b,\ c-a}$.

The search area width setting unit 32 uses the specified largest beat frequency difference $\Delta f_{b,\ c-a}$ as the beat frequency difference $\Delta f_{b,\ c-a}$ on the right side of the equation (20).

As parameters of the beat frequency difference $\Delta f_{b,\ c-a}$ in the right side of the equation (20), the search area width setting unit 32 substitutes the calculated distance $d_{c-a}$ between the object detection device 1a and the object detection device 1c, the velocity $v_a$ of the object detection device 1a, the velocity $v_c$ of the object detection device 1c, and the direction $\theta_a$ from the object detection device 1a to the object 2 to be detected.

In addition, the search area width setting unit 32 substitutes the velocity $v_t$ of the object 2 and the angle $\delta_t$ indicating the moving direction of the object 2 which give the specified largest beat frequency difference $\Delta f_{b,\ c-a}$ as parameters of the beat frequency difference $\Delta f_{b,\ c-a}$ on the right side of the equation (20).

Then, the search area width setting unit 32 repetitively calculates $\Delta f_w^c$ of the equation (20) while changing the distance $R_a$ between the object detection device 1a and the object 2 which is an unknown value as a parameter of the beat frequency difference $\Delta f_{b,\ c-a}$ on the right side of the equation (20).

The search area width setting unit 32 specifies the largest $\Delta f_w^c$ among the repetitively calculated $\Delta f_w^c$ and sets $\Delta f_w^c \times 2$ which is double the largest $\Delta f_w^c$ as the search area width of a frequency of the object detection device 1c.

Here, calculation processing of the beat frequency differences $\Delta f_{b,\ b-a}$ and $\Delta f_{b,\ c-a}$ by the search area width setting unit 32 will be specifically described.

First, the search area width setting unit 32 calculates Doppler shift differences $\Delta f_{d,\ b-a}$ and $\Delta f_{d,\ c-a}$ included in the beat frequency differences $\Delta f_{b,\ b-a}$ and $\Delta f_{b,\ c-a}$ according to the equations (4) and (5).

Here, as the velocity $v_t$ of the object 2 which is an unknown value a velocity within the detectable relative velocity range of the object 2 externally provided is used, and as the angle $\delta_t$ indicating the moving direction of the object 2 which is an unknown value an angle within the detectable angular range of the object 2 externally provided is used. For example, when the detectable angular range of the object 2 is 0 to 360 degrees, an angle within the range of 0 to 360 degrees is used.

The search area width setting unit 32 calculates the Doppler shift differences $\Delta f_{d,\ b-a}$ and $\Delta f_{d,\ c-a}$ by the number of combinations of the velocity $v_t$ of the object 2 and the angle $\delta_t$ indicating the moving direction of the object 2.

Note that the distances $d_{b-a}$ and $d_{c-a}$ between the object detection device 1a and each of the object detection devices 1b and 1c and the velocities $v_a$, $v_b$, and $v_c$ of the object detection devices 1a, 1b, and 1c, respectively, include measurement errors. In addition, the directions $\theta_a$, $\theta_b$, and $\theta_c$ from the object detection devices 1a, 1b, and 1c, respectively, to the object 2 include errors with respect to the actual direction of the object 2 since the beams spread.

In the first embodiment, considering the influence of errors in the distances $d_{b-a}$ and $d_{c-a}$, the velocities $v_a$, $v_b$, and $v_c$ and the direction $\theta_a$, the search area width of a frequency is set to $\Delta f_w^a \times 2$, $\Delta f_w^b \times 2$, and $\Delta f_w^c \times 2$ but $\Delta f_w^a$, $\Delta f_w^b$, or $\Delta f_w^c$.

Therefore, for example in a case where the errors in the distances $d_{b-a}$ and $d_{c-a}$, the velocities $v_a$, $v_b$, and $v_c$ and the direction $\theta_a$ are extremely small, the search area width of a frequency may be set to $\Delta f_w^a$, $\Delta f_w^b$, and $\Delta f_w^c$, for example.

In a case where a radar device or devices other than the object detection devices 1a, 1b, or 1c can monitor the detection information of the object 2, the search area width setting unit 31 of the signal processing circuit 20 in the object detection device 1a acquires the detection information of the object 2 when the detection information of the object 2 is output from the demultiplexer 24 (step ST4 in FIG. 8: YES).

When acquiring the detection information of the object 2, the search area width setting unit 31 sets the search area widths of a frequency of the object detection devices 1a, 1b, and 1c by using the detection information of the object 2 (step ST5 in FIG. 8).

If no detection information of the object 2 is output from the demultiplexer 24 (step ST4 in FIG. 8: NO), the search area width setting unit 31 does not perform the processing for setting the search area width of a frequency.

As described above, the search area width setting unit 32 sets the search area widths of a frequency to $\Delta f_w^a \times 2$, $\Delta f_w^b \times 2$, and $\Delta f_w^c \times 2$ instead of $\Delta f_w^a$, $\Delta f_w^b$, or $\Delta f_w^c$ considering the influence of errors in the distances $d_{b-a}$ and $d_{c-a}$, the velocities $v_a$, $v_b$, and $v_c$, and the direction $\theta_a$. Therefore, the search area widths $\Delta f_w^a \times 2$, $\Delta f_w^b \times 2$, and $\Delta f_w^c \times 2$ set by the search area width setting unit 32 become wider than the search area widths $\Delta f_w^a$, $\Delta f_w^b$, $\Delta f_w^c$, respectively, in which the influence of errors is not considered. Since the search area width setting unit 31 sets the search area width of a frequency using the detection information of the object 2, it is possible to strictly determine the search area width of a frequency than in the search area width setting unit 32. Therefore, in the search area width setting unit 31, the search areas for the frequency can be narrower than the search area widths $\Delta f_w^a \times 2$, $\Delta f_w^b \times 2$, or $\Delta f_w^c \times 2$ set by the search area width setting unit 32.

Hereinafter, processing for setting a search area width of a frequency by the search area width setting unit 31 will be specifically described.

From the position of the object 2 included in the detection information of the object 2 and the position of the object detection device 1a indicated by the position/velocity information output from the position/velocity information outputting device 21, the search area width setting unit 31 calculates the distance $R_a$ between the object detection device 1a and the object 2.

From the position of the object 2 included in the detection information of the object 2 and the position of the object detection device 1b indicated by the position/velocity information output from the demultiplexer 24, the search area width setting unit 31 also calculates the distance $R_b$ between the object detection device 1b and the object 2.

Moreover, from the position of the object 2 included in the detection information of the object 2 and the position of the object detection device 1c indicated by the position/velocity information output from the demultiplexer 24, the search area width setting unit 31 also calculates the distance R& between the object detection device 1c and the object 2.

Here, the detection information of the object 2 includes an error depending on the detection accuracy of the radar device or devices other than the object detection devices 1a, 1b, or 1c.

Therefore, the search area width setting unit 31 calculates ranges of the distances $R_a$, $R_b$, and $R_c$ between the object detection devices 1a, 1b, and 1c, respectively, and the object 2 considering the detection accuracy of the radar device or devices other than the object detection devices 1a, 1b, or 1c from the distances $R_a$, $R_b$, and $R_c$ between the object detection devices 1a, 1b, and 1c, respectively, and the object 2.

In the first embodiment, it is assumed that the detection accuracy of the radar device or other devices is known in the search area width setting unit 31.

For example, in the case where the detection accuracy of the position of the object 2 included in the detection information of the radar device or other devices is $\pm R_0$, the search area width setting unit 31 calculates ranges of the distances $R_a$, $R_b$, and $R_c$ between the object detection devices 1a, 1b, and 1c and the object 2 as $(R_a-R_0)$ to $(R_a+R_0)$, $(R_b-R_0)$ to $(R_b+R_0)$, and $(R_c-R_0)$ to $(R_c+R_0)$, respectively.

The search area width setting unit 31 calculates the range of the velocity $v_t$ of the object 2 considering the detection accuracy of the radar device or other devices from the velocity $v_t$ of the object 2 included in the detection information of the object 2. For example, in a case where the detection accuracy of the velocity $v_t$ of the object 2 included in the detection information of the radar device or other devices is $\pm v_0$, the search area width setting unit 31 calculates the range of the velocity $v_t$ of the object 2 as $(v_t-v_0)$ to $(v_t+v_0)$.

In addition, the search area width setting unit 31 calculates the range of the angle $\delta_t$ indicating the moving direction of the object 2 considering the detection accuracy of the radar device or other devices from the angle $\delta_t$ indicating the moving direction of the object 2 included in the detection information of the object 2. For example, in a case where the detection accuracy of the angle $\delta_t$ included in the detection information of the radar device or other devices is $\pm \delta_0$, the search area width setting unit 31 calculates a range of the angle $\delta_t$ indicating the moving direction of the object 2 as $(\delta_t-\delta_0)$ to $(\delta_t+\delta_0)$.

Next, the search area width setting unit 31 calculates the distance $d_{b-a}$ between the object detection device 1a and the object detection device 1b and the distance $d_{c-a}$ between the object detection device 1a and the object detection device 1c from the position of the object detection device 1a indicated by the position/velocity information output from the position/velocity information outputting device 21 and the positions of the object detection devices 1b and 1c indicated by the position/velocity information output from the demultiplexer 24.

Here, although the search area width setting unit 31 calculates the distances $d_{b-a}$ and $d_{c-a}$ between the object detection device 1a and the object detection devices 1b and 1c, the search area width setting unit 31 may acquire the distances $d_{b-a}$ and $d_{c-a}$ between the object detection device 1a and the object detection devices 1b and 1c calculated by the search area width setting unit 32.

Next, the search area width setting unit 31 selects a distance $R_a$ from the range $(R_a-R_0)$ to $(R_a+R_0)$ of distance between the object detection device 1a and the object 2 and further selects a distance $R_b$ from the range $(R_b-R_0)$ to $(R_b+R_0)$ of distance between the object detection device 1b and the object 2.

Furthermore, the search area width setting unit 31 selects a distance $R_c$ from the range $(R_c-R_0)$ to $(R_c+R_0)$ of distance between the object detection device 1c and the object 2.

In addition, the search area width setting unit 31 selects a velocity $v_t$ from the range $(v_t-v_0)$ to $(v_t+v_0)$ of the velocity $v_t$ of the object 2 and further selects an angle $\delta_t$ from the range $(\delta_t-\delta_0)$ to $(\delta_t+\delta_0)$ of angle $\delta_t$ indicating the moving direction of the object 2.

When selecting any distances $R_a$, $R_b$, $R_c$, velocity $v_t$, or angle $\delta_t$, every combination is selected while changing combinations of selected distances $R_a$, $R_b$, $R_c$, velocity $v_t$, and angle $\delta_t$.

Each time any distances $R_a$, $R_b$, $R_c$, velocity $v_t$, or angle $\delta_t$ are selected, the search area width setting unit 31 substitutes the selected distance $R_a$, velocity $v_t$, and angle $\delta_t$ as well as the calculated distance $d_{b-a}$ between the object detection device 1a and the object detection device 1b in the following equations (21) and (22).

The, the search area width setting unit 31 sets a search area width $|f_{w\_max}^a - f_{w\_min}^a|$ of frequency of the object detection device 1a by substituting the velocity $v_a$ of the object detection device 1a indicated by the position/velocity information output from the position/velocity information outputting device 21, the direction $\theta_a$ from the object detection device 1a to the object 2 which is an orientation direction of a beam of the reception antenna 15, a change amount $\xi$ of a frequency with respect to a time change of the frequency modulation component of the transmission signal output from the transmission signal generating circuit 11 per unit time, and internal frequency deviations $\Delta f_s$ in the object detection devices 1a, 1b, and 1c in the following equations (21) to (22).

That is, by changing the combination of a distance $R_a$, a velocity $v_t$, and an angle $\delta_t$, the search area width setting unit 31 searches $f_{w\_min}^a$ with which the right side of the equation (21) becomes the minimum value and $f_{w\_max}^a$ with which the right side of the equation (22) becomes the maximum value.

A value $f_{w\_min}^a$ expressed in the equation (21) corresponds to the minimum value of the search area of a frequency of the object detection device 1a, and $f_{w\_max}^a$ expressed in the equation (22) corresponds to the maximum value of the search area of a frequency of the object detection device 1a.

$$f_{w\_min}^a = \min\left(f_{da}(R_a, \delta_t, v_t, d_{b-a}, \theta_a, v_a) + \left(\frac{R_a}{c}\zeta\right) + \Delta f_s\right) \quad (21)$$

$$f_{w\_max}^a = \max\left(f_{da}(R_a, \delta_t, v_t, d_{b-a}, \theta_a, v_a) + \left(\frac{R_a}{c}\zeta\right) + \Delta f_s\right) \quad (22)$$

In the equations (11) and (12), $f_{da}(R_a, \delta_t, v_t, d_{b-a}, \theta_a, v_a)$ corresponds to the Doppler shift $f_{da}$ expressed in the equation (1), that is, the Doppler shift $f_{da}$ attributable to the reflection wave received by the object detection device 1a.

Here, the distance $d_{b-a}$ between the object detection device 1a and the object detection device 1b is substituted in the equations (21) to (22), however, the distance $d_{c-a}$ between the object detection device 1a and the object detection device 1c may be substituted into the equations (21) to (22).

Each time any distances $R_a$, $R_b$, $R_c$, velocity $v_t$, or angle $\delta_t$ are selected, the search area width setting unit 31 substitutes the selected distances $R_a$ and $R_b$, velocity $v_t$, and angle $\delta_t$ as well as the calculated distance $d_{b-a}$ between the object detection device 1*a* and the object detection device 1*b* in the following equations (23) and (24).

Then, the search area width setting unit 31 sets a search area width $|f_{w\_max}^{b} - f_{w\_min}^{b}|$ of a frequency of the object detection device 1*b* by substituting the velocity $v_a$ of the object detection device 1*a* indicated by the position/velocity information output from the position/velocity information outputting device 21, the velocity $v_b$ of the object detection device 1*b* indicated by the position/velocity information output from the demultiplexer 24, the direction $\theta_a$ from the object detection device 1*a* to the object 2, the direction $\theta_b$ from the object detection device 1*b* to the object 2, a change amount $\xi$ of a frequency, and an internal frequency deviation $\Delta f_s$ in the following equations (23) to (24).

That is, by changing the combination of a distance $R_a$, a distance $R_b$, a velocity $v_t$, and an angle $\delta_t$, the search area width setting unit 31 searches $f_{w\_min}^{b}$ with which the right side of the equation (23) becomes the minimum value and $f_{w\_max}^{b}$ with which the right side of the equation (24) becomes the maximum value.

A value $f_{w\_min}^{b}$ expressed in the equation (23) corresponds to the minimum value of the search area of a frequency of the object detection device 1*b*, and $f_{w\_max}^{b}$ expressed in the equation (24) corresponds to the maximum value of the search area of a frequency of the object detection device 1*b*.

$$f_{w\_min}^{b} = \min\left(f_{db}(R_a, \delta_t, v_t, d_{b-a}, \theta_a, v_a, \theta_b, v_b) + \left(\frac{R_b}{c}\zeta\right) + \Delta f_s\right) \quad (23)$$

$$f_{w\_max}^{b} = \max\left(f_{db}(R_a, \delta_t, v_t, d_{b-a}, \theta_a, v_a, \theta_b, v_b) + \left(\frac{R_a}{c}\zeta\right) + \Delta f_s\right) \quad (24)$$

In the equations (23) and (24), $f_{db}(R_a, \delta_t, v_t, d_{b-a}, \theta_a, v_a, \theta_b, v_b)$ corresponds to the Doppler shift $f_{db}$ expressed in the equation (2), that is, the Doppler shift $f_{db}$ attributable to the reflection wave received by the object detection device 1*b*.

Each time any distances $R_a$, $R_b$, $R_c$, velocity $v_t$, or angle $\delta_t$ are selected, the search area width setting unit 31 substitutes the selected distances $R_a$ and $R_c$, velocity $v_t$, and angle $\delta_t$ as well as the calculated distance $d_{c-a}$ between the object detection device 1*a* and the object detection device 1*c* in the following equations (25) and (26).

Then, the search area width setting unit 31 sets a search area width $|f_{w\_max}^{c} - f_{w\_min}^{c}|$ of a frequency of the object detection device 1*c* by substituting the velocity $v_a$ of the object detection device 1*a* indicated by the position/velocity information output from the position/velocity information outputting device 21, the velocity $v_c$ of the object detection device 1*c* indicated by the position/velocity information output from the demultiplexer 24, the direction $\theta_a$ from the object detection device 1*a* to the object 2, the direction $\theta_c$ from the object detection device 1*c* to the object 2, a change amount $\xi$ of a frequency, and an internal frequency deviation $\Delta f_s$ in the following equations (25) to (26).

That is, by changing the combination of a distance $R_a$, a distance $R_c$, a velocity $v_t$, and an angle $\delta_t$, the search area width setting unit 31 searches $f_{w\_min}^{c}$ with which the right side of the equation (25) becomes the minimum value and $f_{w\_max}^{c}$ with which the right side of the equation (26) becomes the maximum value.

A value $f_{w\_min}^{c}$ expressed in the equation (25) corresponds to the minimum value of the search area of a frequency of the object detection device 1*c*, and $f_{w\_max}^{c}$ expressed in the equation (26) corresponds to the maximum value of the search area of a frequency of the object detection device 1*c*.

$$f_{w\_min}^{c} = \min\left(f_{dc}(R_a, \delta_t, v_t, d_{c-a}, \theta_a, v_a, \theta_c, v_c) + \left(\frac{R_c}{c}\zeta\right) + \Delta f_s\right) \quad (25)$$

$$f_{w\_max}^{c} = \max\left(f_{dc}(R_a, \delta_t, v_t, d_{c-a}, \theta_a, v_a, \theta_c, v_c) + \left(\frac{R_c}{c}\zeta\right) + \Delta f_s\right) \quad (26)$$

In the equations (25) and (26), $f_{dc}(R_a, \delta_t, v_t, d_{c-a}, \theta_a, v_a, \theta_c, v_c)$ corresponds to the Doppler shift $f_{dc}$ expressed in the equation (3), that is, the Doppler shift $f_{dc}$ attributable to the reflection wave received by the object detection device 1*c*.

When receiving the spectrum from the reception signal analyzing unit 35*a*, that is, when receiving the spectrum of the digital beat signal from which the clutter has been removed by the filter 34 of the object detection device 1*a*, the synthesis target limiting unit 36*a* of the signal processing circuit 20 in the object detection device 1*a* has the frequency of each of a plurality of spectral components included in the spectrum be x and a spectral component of the frequency x be $f_b^{a}(x)$.

Then, the synthesis target limiting unit 36*a* calculates the power $pow(f_b^{a}(x))$ of the spectral component $f_b^{a}(x)$ of each of the plurality of frequencies x. Since the processing for calculating the power $pow(f_b^{a}(x))$ in the spectral component $f_b^{a}(x)$ is a well-known technique, detailed explanation thereof will be omitted.

When receiving the spectrum from the reception signal analyzing unit 35*b*, that is, when receiving the spectrum of the digital beat signal from which the clutter has been removed by the filter 34 of the object detection device 1*b*, the synthesis target limiting unit 36*b* of the signal processing circuit 20 in the object detection device 1*a* has the frequency of each of the plurality of spectral components included in the spectrum be x and a spectral component of the frequency x be $f_b^{b}(x)$.

Then, the synthesis target limiting unit 36*b* calculates the power $pow(f_b^{b}(x))$ of the spectral component $f_b^{b}(x)$ of each of the plurality of frequencies x.

When receiving the spectrum from the reception signal analyzing unit 35*c*, that is, when receiving the spectrum of the digital beat signal from which the clutter has been removed by the filter 34 of the object detection device 1*c*, the synthesis target limiting unit 36*c* of the signal processing circuit 20 in the object detection device 1*a* has the frequency of each of the plurality of spectral components included in the spectrum be x and a spectral component of the frequency x be $f_b^{c}(x)$.

Then, the synthesis target limiting unit 36*c* calculates the power $pow(f_b^{c}(x))$ of the spectral component $f_b^{c}(x)$ of each of the plurality of frequencies x.

When having calculated the power $pow(f_b^{a}(x))$ of the spectral components $f_b^{a}(x)$ of the plurality of frequencies x, the synthesis target limiting unit 36*a* compares power $pow(f_b^{a}(x))$ of a spectral component $f_b^{a}(x)$ of each of the plurality of frequencies x with a preset threshold value.

Then, the synthesis target limiting unit 36*a* selects each piece of power $pow(f_b^{a}(x))$ that is larger than the threshold value from among the power $pow(f_b^{a}(x))$ of the spectral components $f_b^{a}(x)$ of the plurality of frequencies x.

When selecting each piece of the power $pow(f_b^{a}(x))$ that is larger than the threshold value, the synthesis target limiting unit 36*a* outputs a spectral component $f_b^{a}(x)$ each having the selected power pow($f_b^a(x)$) to the synthesis target selecting unit 37 (step ST6 in FIG. 8).

When having calculated the power pow($f_b^b(x)$) of the spectral components $f_b^b(x)$ of the plurality of frequencies x, the synthesis target limiting unit 36b compares power pow ($f_b^b(x)$) of a spectral component $f_b^b(x)$ of each of the plurality of frequencies x with the preset threshold value.

Then, the synthesis target limiting unit 36b selects each piece of power pow($f_b^b(x)$) that is larger than the threshold value from among the power pow($f_b^b(x)$) of the spectral components $f_b^b(x)$ of the plurality of frequencies x.

When selecting each piece of the power pow($f_b^b(x)$) that is larger than the threshold value, the synthesis target limiting unit 36b outputs a spectral component $f_b^b(x)$ each having the selected power pow($f_b^b(x)$) to the synthesis target selecting unit 37 (step ST6 in FIG. 8).

When having calculated the power pow($f_b^c(x)$) of the spectral components $f_b^c(x)$ of the plurality of frequencies x, the synthesis target limiting unit 36c compares power pow ($f_b^c(x)$) of a spectral component $f_b^c(x)$ of each of the plurality of frequencies x with the preset threshold value.

Then, the synthesis target limiting unit 36c selects each piece of power pow($f_b^c(x)$) that is larger than the threshold value from among the power pow($f_b^c(x)$) of the spectral components $f_b^c(x)$ of the plurality of frequencies x.

When selecting each piece of the power pow($f_b^c(x)$) that is larger than the threshold value, the synthesis target limiting unit 36c outputs a spectral component $f_b^c(x)$ each having the selected power pow($f_b^c(x)$) to the synthesis target selecting unit 37 (step ST6 in FIG. 8).

Here, although the synthesis target limiting units 36a, 36b, and 36c compare the power of spectral components of the plurality of frequencies x with the threshold value, amplitudes of the spectral components of the plurality of frequencies x may be compared with a threshold value.

The synthesis target selecting unit 37 of the signal processing circuit 20 of the object detection device 1a determines a search area of a frequency having the search area width set by the search area width setting unit 31 when the detection information of the object 2 is obtained or, determines a search area of a frequency having the search area width set by the search area width setting unit 32 when the detection information of the object 2 cannot be obtained.

When determining the search area of a frequency, the synthesis target selecting unit 37 selects a relatively large spectral component from among spectral components a frequency of which is included in the search area out of the spectral components $f_b^a(x)$, $f_b^b(x)$, and $f_b^c(x)$ selected by the synthesis target limiting units 36a, 36b, and 36c, relatively (step ST7 in FIG. 8).

Hereinafter, the selection processing of spectral components by the synthesis target selecting unit 37 will be specifically described.

First, the determination processing of a search area by the synthesis target selecting unit 37 when the detection information of the object 2 cannot be obtained will be described.

In a case where the detection information of the object 2 cannot be obtained, the synthesis target selecting unit 37 specifies the largest power max(pow($f_b^a(x)$)) among the power pow($f_b^a(x)$) selected by the synthesis target limiting unit 36a, that is, the power pow($f_b^a(x)$) larger than the threshold value.

The synthesis target selecting unit 37 also specifies the largest power max(pow($f_b^b(x)$)) among the power pow($f_b^b(x)$) selected by the synthesis target limiting unit 36b, that is, the power pow($f_b^b(x)$) larger than the threshold value.

The synthesis target selecting unit 37 also specifies the largest power max(pow($f_b^c(x)$)) among the power pow($f_b^c(x)$) selected by the synthesis target limiting unit 36c, that is, the power pow($f_b^c(x)$) larger than the threshold value.

Next, as indicated in the following equation (27), the synthesis target selecting unit 37 selects the maximum power max (pow($f_b^h(x)$)), which is the largest among the maximum power max(pow($f_b^a(x)$)), the maximum power max(pow($f_b^b(x)$)), and the maximum power max(pow($f_b^c(x)$)). Here, h in max(pow($f_b^h(x)$)) may be a, b, or c.

When specifying the largest maximum power max(pow ($f_b^h(x)$)), the synthesis target selecting unit 37 specifies a frequency $x_b^h$ at which the largest maximum power max (pow($f_b^h(x)$)) can be obtained and an object detection device 1 that receives a reception signal relating to the largest maximum power max(pow($f_b^h(x)$)).

$$\max(pow(f_b^h(x))) = \max(\max(pow(f_b^a(x))), \max(pow(f_b^b(x))), \max(pow(f_b^c(x)))) \quad (27)$$

Here, for convenience of explanation, it is assumed that an object detection device 1 which receives a reception signal relating to the largest maximum power max(pow($f_b^h$(x))) is the object detection device 1a.

In a case where an object detection device 1 which receives a reception signal relating to the largest maximum power max(pow($f_b^h(x)$)) is the object detection device 1a, the synthesis target selecting unit 37 has a frequency x at which the maximum power max(pow($f_b^h(x)$))=max(pow($f_b^a$(x))) is obtained be $x^a_{max}$.

Then, the synthesis target selecting unit 37 sets a search area of a frequency for the object detection device 1a such that the frequency $x^a_{max}$ becomes the center frequency of the search area width $\Delta f_w^a \times 2$ set by the search area width setting unit 32.

That is, the synthesis target selecting unit 37 sets the search area of a frequency for the object detection device 1a as expressed in the following equation (28).

$$x^a_{max} - \Delta f_w^a \leq x \leq x^a_{max} + \Delta f_w^a \quad (28)$$

The synthesis target selecting unit 37 further sets a search area of a frequency for the object detection device 1b such that the frequency $x^a_{max}$ at which the maximum power max(pow($f_b^a(x)$)) is obtained becomes the center frequency of the search area width $\Delta f_w^b \times 2$ set by the search area width setting unit 32.

That is, the synthesis target selecting unit 37 sets the search area of a frequency for the object detection device 1b as expressed in the following equation (29).

$$x^a_{max} - \Delta f_w^b \leq x \leq x^a_{max} + \Delta f_w^b \quad (29)$$

The synthesis target selecting unit 37 further sets a search area of a frequency for the object detection device 1c such that the frequency $x^a_{max}$ at which the maximum power max(pow($f_b^a(x)$)) is obtained becomes the center frequency of the search area width $\Delta f_w^c \times 2$ set by the search area width setting unit 32.

That is, the synthesis target selecting unit 37 sets the search area of a frequency for the object detection device 1c as expressed in the following equation (30).

$$x^a_{max} - \Delta f_w^c \leq x \leq x^a_{max} + \Delta f_w^c \quad (30)$$

Next, the determination processing of a search area by the synthesis target selecting unit 37 when the detection information of the object 2 can be obtained will be described.

In the case where the detection information of the object 2 is obtained, the synthesis target selecting unit 37 determines search areas of a frequency having the search area widths $|f_{w\_max}^{a}-f_{w\_min}^{a}|$, $|f_{w\_max}^{b}-f_{w\_min}^{b}|$, and $|f_{w\_max}^{c}-f_{w\_min}^{c}|$ set by the search area width setting unit 31.

That is, the synthesis target selecting unit 37 determines the minimum value of the search area of a frequency as $f_{w\_min}^{a}$ expressed in the equation (21) and the maximum value of the search area of a frequency as $f_{w\_max}^{a}$ expressed in the equation (22) as the search area of a frequency of the object detection device 1a as expressed in the following inequality (31).

$$f_{w\_min}^{a} \leq x \leq f_{w\_max}^{a} \tag{31}$$

Moreover, the synthesis target selecting unit 37 determines the minimum value of the search area of a frequency as $f_{w\_min}^{b}$ expressed in the equation (23) and the maximum value of the search area of a frequency as $f_{w\_max}^{b}$ expressed in the equation (24) as the search area of a frequency of the object detection device 1b as expressed in the following inequality (32).

$$f_{w\_min}^{b} \leq x \leq f_{w\_max}^{b} \tag{32}$$

Furthermore, the synthesis target selecting unit 37 determines the minimum value of the search area of a frequency as $f_{w\_min}^{c}$ expressed in the equation (25) and the maximum value of the search area of a frequency as $f_{w\_max}^{c}$ expressed in the equation (26) as the search area of a frequency of the object detection device 1c as expressed in the following inequality (33).

$$f_{w\_min}^{c} \leq x \leq f_{w\_max}^{c} \tag{33}$$

Next, selection processing of spectral components by the synthesis target selecting unit 37 will be described.

When determining the search areas of a frequency for the object detection devices 1a, 1b, and 1c, the synthesis target selecting unit 37 selects a spectral component $f_b^{a}(x)$ a frequency x of which is included in the search area for the object detection device 1a from among the one or more spectral components $f_b^{a}(x)$ selected by the synthesis target limiting unit 36a.

When selecting one or more spectral components $f_b^{a}(x)$ a frequency x of which is included in the search area, the synthesis target selecting unit 37 calculates power $pow(f_b^{a}(x))$ of each of the one or more spectral components $f_b^{a}(x)$.

The synthesis target selecting unit 37 also selects a spectral component $f_b^{b}(x)$ a frequency x of which is included in the search area for the object detection device 1b from among the one or more spectral components $f_b^{b}(x)$ selected by the synthesis target limiting unit 36b.

When selecting one or more spectral components $f_b^{b}(x)$ a frequency x of which is included in the search area, the synthesis target selecting unit 37 calculates power $pow(f_b^{b}(x))$ of each of the one or more spectral components $f_b^{b}(x)$.

Furthermore, the synthesis target selecting unit 37 also selects a spectral component $f_b^{c}(x)$ a frequency x of which is included in the search area for the object detection device 1c from among the one or more spectral components $f_b^{c}(x)$ selected by the synthesis target limiting unit 36c.

When selecting one or more spectral components $f_b^{c}(x)$ a frequency x of which is included in the search area, the synthesis target selecting unit 37 calculates power $pow(f_b^{c}(x))$ of each of the one or more spectral components $f_b^{c}(x)$.

When having calculated power $pow(f_b^{a}(x))$ of each of the one or more spectral components $f_b^{a}(x)$ a frequency x of which is included in the search area for the object detection device 1a, the synthesis target selecting unit 37 specifies the maximum power $max(pow(f_b^{a}(x)))$ out of those pieces of power $pow(f_b^{a}(x))$.

Then, the synthesis target selecting unit 37, assuming a frequency x of the specified maximum power $max(pow(f_b^{a}(x)))$ as $x_{sel}^{a}$, extracts an amplitude $a^{a}=abs(f_b^{a}(x_{sel}^{a}))$ of the spectral component $f_b^{a}(x)$ of the frequency $x_{sel}^{a}$ as well as a phase $\varphi^{a}=arg(f_b^{a}(x_{sel}^{a}))$ of the frequency $x_{sel}^{a}$. abs(•) means to extract the amplitude component, and arg(•) means to extract the phase component.

When extracting the amplitude $a^{a}$ and the phase $\varphi^{a}$ in the spectral component $f_b^{a}(x)$ of the frequency $x_{sel}^{a}$, the synthesis target selecting unit 37 outputs the amplitude $a^{a}$ and the phase $\varphi^{a}$ to the coefficient determining unit 41 of the synthesizing unit 38.

The synthesis target selecting unit 37 further outputs the frequency $x_{sel}^{a}$ to the frequency correction amount calculating unit 39 of the synthesizing unit 38.

In the case where none of the frequencies x of the spectral components $f_b^{a}(x)$ selected by the synthesis target limiting unit 36a are included in the search area for the object detection device 1a, the synthesis target selecting unit 37 do not perform the processing of specifying the maximum power $max(pow(f_b^{a}(x)))$. Therefore, the synthesis target selecting unit 37 does not output the amplitude $a^{a}$ nor the phase $\varphi^{a}$ in the spectral component $f_b^{a}(x)$ of the frequency $x_{sel}^{a}$ to the coefficient determining unit 41. The synthesis target selecting unit 37 does not output the frequency $x_{sel}^{a}$ to the frequency correction amount calculating unit 39, either.

When having calculated power $pow(f_b^{b}(x))$ of each of the one or more spectral components $f_b^{b}(x)$ a frequency x of which is included in the search area for the object detection device 1b, the synthesis target selecting unit 37 specifies the maximum power $max(pow(f_b^{b}(x)))$ out of those pieces of power $pow(f_b^{b}(x))$.

Then, the synthesis target selecting unit 37, assuming a frequency x of the specified maximum power $max(pow(f_b^{b}(x)))$ as $x_{sel}^{b}$, extracts an amplitude $a^{b}=abs(f_b^{b}(x_{sel}^{b}))$ of the spectral component $f_b^{b}(x)$ of the frequency $x_{sel}^{b}$ as well as a phase $\varphi^{b}=arg(f^{b}(x_{sel}^{b}))$ of the frequency $x_{sel}^{b}$.

When extracting the amplitude $a^{b}$ and the phase $\varphi^{b}$ in the spectral component $f_b^{b}(x)$ of the frequency $x_{sel}^{b}$, the synthesis target selecting unit 37 outputs the amplitude $a^{b}$ and the phase $\varphi^{b}$ to the coefficient determining unit 41 of the synthesizing unit 38.

The synthesis target selecting unit 37 further outputs the frequency $x_{sel}^{b}$ to the frequency correction amount calculating unit 39 of the synthesizing unit 38.

In the case where none of the frequencies x of the spectral components $f_b^{b}(x)$ selected by the synthesis target limiting unit 36b are included in the search area for the object detection device 1b, the synthesis target selecting unit 37 do not perform the processing of specifying the maximum power $max(pow(f_b^{b}(x)))$. Therefore, the synthesis target selecting unit 37 does not output the amplitude $a^{b}$ nor the phase $\varphi^{b}$ in the spectral component $f_b^{b}(x)$ of the frequency $x_{sel}^{b}$ to the coefficient determining unit 41. The synthesis target selecting unit 37 does not output the frequency $x_{sel}^{b}$ to the frequency correction amount calculating unit 39, either.

When having calculated power $pow(f_b^{c}(x))$ of each of the one or more spectral components $f_b^{c}(x)$ a frequency x of which is included in the search area for the object detection device 1c, the synthesis target selecting unit 37 specifies the maximum power $max(pow(f_b^{c}(x)))$ out of those pieces of power $pow(f_b^{c}(x))$.

Then, the synthesis target selecting unit 37, assuming a frequency x of the specified maximum power $max(pow(f_b^{c}(x)))$ be $x_{sel}^{c}$, extracts an amplitude $a^{c}=abs(f_b^{c}(x_{sel}^{c}))$ of the spectral component $f_b^{c}(x)$ of the frequency $x_{sel}^{c}$ as well as a phase $\varphi^{c}=arg(f_b^{c}(x_{sel}^{c}))$ of the frequency $x_{sel}^{c}$.

When extracting the amplitude $a^c$ and the phase $\varphi^c$ in the spectral component $f_b^c(x)$ of the frequency $x^c_{sel}$, the synthesis target selecting unit 37 outputs the amplitude $a^c$ and the phase $\varphi^c$ to the coefficient determining unit 41 of the synthesizing unit 38.

The synthesis target selecting unit 37 further outputs the frequency $x^c_{sel}$ to the frequency correction amount calculating unit 39 of the synthesizing unit 38.

In the case where none of the frequencies x of the spectral components $f_b^c(x)$ selected by the synthesis target limiting unit 36c are included in the search area for the object detection device 1c, the synthesis target selecting unit 37 do not perform the processing of specifying the maximum power max(pow($f_b^c(x)$)). Therefore, the synthesis target selecting unit 37 does not output the amplitude $a^c$ nor the phase $\varphi^c$ in the spectral component $f_b^c(x)$ of the frequency $x^c_{sel}$ to the coefficient determining unit 41. The synthesis target selecting unit 37 does not output the frequency $x^c_{sel}$ to the frequency correction amount calculating unit 39, either.

When having received two or more frequencies out of the frequencies $x^a_{sel}$, $x^b_{sel}$, and $x^c_{sel}$ related to the digital beat signals corresponding to reception signals of the object detection devices 1a, 1b, and 1c, respectively, from the synthesis target selecting unit 37 (if larger than or equal to two in step ST8 in FIG. 8), the frequency correction amount calculating unit 39 of the signal processing circuit 20 in the object detection device 1a calculates frequency correction amounts $\Delta x_a$, $\Delta x_b$, and $\Delta x_c$ for the digital beat signals corresponding to the reception signals of the object detection devices 1a, 1b, and 1c (step ST9 in FIG. 8).

That is, for example, when having received the frequencies $x^a_{sel}$, $x^b_{sel}$, and $x^c_{sel}$ from the synthesis target selecting unit 37, the frequency correction amount calculating unit 39 calculates the frequency correction amounts $\Delta x_a$, $\Delta x_b$, and $\Delta x_c$ for the plurality of digital beat signals with reference to the frequency $x^a_{sel}$ for the object detection device 1a as expressed in the following expressions (34) to (36) in order to increase the synthesis gain when the synthesis processing unit 42 combines the plurality of digital beat signals.

$$\Delta x_a = (x^a_{sel} - x^a_{sel}) \quad (34)$$

$$\Delta x_b = (x^b_{sel} - x^a_{sel}) \quad (35)$$

$$\Delta x_c = (x^c_{sel} - x^a_{sel}) \quad (36)$$

Here, the example in which the frequency correction amount calculating unit 39 receives the frequencies $x^a_{sel}$, $x^b_{sel}$, and $x^c_{sel}$ from the synthesis target selecting unit 37 is illustrated, however, when the frequencies $x^a_{sel}$ and $x^b_{sel}$ are received as the two frequencies for example, the frequency correction amounts $\Delta x_a$ and $\Delta x_b$ are calculated according to the equations (34) and (35), respectively. Alternatively, when the frequencies $x^a_{sel}$ and $x^c_{sel}$ are received as the two frequencies, the frequency correction amounts $\Delta x_a$ and $\Delta x_c$ are calculated according to the equations (34) and (36), respectively.

If zero or one frequency has been received from the synthesis target selecting unit 37 out of the frequencies $x^a_{sel}$, $x^b_{sel}$, and $x^c_{sel}$ of the digital beat signals corresponding to the reception signals of the object detection devices 1a, 1b, and 1c, respectively (if zero or one in step ST8 in FIG. 8), the frequency correction amount calculating unit 39 does not perform the processing for calculating the frequency correction amounts $\Delta x_a$, $\Delta x_b$, or $\Delta x_c$.

When the frequency correction amount calculating unit 39 calculates the frequency correction amount $\Delta x_a$ for the digital beat signal corresponding to the reception signal of the object detection device 1a, the frequency correction processing unit 40a of the signal processing circuit 20 in the object detection device 1a corrects the frequency of the digital beat signal from which clutter has been removed by the filter 34 on the basis of the frequency correction amount $\Delta x_a$ as expressed by the following equation (37) (step ST10 in FIG. 8).

$$s_{H,a}(t) = s_a(t) \times \exp(-\Delta x_a \times 2 \times \pi \times \text{DataInterval} \times t) \quad (37)$$

In the equation (37), $s_a(t)$ represents a time-series signal of the digital beat signal output from the filter 34. Also, $s_{H,a}(t)$ represents a time-series signal of the digital beat signal after frequency correction.

DataInterval represents a sample time interval of the time-series signal, and t is a sample number. A sample number is an integer.

When the frequency correction amount calculating unit 39 calculates the frequency correction amount $\Delta x_b$ for the digital beat signal corresponding to the reception signal of the object detection device 1b, the frequency correction processing unit 40b of the signal processing circuit 20 in the object detection device 1a corrects the frequency of the digital beat signal output from the demultiplexer 24, that is, the digital beat signal from which clutter has been removed by the filter 34 of the object detection device 1b on the basis of the frequency correction amount $\Delta x_b$ as expressed in the following equation (38) (step ST10 in FIG. 8).

$$s_{H,b}(t) = s_b(t) \times \exp(-\Delta x_b \times 2 \times \pi \times \text{DataInterval} \times t) \quad (38)$$

In the equation (38), $s_b(t)$ represents a time-series signal of the digital beat signal output from the filter 34 of the object detection device 1b. Also, $s_{H,b}(t)$ represents a time-series signal of the digital beat signal after frequency correction.

When the frequency correction amount calculating unit 39 calculates the frequency correction amount $\Delta x_c$ for the digital beat signal corresponding to the reception signal of the object detection device 1c, the frequency correction processing unit 40c of the signal processing circuit 20 in the object detection device 1a corrects the frequency of the digital beat signal output from the demultiplexer 24, that is, the digital beat signal from which clutter has been removed by the filter 34 of the object detection device 1c on the basis of the frequency correction amount $\Delta x_c$ as expressed in the following equation (39) (step ST10 in FIG. 8).

$$s_{H,c}(t) = s_c(t) \times \exp(-\Delta x_c \times 2 \times \pi \times \text{DataInterval} \times t) \quad (39)$$

In the equation (39), $s_c(t)$ represents a time-series signal of the digital beat signal output from the filter 34 of the object detection device 1c. Also, $s_{H,c}(t)$ represents a time-series signal of the digital beat signal after frequency correction.

When the frequency correction processing units 40a, 40b, and 40c correct the frequencies of the digital beat signals, the coefficient determining unit 41 of the signal processing circuit 20 in the object detection device 1a determines weighting coefficients $w^a$, $w^b$, and $w^c$ for combining the time-series signals $s_{H,a}(t)$, $s_{H,b}(t)$, and $s_{H,c}(t)$ of the digital beat signals frequencies of which have been corrected by the frequency correction processing units 40a, 40b, and 40c as expressed in the following equations (40), (41), and (42) using the amplitudes $a^a$, $a^b$, and $a^c$ and the phases $\varphi^a$, $\varphi^b$, and $\varphi^c$, respectively, which are output from the synthesis target selecting unit 37 (step ST11 in FIG. 8).

$$w^a = \frac{a^a}{\sqrt{(a^a)^2 + (a^b)^2 + (a^c)^2}} e^{-j\varphi^a} \quad (40)$$

$$w^b = \frac{a^b}{\sqrt{(a^a)^2 + (a^b)^2 + (a^c)^2}} e^{-j\phi^b} \quad (41)$$

$$w^c = \frac{a^c}{\sqrt{(a^a)^2 + (a^b)^2 + (a^c)^2}} e^{-j\phi^c} \quad (42)$$

When the frequency correction amount calculating unit 39 has not performed the processing of correcting the frequency of the digital beat signals, the coefficient determining unit 41 does not perform the processing of determining the weighting coefficients $w^a$, $w^b$, or $w^c$.

When the coefficient determining unit 41 determines the weighting coefficients $w^a$, $w^b$, and $w^c$, the synthesis processing unit 42 of the signal processing circuit 20 in the object detection device 1a combines the time-series signals $s_{H,a}(t)$, $s_{H,b}(t)$, and $s_{H,c}(t)$ of the digital beat signals frequencies of which have been corrected by the frequency correction processing units 40a, 40b, and 40c using the weighting coefficients $w^a$, $w^b$, and $w^c$ as expressed in the following equation (43) (step ST12 in FIG. 8).

$$y(t) = w^a s_{H,a}(t) + w^b s_{H,b}(t) + w^c s_{H,c}(t) \quad (43)$$

The synthesis processing unit 42 outputs the synthesized signal y(t) to the object detecting unit 43.

Note that, since the weighting coefficients $w^a$, $w^b$, and $w^c$ determined by the coefficient determining unit 41 are weightings for maximum ratio combining, the signal power-to-noise power ratio is increased by the synthesis processing of the equation (43).

When having received one of the frequencies $x^a_{sel}$, $x^b_{sel}$, and $x^c_{sel}$ related to the digital beat signals corresponding to the reception signals of the object detection devices 1a, 1b, and 1c, respectively, from the synthesis target selecting unit 37 (if one in step ST8 in FIG. 8), the synthesis processing unit 42 outputs a time-series signal of a digital beat signal corresponding to the frequency output from the synthesis target selecting unit 37 as a synthesized signal y(t) to the object detecting unit 43.

For example, when the frequency output from the synthesis target selecting unit 37 is the frequency $x^a_{sel}$, the synthesis processing unit 42 outputs the time-series signal $s_a(t)$ of the digital beat signal output from the filter 34 of the object detection device 1a to the object detecting unit 43 as the synthesized signal y(t).

For example, when the frequency output from the synthesis target selecting unit 37 is the frequency $x^b_{sel}$, the synthesis processing unit 42 outputs the time-series signal $s_b(t)$ of the digital beat signal output from the filter 34 of the object detection device 1b to the object detecting unit 43 as the synthesized signal y(t).

For example, when the frequency output from the synthesis target selecting unit 37 is the frequency $x^c_{sel}$, the synthesis processing unit 42 outputs the time-series signal $s_c(t)$ of the digital beat signal output from the filter 34 of the object detection device 1c to the object detecting unit 43 as the synthesized signal y(t).

When having received the synthesized signal y(t) from the synthesis processing unit 42, the object detecting unit 43 of the signal processing circuit 20 in the object detection device 1a detects the object 2 by performing the CFAR processing on the synthesized signal y(t) (step ST13 in FIG. 8).

That is, the object detecting unit 43 analyzes the spectrum of the synthesized signal y(t) and, if spectral components of a plurality of frequencies included in the spectrum include a spectral component larger than or equal to the CFAR threshold value externally provided thereto, it is determined that the object 2 to be detected is present.

If the spectral components of the plurality of frequencies included in the spectrum do not include a spectral component larger than or equal to the CFAR threshold value, the object detecting unit 43 determines that the object 2 to be detected is not present.

When it is determined that the object 2 to be detected is present, the object detecting unit 43 outputs a frequency of a spectral component larger than or equal to the CFAR threshold value to the operation unit 44 as a beat frequency.

When having received the beat frequency from the object detecting unit 43, the operation unit 44 of the signal processing circuit 20 in the object detection device 1a calculates the distance $R_a$ from the object detection device 1a to the object 2 and the relative velocity $v_r$ between the object detection device 1a and the object 2 using the beat frequency (step ST14 in FIG. 8).

For example in a case where a beat frequency $f_r^A$ in section (A) and a beat frequency $f_r^B$ in section (B) as illustrated in FIG. 4B are obtained, the distance $R_a$ from the object detection device 1a to the object 2 and the relative velocity $v_r$ between the object detection device 1a and the object 2 can be calculated by solving the following equations (44) and (45).

$$f_r^A = \frac{2R_a}{c}\xi^A + \frac{2v_r}{\lambda} \quad (44)$$

$$f_r^B = \frac{2R_a}{c}\xi^B + \frac{2v_r}{\lambda} \quad (45)$$

In the equations (44) and (45), c represents the velocity of light, $\lambda$ represents the wavelength of a carrier wave, $\xi^A$ represents the amount of change in a frequency with respect to a time change of a frequency modulation component per unit time in section (A), and $\xi^B$ represents the amount of change in a frequency with respect to a time change of a frequency modulation component per unit time in section (B). In the example of FIG. 4B, $\xi = \xi^A = -\xi^B$ holds.

After calculating the distance $R_a$ from the object detection device 1a to the object 2 and the relative velocity $v_r$ between the object detection device 1a and the object 2, the operation unit 44 outputs the distance $R_a$ and the relative velocity $v_r$ to the detected object information displaying device 25 and the object monitoring unit 3.

Here, in a case where the search area of a frequency having the search area width set by the search area width setting unit 32 has been determined by the synthesis target selecting unit 37, the distance $R_a$ calculated by the operation unit 44 may exceed a detectable distance range assumed for the object detection device 1a depending on a combination of the frequencies $x^a_{sel}$, $x^b_{sel}$, and $x^c_{sel}$ selected by the synthesis target selecting unit 37.

In addition, the relative velocity $v_r$ calculated by the operation unit 44 may exceed a detectable relative velocity range assumed for the object detection device 1a.

In a case where the calculated distance $R_1$ exceeds the detectable distance range assumed for the object detection device 1a, or a case where the calculated relative velocity $v_r$ exceeds the detectable relative velocity range assumed for the object detection device 1a, the operation unit 44 does not output the distance $R_a$ or the relative velocity $v_r$ to the detected object information displaying device 25 or the object monitoring unit 3.

When having received the distance $R_a$ from the object detection device 1a to the object 2 and the relative velocity $v_r$ between the object detection device 1a and the object 2 from the operation unit 44, the detected object information displaying device 25 displays the distance $R_a$ and the relative velocity $v_r$ on a display.

When having received the distance $R_a$ from the object detection device 1a to the object 2 and the relative velocity $v_r$ between the object detection device 1a and the object 2 from the operation unit 44, the object monitoring unit 3 performs monitoring processing of the object 2 using the distance $R_a$ and the relative velocity $v_r$.

The monitoring processing of the object 2 by the object monitoring unit 3 includes monitoring the change in the position or velocity of the object 2 while recording the distance $R_a$ to the object 2 detected by the object detection device 1a or the relative velocity $v_r$ as well as prediction processing for predicting the future position and velocity of the object 2.

As is clear from the above description, according to the first embodiment, the search area width setting unit 31 for setting a search area width having a frequency corresponding to a signal component of the object 2 by using the detection information of the object 2 is included, and the signal component selecting unit 33 determines a search area having the search area width set by the search area width setting unit 31 and selects a signal component a frequency of which is included in the search area from each of the signal received by the signal receiving unit 14 and signals received by the object detection devices 1b and 1c. Therefore, an increase in the probability of false detection of the object 2 can be suppressed even in a case where the reception signals have low signal power-to-noise power ratios.

That is, according to the first embodiment, since the detection information of the object 2 is used when the search area width setting unit 31 sets the search area width of a frequency, the search area width of a frequency becomes narrower than the search area width set by the search area width setting unit 32, thereby enabling the search area width of a frequency to be strictly set. Therefore, since the signal component selecting unit 33 can determine a more appropriate search area of a frequency, an increase in the probability of false detection of the object 2 can be suppressed even in a case where a reception signal has a low signal power-to-noise power ratio.

Here, FIG. 10 is an explanatory graph illustrating the relationship between the signal power-to-noise power ratio and the false detection probability of a reception signal.

Figure 10A:
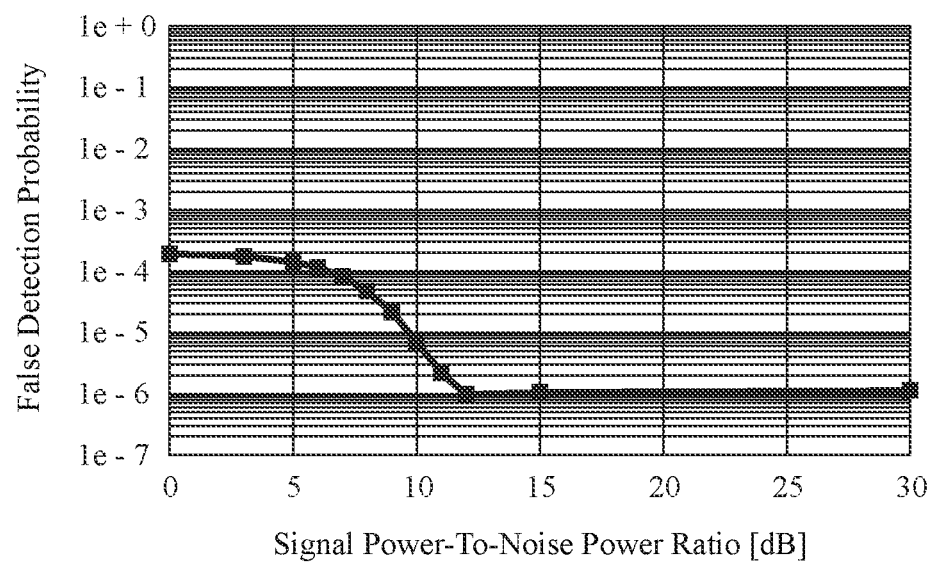
FIG. 10A is an explanatory diagram illustrating a relationship between a signal power-to-noise power ratio and a false detection probability when a search area of a frequency having a search area width set by a search area width setting unit 32 is determined.

FIG. 10A is a graph illustrating the relationship between the signal power-to-noise power ratio and the false detection probability when the search area of a frequency having the search area width set by the search area width setting unit 32 is determined.

Figure 10B:
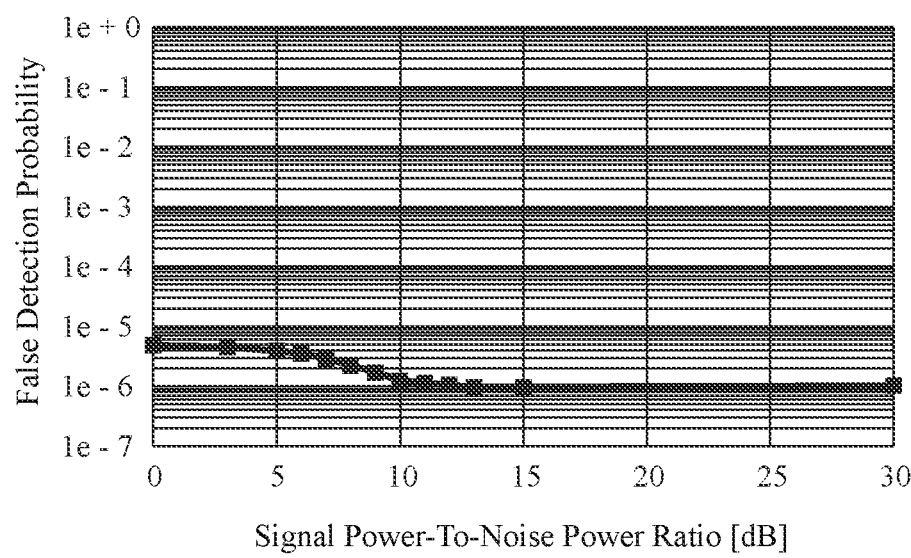
FIG. 10B is an explanatory diagram illustrating a relationship between the signal power-to-noise power ratio and the false detection probability when a search area of a frequency having a search area width set by a search area width setting unit 31 is determined.

Meanwhile, FIG. 10B is a graph illustrating the relationship between the signal power-to-noise power ratio and the false detection probability when the search area of a frequency having the search area width set by the search area width setting unit 31 is determined.

The relationship between the signal power-to-noise power ratio and the false detection probability in FIGS. 10A and 10B can be obtained by simulation, for example.

In the case where the search area of a frequency having the search area width set by the search area width setting unit 32 is determined by the synthesis target selecting unit 37, for example, the false detection probability of object 2 is higher than a false alarm probability of $10^{-6}$ set by the CFAR when the signal power-to-noise power ratio of the reception signal is approximately less than or equal to 12 dB as illustrated in FIG. 10A.

On the other hand, in the case where the search area of a frequency having the search area width set by the search area width setting unit 31 is determined by the synthesis target selecting unit 37, as illustrated in FIG. 10B, the false detection probability of object 2 with a signal power-to-noise power ratio of the reception signal being approximately less than or equal to 12 dB is lower than in the case where the search area of a frequency having the search area width set by the search area width setting unit 32 is determined by the synthesis target selecting unit 37.

Moreover, according to the first embodiment, the signal component selecting unit 33 determines a search area having the search area width set by the search area width setting unit 31 when the detection information of the object 2 is obtained or determines a search area having the search area width set by the search area width setting unit 32 when the detection information of the object 2 cannot be obtained, so even in a situation where the detection information of the object 2 cannot be obtained, the detection probability of the object 2 can be enhanced.

Furthermore, according to the first embodiment, the frequency correction amount calculating unit 39 for setting a frequency of one of the spectral components each selected by the synthesis target selecting unit 37 as a reference frequency and calculating each frequency correction amount from a difference between the reference frequency and a frequency of each of the spectral components selected by the synthesis target selecting unit 37 is provided, and the frequency correction processing units 40a, 40b, and 40c correct the frequency of a digital beat signal on the basis of a frequency correction amount calculated by the frequency correction amount calculating unit 39. Therefore, even in a case where frequencies of the digital beat signals extracted by the plurality of object detection devices 1a, 1b, are 1c are different, a reduction in the gain due to the synthesis can be suppressed.

According to the first embodiment, the synthesis processing unit 42 combines a plurality of beat signals frequencies of which have been corrected separately by the frequency correction processing units 40a, 40b, and 40c using the weighting coefficients determined by the coefficient determining unit 41. Therefore, a synthesized signal with an improved signal power-to-noise power ratio is obtained. Therefore, the detection accuracy of the object 2 by the object detecting unit 43 or the calculation accuracy of the distance and velocity by the operation unit 44 is improved.

Note that, in the first embodiment, in the case where the plurality of object detection devices 1 are installed apart from each other, beat signals extracted by the plurality of object detection devices 1 can be combined without calculating distances between the plurality of object detection devices 1 by order of wavelength.

That is, when distances between the plurality of object detection devices 1 are fixed, for example when the plurality of object detection devices 1 are fixed on the ground or the plurality of object detection devices 1 are installed in one moving platform, the distances do not change with time. Therefore, even when the accuracy of distances between the plurality of object detection devices 1 is reduced, it is possible to obtain a synthesized signal of a plurality of digital beat signals that can increase the detection probability of the object 2.

Even when the plurality of object detection devices 1 are installed at different moving platforms, when distances between the plurality of object detection devices 1 are fixed, it is possible to obtain a synthesized signal of a plurality of digital beat signals that can increase the detection probability of the object 2 even when the accuracy of distances between the plurality of object detection devices 1 is reduced.

Second Embodiment

In the first embodiment, the example in which the object detection device 1a detects the object 2 by a distance measurement method called the FWCW method has been described, however, distance measurement method for detecting the object 2 is not limited to the FWCW method.

In a second embodiment, an example in which an object detection device 1a detects an object 2 by a distance measurement method called a frequency modulation interrupted continuous wave (FMICW) method, for example, will be described.

Differences between the FWCW method and the FMICW method will be briefly described below.

Configuration diagrams of object detection devices 1a, 1b, and 1c according to the second embodiment are that of FIG. 3 like in the first embodiment.

FIG. 11 is an explanatory diagram illustrating a transmission wave, a reflection wave, and a beat signal.

Figure 11A:
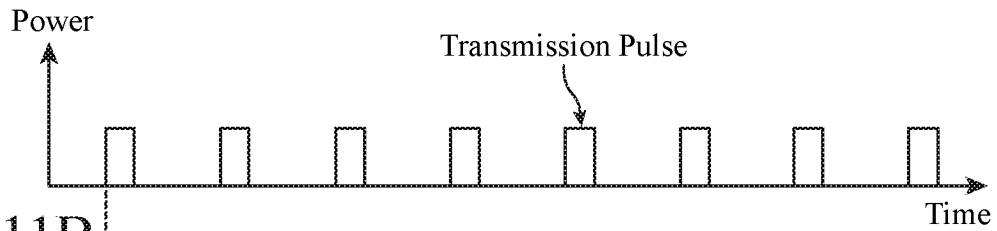
FIG. 11A is an explanatory diagram illustrating an example in which a transmission wave is a pulse train.
Figure 11B:
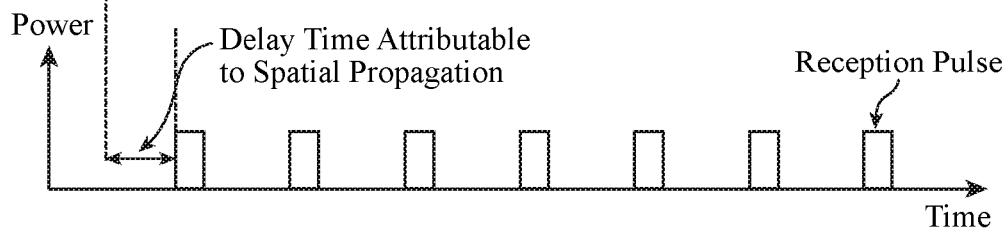
FIG. 11B is an explanatory diagram illustrating an example in which a reflection wave is a pulse train.

FIG. 11A is a diagram illustrating an example in which the transmission wave is a pulse train, and FIG. 11B is a diagram illustrating an example in which the reflection wave is a pulse train.

Figure 11C:
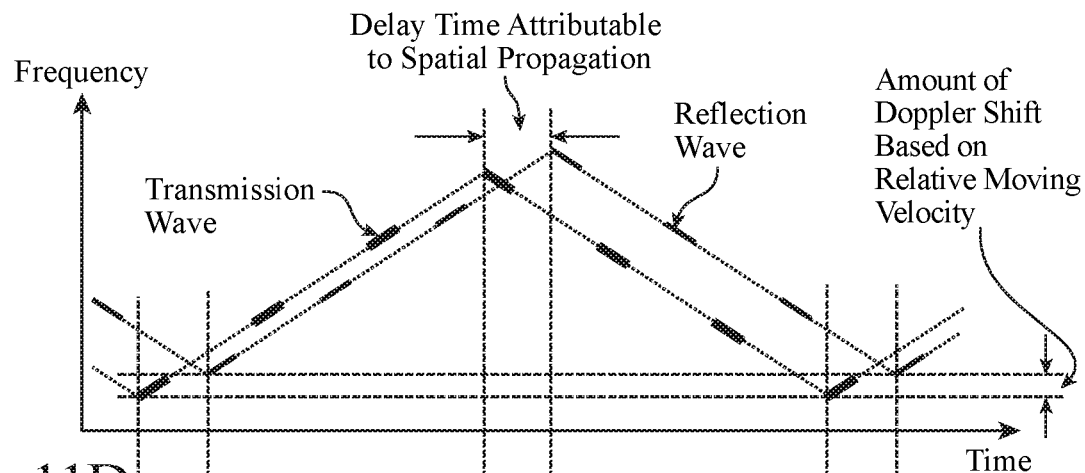
FIG. 11C is an explanatory diagram illustrating the transmission wave and the reflection wave frequencies of which change with time.
Figure 11D:
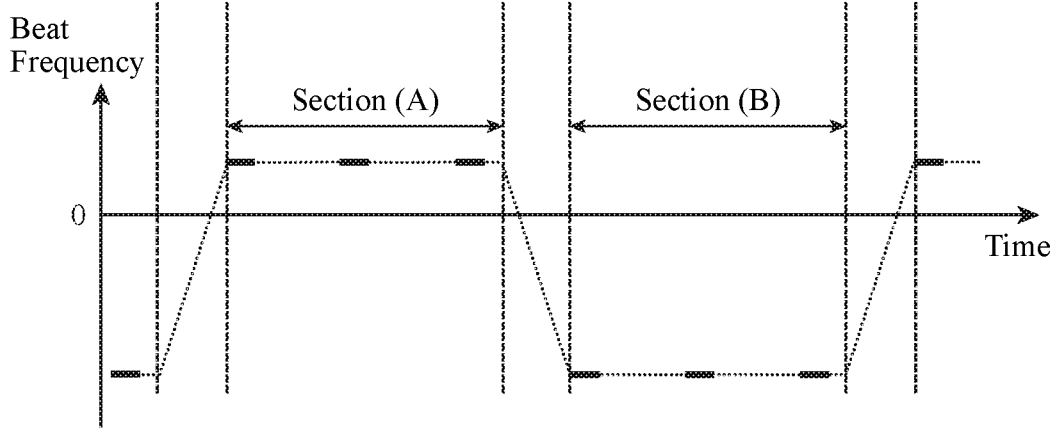
FIG. 11D is an explanatory diagram illustrating a beat signal a beat frequency of which changes with time.

In FIG. 11C the transmission wave and the reflection wave frequencies of which change with time are illustrated, and in FIG. 11D the beat signal a beat frequency of which changes with time is illustrated.

In the FMICW method, a transmission wave, which is a transmission signal generated by the transmission signal generating circuit 11, is a pulse train as illustrated in FIG. 11A, however, a transmission wave radiated from the transmission antenna 13 is subjected to frequency modulation similar to that of the FMCW method as illustrated in FIG. 11C.

Also, a reflection wave received by the reception antenna 15 is a pulse train accompanied by a propagation delay as illustrated in FIGS. 11B and 11C.

At this time, since also in the FMICW method the reflection wave received by the reception antenna 15 is subjected to the Doppler shift similarly to the case of the FMCW method, the reflection wave is delayed in terms of time, and a frequency of the reflection wave is shifted by the amount of the Doppler shift as illustrated in FIG. 11C.

In a beat signal extracting circuit 17, the difference between a frequency modulation component of the transmission signal output from the transmission signal generating circuit 11 and a frequency of a reception signal of the reflection wave output from a reception high-frequency circuit 16 is obtained, and this difference is the same as in the case of the FMCW method.

A beat signal which is an output signal of the beat signal extracting circuit 17 is a pulse train as illustrated in FIG. 11D, and this beat signal has a beat frequency similar to a beat signal in the case where the distance measurement method is the FMCW method.

Here, FIG. 12 is an explanatory diagram illustrating an output signal of the beat signal extracting circuit 17.

Figure 12A:
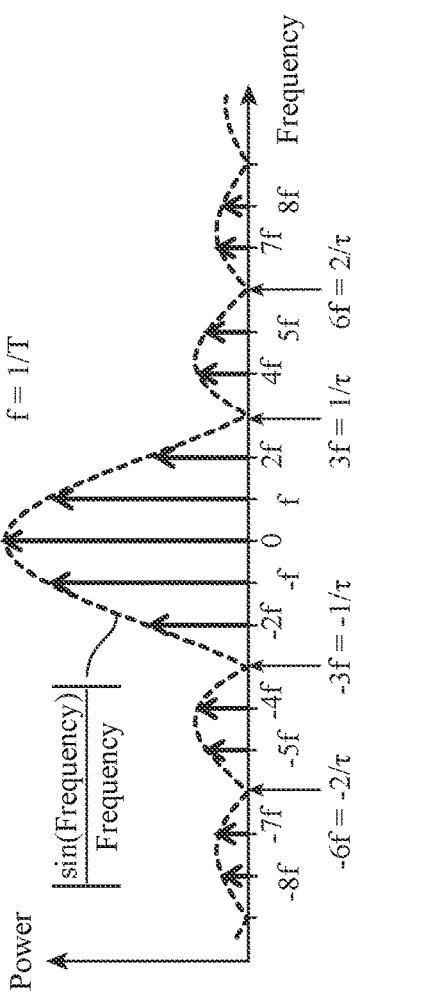
FIG. 12A is an explanatory diagram illustrating an output signal of a beat signal extracting circuit 17.
Figure 12B:
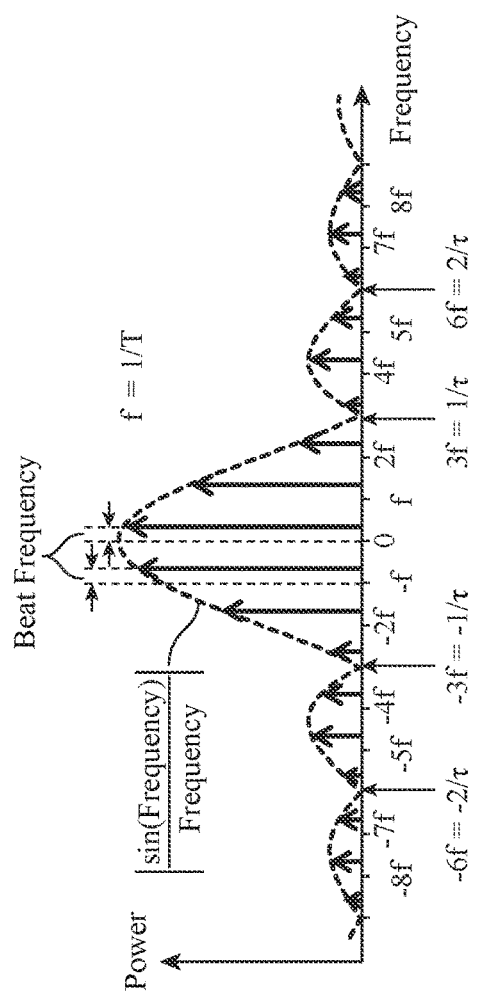
FIG. 12B is an explanatory diagram illustrating a spectrum in the case where there is no Doppler shift in a reflection wave.

FIG. 12A is a diagram illustrating an output signal of the beat signal extracting circuit 17, and FIG. 12B is a diagram illustrating the spectrum in the case where there is no Doppler shift in the reflection wave.

Figure 12D:
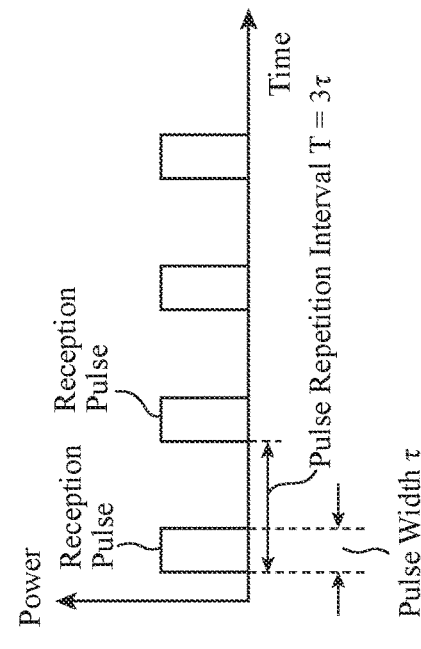
FIG. 12D is an enlarged explanatory diagram of the vicinity of a frequency of 0 Hz in FIG. 12C.
Figure 12C:
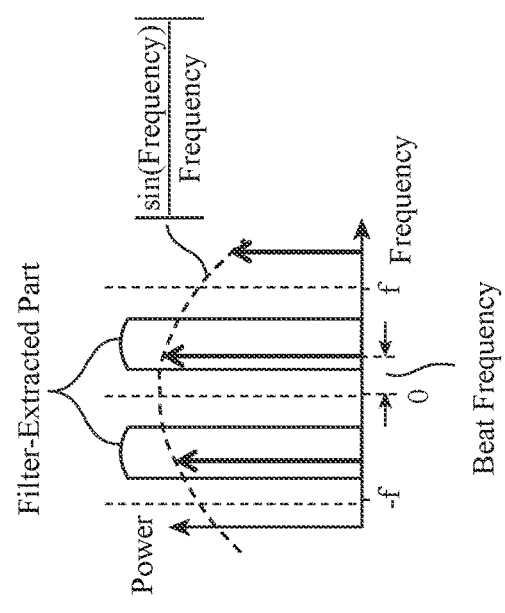
FIG. 12C is an explanatory diagram illustrating a spectrum in the case where there is Doppler shift in the reflection wave.

FIG. 12C is a diagram illustrating a spectrum in the case where a Doppler shift occurs in the reflection wave, and FIG. 12D is a diagram obtained by enlarging the vicinity of a frequency of 0 Hz in FIG. 12C.

Assuming that a pulse width of the pulse generated by the transmission signal generating circuit 11 is $\tau$ and that a pulse repetition interval is T=3$\tau$, if there is no Doppler shift in the reflection wave, a spectrum as illustrated in FIG. 12B is obtained.

An envelope of this spectrum is expressed as |sin(frequency)/frequency| with power becoming zero at a frequency interval of n/$\tau$, where n is any integer other than zero.

If a Doppler shift occurs in the reflection wave, a spectrum of the pulse train which is the reception signal of the reflection wave has an envelope with respect to the spectrum repeated every 1/T as illustrated in FIGS. 12C and 12D.

Figure 13:
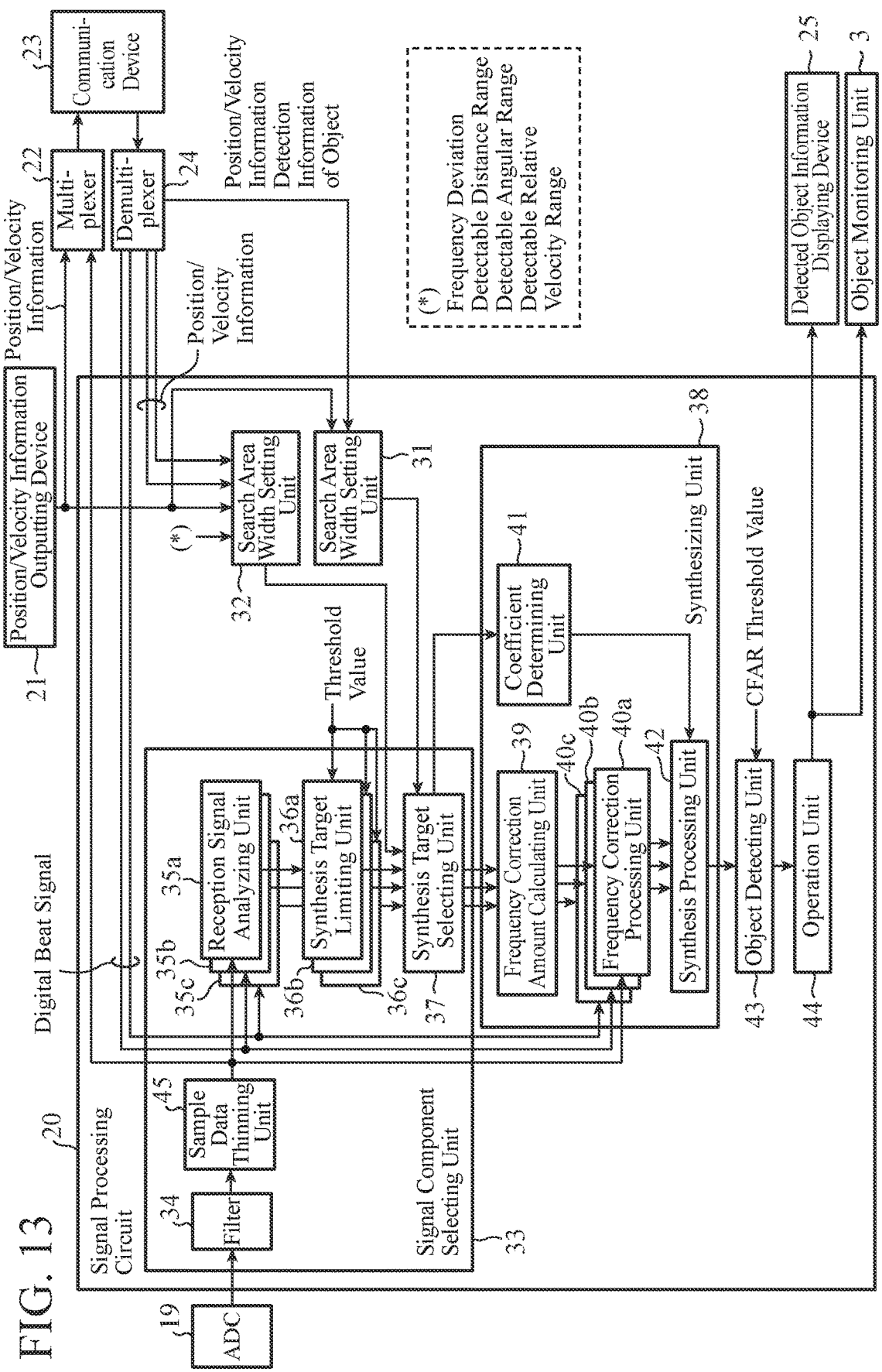
FIG. 13 is a configuration diagram illustrating a signal processing circuit 20 of an object detection device 1a according to a second embodiment of the invention.

A signal processing circuit 20 of the object detection device 1a according to the second embodiment has a configuration diagram of FIG. 13. Signal processing circuits 20 of the object detection devices 1b and 1c also have a configuration diagram of FIG. 13.

Figure 14:
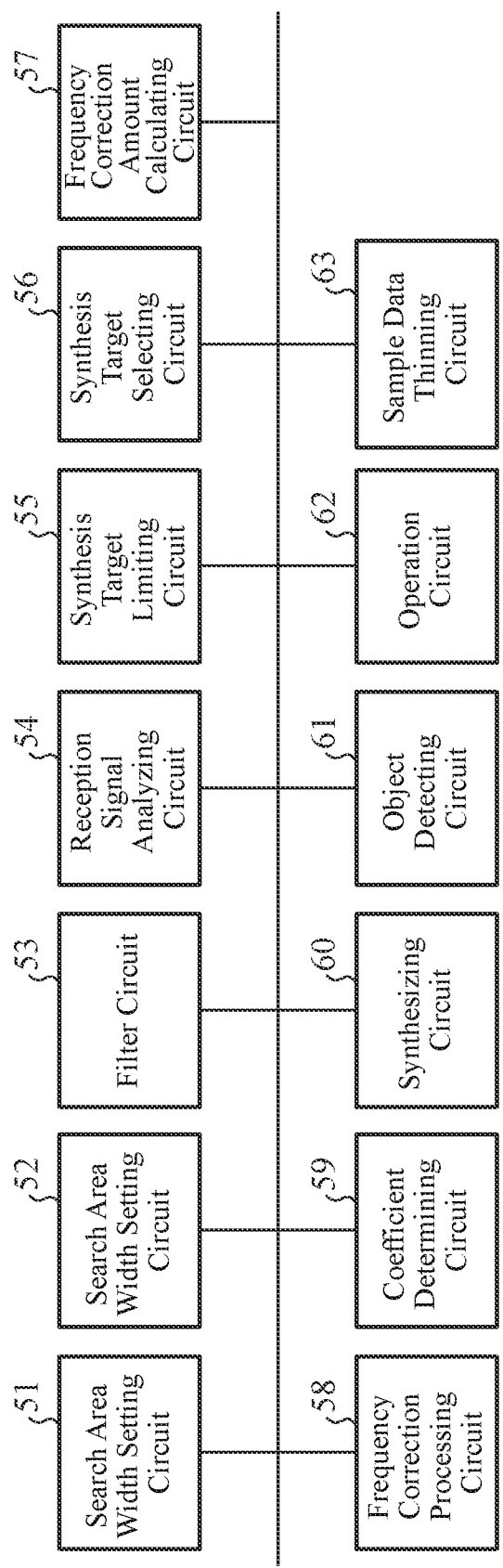
FIG. 14 is a hardware configuration diagram of the signal processing circuit 20 of the object detection device 1a according to the second embodiment of the invention.

FIG. 14 is a hardware configuration diagram of the signal processing circuit 20 of the object detection device 1a according to the second embodiment of the invention.

In FIGS. 13 and 14, the same symbol as that in FIGS. 5 and 6 represents the same or a corresponding part and thus descriptions thereon are omitted.

The pulse train which is the reflection wave having the spectrum as illustrated in FIGS. 12C and 12D is sampled by an ADC 19, and a digital beat signal, which is an output signal of the ADC 19, is input to a filter 34 of the signal processing circuit 20.

The filter 34 removes clutter included in the digital beat signal output from the ADC 19 like in the first embodiment.

However, in this second embodiment, a reflection wave is a pulse train. Therefore, the filter 34 removes clutter around 0 Hz and further removes a repeated part of spectra repeated for every 1/T. That is, the filter 34 extracts only a filter-extracted part illustrated in FIG. 12D.

A sample data thinning unit 45 is implemented by, for example, a semiconductor integrated circuit mounted with a CPU or a sample data thinning circuit 63 including a one-chip microcomputer or the like.

The sample data thinning unit 45 performs thinning processing for narrowing a representation band of the digital beat signal output from the filter 34 for the purpose of reducing the processing speed of signal processing in the subsequent stages.

In the signal processing circuit 20, signal processing in components other than the sample data thinning unit 45 is similar to that in the case of the FMCW method.

Third Embodiment

In the first embodiment, the example in which the object detection device 1a detects the object 2 by the distance measurement method called the FMCW method has been described.

In a third embodiment, an example in which an object detection device 1a detects an object 2 by a distance measurement method called a low pulse repetition frequency (LPRF) method will be described.

Figure 15:
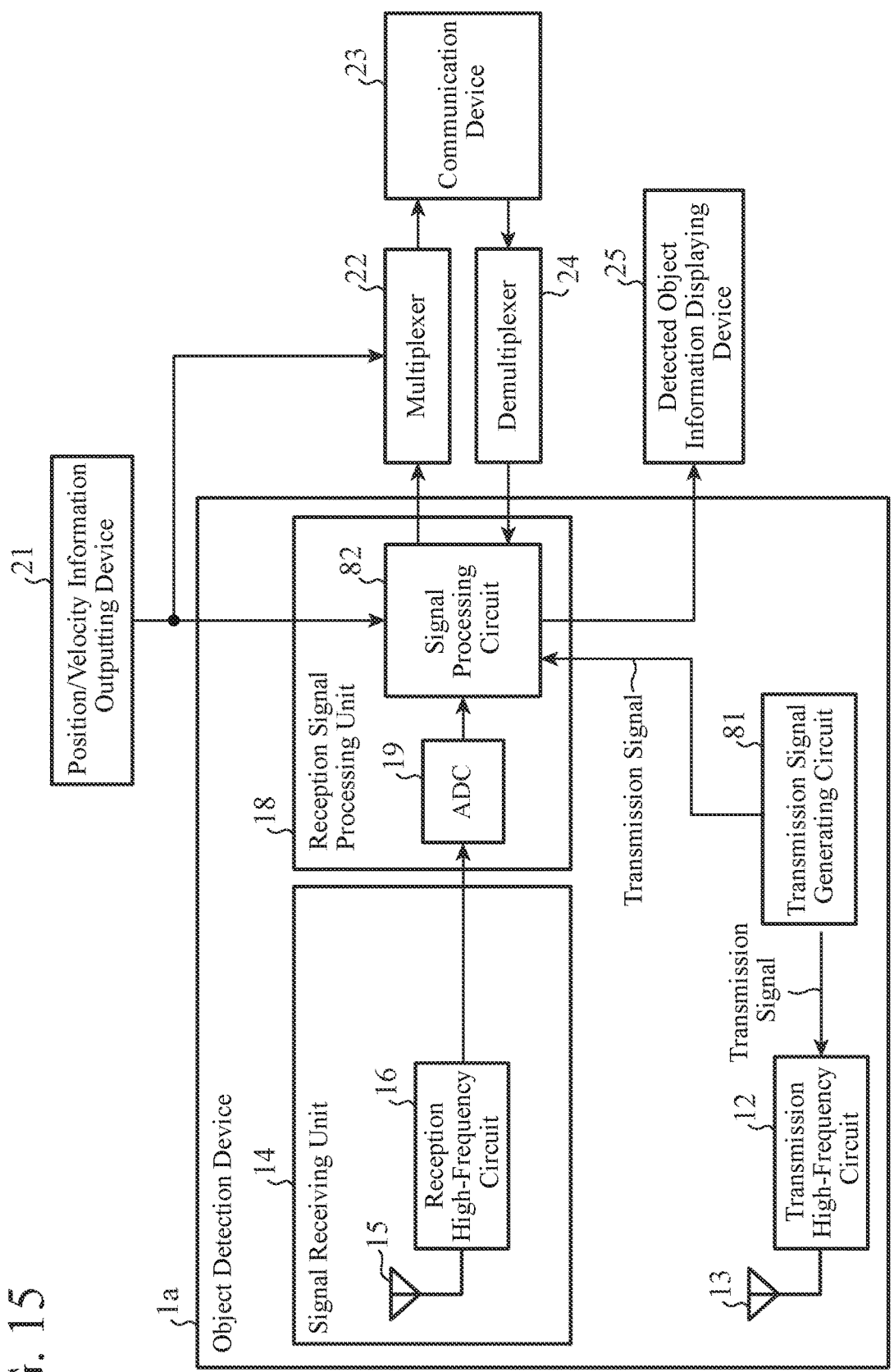
FIG. 15 is a configuration diagram illustrating an object detection device 1a according to a third embodiment of the invention.

FIG. 15 is a configuration diagram illustrating an object detection device 1a according to the third embodiment of the present invention. In FIG. 15, the same symbol as that in FIG. 3 represents the same or a corresponding part, and thus descriptions thereon are omitted.

Unlike the transmission signal generating circuit 11 of FIG. 3, the transmission signal generating circuit 81 periodically generates a pulse by performing phase modulation on a transmission signal and outputs the pulse to a transmission high-frequency circuit 12 and a signal processing circuit 82 as a transmission signal.

The signal processing circuit 82 performs processing for detecting an object 2 to be detected from a digital reception signal output from an ADC 19 or a digital reception signal transmitted from object detection devices 1b and 1c, which are other object detection devices.

FIG. 16 is an explanatory diagram illustrating a transmission wave, a reflection wave, and a range output in the LPRF.

Figure 16A:
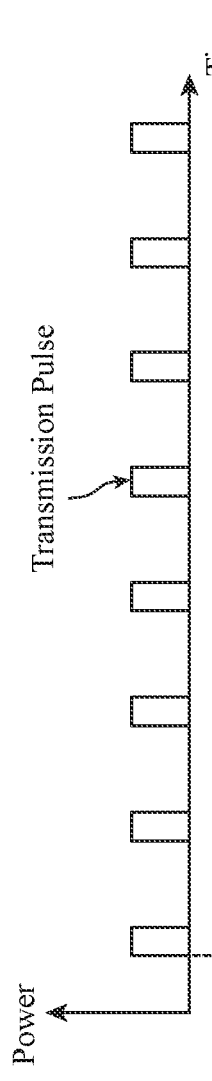
FIG. 16A is an explanatory diagram illustrating an example in which a transmission wave is a pulse train.
Figure 16B:
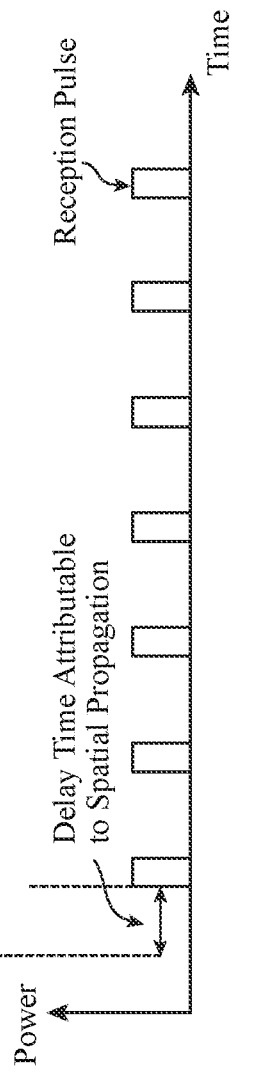
FIG. 16B is an explanatory diagram illustrating an example in which a reflection wave is a pulse train.

FIG. 16A is a diagram illustrating an example in which the transmission wave is a pulse train, and FIG. 16B is a diagram illustrating an example in which the reflection wave is a pulse train.

Figure 16C:
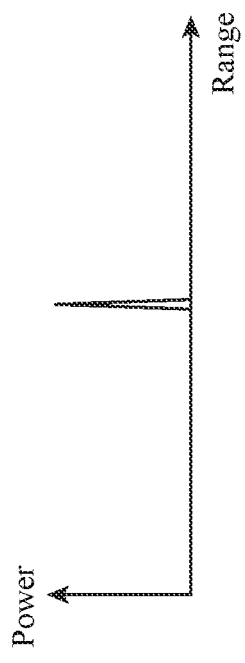
FIG. 16C is an explanatory diagram illustrating a range profile calculated from transmission time and reception time of a pulse.

FIG. 16C is a diagram illustrating a range profile calculated from transmission time and reception time of the pulse.

The range profile is a signal power sequence system in the range direction, and a range component (signal component) in a range in which the object 2 to be detected is present appears in the range profile.

Figure 17:
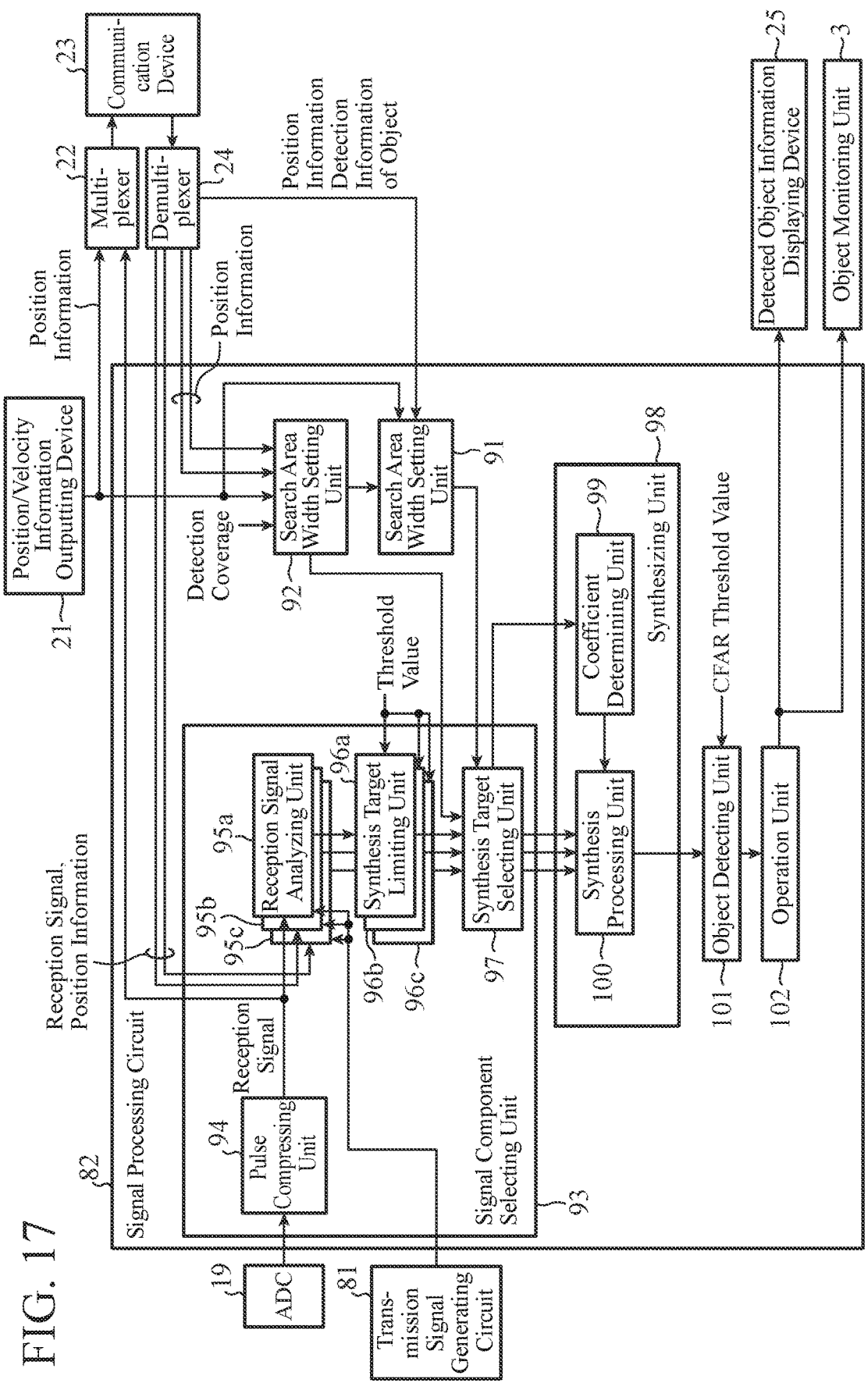
FIG. 17 is a configuration diagram illustrating a signal processing circuit 82 of the object detection device 1a according to the third embodiment of the invention.
Figure 18:
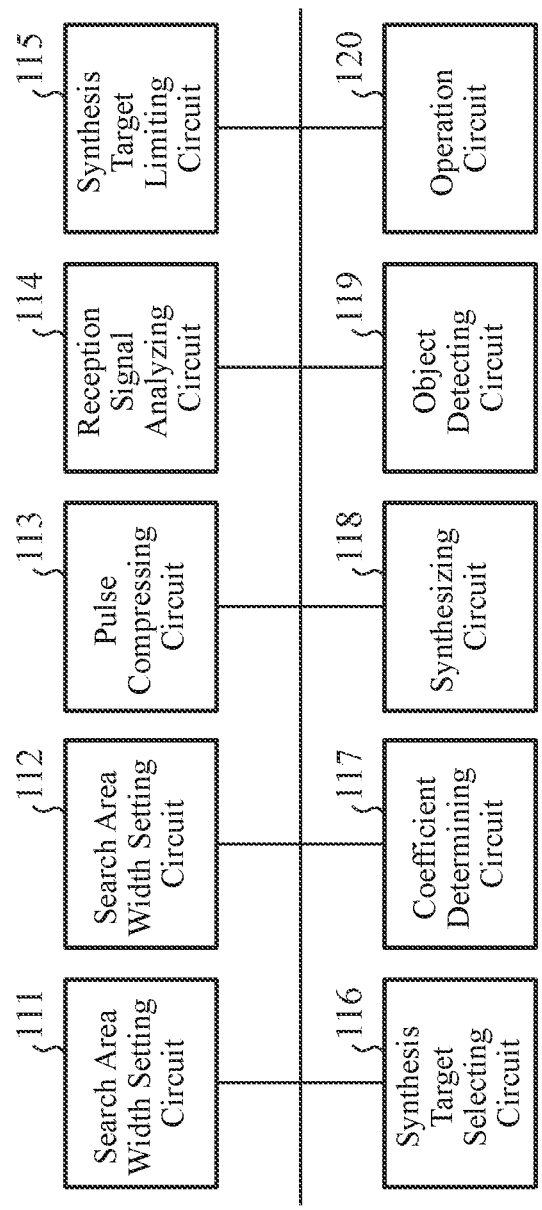
FIG. 18 is a hardware configuration diagram of the signal processing circuit 82 of the object detection device 1a according to the third embodiment of the invention.

FIG. 17 is a configuration diagram illustrating the signal processing circuit 82 of the object detection device 1a according to the third embodiment of the present invention, and FIG. 18 is a hardware configuration of the signal processing circuit 82 of the object detection device 1a according to the third embodiment of the present invention.

A search area width setting unit 91 is implemented by a search area width setting circuit 111, for example.

The search area width setting unit 91 is a first search area width setting unit for setting a search area width of a range corresponding to the range component of the object 2 using the detection information of the object 2 output from a demultiplexer 24.

That is, the search area width setting unit 91 sets the search area width of a range corresponding to a range component of the object 2 using the position the object detection device 1a indicated by position information output from the position/velocity information outputting device 21, the positions of the object detection devices 1b and 1c indicated by position information output from a demultiplexer 24, and the position of the object 2 indicated by the detection information of the object 2 output from the demultiplexer 24.

In the first and second embodiments, the position/velocity information outputting device 21 outputs the position/velocity information indicating the position and the velocity of the object detection device 1a, however in the third embodiment, the position/velocity information outputting device 21 outputs the position information indicating the position of the object detection device 1a.

Furthermore, in the first and second embodiments, the demultiplexer 24 outputs the position/velocity information indicating the positions and the velocities of the object detection devices 1b and 1c, however, in the third embodiment, the demultiplexer 24 outputs the position information indicating the positions of the object detection devices 1b and 1c.

A search area width setting unit 92 is implemented by a search area width setting circuit 112, for example, and is a second search area width setting unit for setting a search area width of a frequency corresponding to the range component of the object 2.

That is, the search area width setting unit 92 sets the search area width of a range using the position of the object detection device 1a indicated by the position information output from the position/velocity information outputting device 21, the positions of the object detection devices 1b and 1c indicated by the position information output from the demultiplexer 24, and detection coverages of the object detection devices 1a, 1b, and 1c.

A signal component selecting unit 93 includes a pulse compressing unit 94, reception signal analyzing units 95a, 95b, and 95c, synthesis target limiting units 96a, 96b, and 96c, and a synthesis target selecting unit 97.

The signal component selecting unit 93 performs processing for calculating a range profile from the digital reception signal output from the ADC 19 and also calculating range profiles from reception signals output from the demultiplexer 24, that is, reception signals output from pulse compressing units 94 of the object detection devices 1b and 1c.

Moreover, the signal component selecting unit 93 performs processing for determining a search area having the search area width set by the search area width setting unit 91 when the detection information of the object 2 is obtained or, when the detection information of the object 2 cannot be obtained, determining a search area having the search area width set by the search area width setting unit 92.

The signal component selecting unit 93 further performs processing for selecting a range component a range of which is included in the search area from each of the digital reception signal output from the ADC 19 and the reception signals output from the demultiplexer 24.

The pulse compressing unit 94 is implemented by a pulse compressing circuit 113 having a delay time characteristic, for example, and performs processing for demodulating the reception signal which is the pulse train illustrated in FIG. 16B by performing pulse compression on the digital reception signal output from the ADC 19.

The reception signal analyzing units 95a, 95b, and 95c are implemented by a reception signal analyzing circuit 114, for example.

The reception signal analyzing unit 95a performs processing for calculating the range profile illustrated in FIG. 16C from a time difference between time when the transmission signal is output from the transmission signal generating circuit 81 and time when the reception signal is output from the pulse compressing unit 94.

The reception signal analyzing units 95b and 95c perform processing for calculating the range profile illustrated in FIG. 16C from a time difference between time when the transmission signal is output from the transmission signal generating circuit 81 and time when reception signals are output from the demultiplexer 24, that is, time when the reception signals are output from the pulse compressing units 94 of the object detection devices 1b and 1c.

Although, in the third embodiment, the signal processing circuit 82 includes three reception signal analyzing units 95 since three object detection devices 1 are assumed, in a case where there are N (N is an integer larger than or equal to 2) object detection devices 1, a signal processing circuit 82 includes N reception signal analyzing units 95.

The synthesis target limiting units 96a, 96b, and 96c are implemented by, for example, a synthesis target limiting circuit 115.

The synthesis target limiting unit 96a performs processing for comparing range components of a plurality of ranges included in the range profile calculated by the reception signal analyzing unit 95a with a preset threshold value and selecting, from the plurality of range components, a range component larger than the threshold value.

The synthesis target limiting unit 96b performs processing for comparing range components of a plurality of ranges included in the range profile calculated by the reception signal analyzing unit 95b with a preset threshold value and selecting, from the plurality of range components, a range component larger than the threshold value.

The synthesis target limiting unit 96c performs processing for comparing range components of a plurality of ranges included in the range profile calculated by the reception signal analyzing unit 95c with a preset threshold value and selecting, from the plurality of range components, a range component larger than the threshold value.

Although, in the third embodiment, the signal processing circuit 82 includes three synthesis target limiting units 96 since three object detection devices 1 are assumed, in a case where there are N (N is an integer larger than or equal to 2) object detection devices 1, a signal processing circuit 82 includes N synthesis target limiting units 96.

The synthesis target selecting unit 97 is implemented by, for example, a synthesis target selecting circuit 116.

When the detection information of the object 2 is obtained, the synthesis target selecting unit 97 performs processing for determining a search area having the search area width set by the search area width setting unit 91 as a search area of a range for the object detection devices 1a, 1b, and 1c.

When the detection information of the object 2 is not obtained, the synthesis target selecting unit 97 performs processing for determining a search area having the search area width set by the search area width setting unit 92 as a search area of a range for the object detection devices 1a, 1b, and 1c.

The synthesis target selecting unit 97 also performs processing for selecting a relatively large range component from among range components a range of which is included in the search area out of the range components selected by the synthesis target limiting units 96a, 96b, and 96c.

A synthesizing unit 98 includes a coefficient determining unit 99 and a synthesis processing unit 100.

The synthesizing unit 98 performs processing for combining a plurality of range components each selected by the signal component selecting unit 93.

The coefficient determining unit 99 is implemented by a coefficient determining circuit 117, for example.

The coefficient determining unit 99 performs processing for determining a weighting coefficient for combining a plurality of range components each selected by the synthesis target selecting unit 97 from the amplitudes and the phases of the plurality of range components each selected by the synthesis target selecting unit 97.

The synthesis processing unit 100 is implemented by, for example, a synthesizing circuit 118.

The synthesis processing unit 100 performs processing for combining the plurality of range components each selected by the synthesis target selecting unit 97 using the weighting coefficients determined by the coefficient determining unit 99.

An object detecting unit 101 is implemented by an object detecting circuit 119, for example and detects the object 2 by performing the CFAR processing on the range component combined by the synthesis processing unit 100 of the synthesizing unit 98.

The operation unit 102 is implemented by an operation circuit 120, for example and performs processing for calculating the distance to the object 2 detected by the object detecting unit 101 and outputting the calculated distance to a detected object information displaying device 25 and an object monitoring unit 3.

In FIG. 17, it is assumed that the search area width setting units 91 and 92, the pulse compressing unit 94, the reception signal analyzing units 95a, 95b and 95c, the synthesis target limiting units 96a, 96b, and 96c, the synthesis target selecting unit 97, the coefficient determining unit 99, the synthesis processing unit 100, the object detecting unit 101, and the operation unit 102, which are components of the signal processing circuit 82, are configured by dedicated hardware as illustrated in FIG. 18, that is, the search area width setting circuits 111 and 112, the pulse compressing circuit 113, the reception signal analyzing circuit 114, the synthesis target limiting circuit 115, the synthesis target selecting circuit 116, the coefficient determining circuit 117, the synthesizing circuit 118, the object detecting circuit 119, and the operation circuit 120.

Here, the search area width setting circuits 111 and 112, the pulse compressing circuit 113, the reception signal analyzing circuit 114, the synthesis target limiting circuit 115, the synthesis target selecting circuit 116, the coefficient determining circuit 117, the synthesizing circuit 118, the object detecting circuit 119, and the operation circuit 120 may be a single circuit, a composite circuit, a programmed processor, a parallel-programmed processor, an ASIC, an FPGA, or a combination thereof.

The components of the signal processing circuit 82 are not limited to those implemented by dedicated hardware, and the signal processing circuit 82 may be implemented by software, firmware, or a combination of software and firmware.

In the case where the signal processing circuit 82 is implemented by software, firmware, or the like, it is only required that a program for causing a computer to execute processing procedures of the search area width setting units 91 and 92, the pulse compressing unit 94, the reception signal analyzing units 95a, 95b and 95c, the synthesis target limiting units 96a, 96b, and 96c, the synthesis target selecting unit 97, the coefficient determining unit 99, the synthesis processing unit 100, the object detecting unit 101, and the operation unit 102 be stored in the memory 71 illustrated in FIG. 7 and that the processor 72 illustrated in FIG. 7 execute the program stored in the memory 71.

Figure 19:
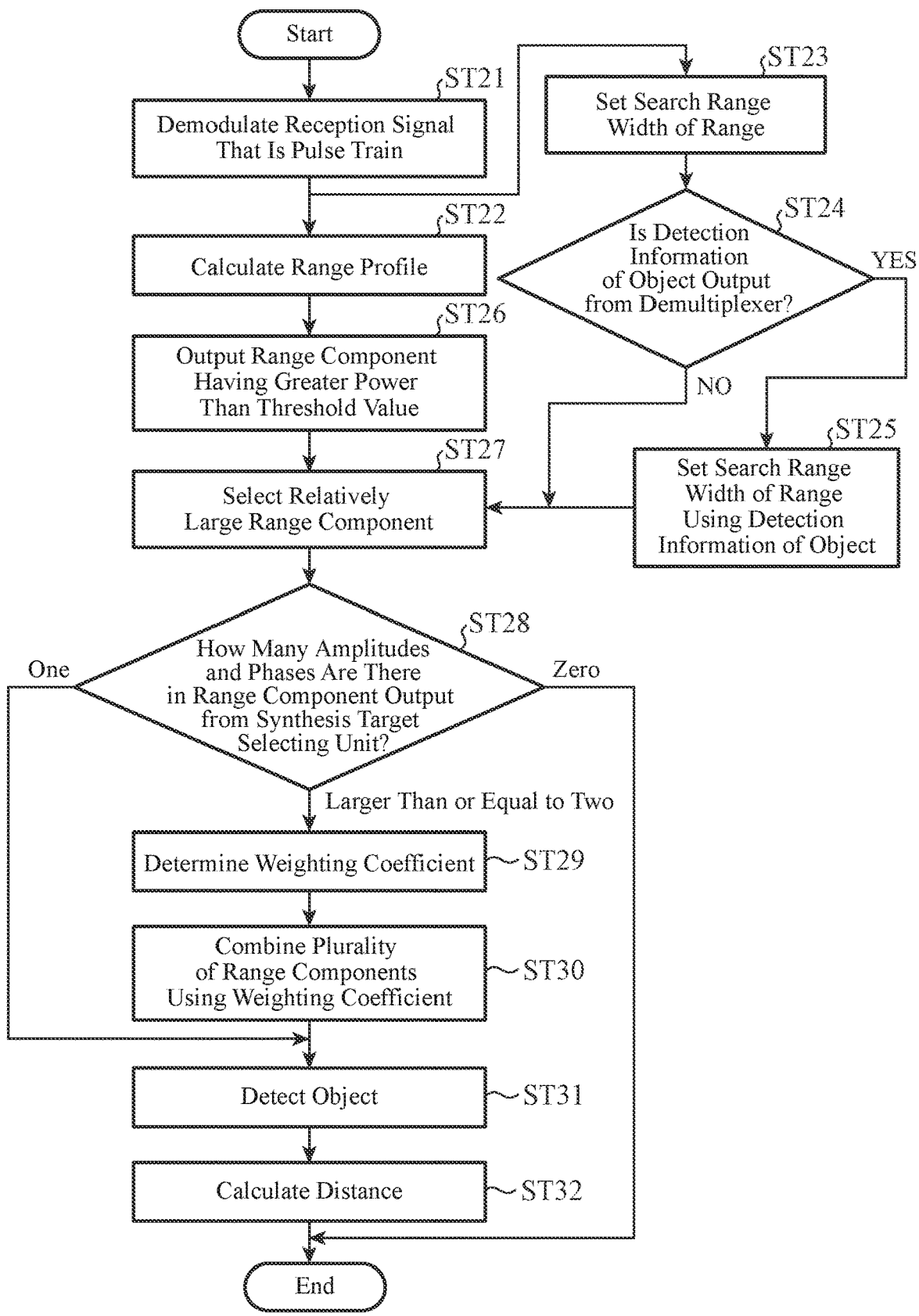

FIG. 19 is a flowchart illustrating a part of an object detection method which is a processing procedure in the case where the signal processing circuit 82 is implemented by software, firmware, or the like.

FIG. 18 illustrates the example in which each of the components of the signal processing circuit 82 is implemented by dedicated hardware, and FIG. 7 illustrates the example in which the signal processing circuit 82 is implemented by software, firmware, or the like. However, some of the components of the signal processing circuit 82 may be implemented by dedicated hardware while the rest of the components are implemented by software, firmware, or the like.

Next, the operation will be described.

The transmission signal generating circuit 81 of the object detection device 1a generates the transmission signal of the pulse as illustrated in FIG. 16 and outputs the transmission signal to the transmission high-frequency circuit 12 and the signal processing circuit 82.

When receiving the transmission signal from the transmission signal generating circuit 81, the transmission high-frequency circuit 12 of the object detection device 1a performs frequency conversion processing for converting the frequency of the transmission signal into a carrier frequency, filtering processing for removing an out-of-band frequency or spurious of the transmission signal, power amplification processing for amplifying the power of the transmission signal, and other processing and outputs the transmission signal having been subjected to the above processing to the transmission antenna 13 as a transmission wave.

As a result, a transmission wave is radiated to space from the transmission antenna 13 of the object detection device 1a.

After the transmission wave is radiated from the transmission antenna 13 to space, the reception antenna 15 of the object detection device 1a receives a reflection wave of the transmission wave reflected by and returning from the object 2 to be detected and outputs a reception signal of the reflection wave to the reception high-frequency circuit 16.

When receiving the reception signal from the reception antenna 15, the reception high-frequency circuit 16 of the object detection device 1a performs frequency conversion processing for converting the frequency of the reception signal into, for example, an IF frequency, filter processing for removing an undesired frequency included in the reception signal or an image at the time of frequency conversion, power amplification processing for amplifying the power of the reception signal, and other processing and outputs the reception signal after the processing to the ADC 19 of the reception signal processing unit 18.

When having received the reception signal from the reception high-frequency circuit 16, the ADC 19 of the reception signal processing unit 18 in the object detection device 1a converts the reception signal into a digital signal and outputs the digital reception signal to the signal processing circuit 82.

The pulse compressing unit 94 of the signal processing circuit 82 in the object detection device 1a demodulates the reception signal which is the pulse train illustrated in FIG. 16B by performing pulse compression on the digital reception signal output from the ADC 19. (step ST21 in FIG. 19).

The reception signal demodulated by the pulse compressing unit 94 is output to the reception signal analyzing unit 95a and a multiplexer 22.

The position/velocity information outputting device 21 connected to the object detection device 1a detects the position of the object detection device 1a and outputs the position information indicating the position of the object detection device 1a to the search area width setting units 91 and 92 of the signal processing circuit 82 and the multiplexer 22.

The multiplexer 22 connected to the object detection device 1a multiplexes the reception signal output from the pulse compressing unit 94 and the position information output from the position/velocity information outputting device 21 and outputs the multiplexed signal including the reception signal and the position information to the communication device 23.

When having received the multiplexed signal from the multiplexer 22, the communication device 23 transmits the multiplexed signal to the object detection devices 1b and 1c.

That is, in the case where the object detection devices 1b and 1c combine a plurality of range components like the object detection device 1a does and perform detection processing of the object 2 from the synthesized signal, the communication device 23 transmits the multiplexed signal to the object detection devices 1b and 1c.

However, for the sake of simplicity of explanation, in the third embodiment it is assumed that only the object detection device 1a performs the detection processing of the object 2 and that the object detection devices 1b and 1c do not perform the detection processing of the object 2, and thus there is no need for the communication device 23 to transmit the multiplexed signal to the object detection devices 1b and 1c.

Communication devices 23 of the object detection devices 1b and 1c transmit multiplexed signals including the digital beat signal and the position information to the object detection device 1a that performs the detection processing of the object 2.

The communication device 23 receives the multiplexed signals transmitted from the object detection devices 1b and 1c which are the other object detection devices.

In a situation where a radar device or devices other than the object detection devices 1a, 1b, or 1c can monitor the detection information of the object 2, the communication device 23 receives the detection information of the object 2 transmitted from the radar device or devices other than the object detection devices 1a, 1b, or 1c When the communication device 23 receives the multiplexed signal transmitted from the object detection device 1b, the demultiplexer 24 connected to the object detection device 1a demultiplexes the multiplexed signal and outputs the reception signal included in the multiplexed signal to the reception signal analyzing unit 95b of the signal processing circuit 82.

Furthermore, the demultiplexer 24 connected to the object detection device 1a outputs the position information included in the multiplexed signal to the search area width setting units 91 and 92 of the signal processing circuit 82.

When the communication device 23 receives the multiplexed signal transmitted from the object detection device 1c, the demultiplexer 24 connected to the object detection device 1a demultiplexes the multiplexed signal and outputs the reception signal included in the multiplexed signal to the reception signal analyzing unit 95c of the signal processing circuit 82.

Furthermore, the demultiplexer 24 connected to the object detection device 1a outputs the position information included in the multiplexed signal to the search area width setting units 91 and 92 of the signal processing circuit 82.

When the communication device 23 receives the detection information of the object 2 transmitted from a radar device or devices other than the object detection devices 1a, 1b, or 1c, the demultiplexer 24 connected to the object detection device 1a outputs the detection information of the object 2 to the search area width setting unit 91 of the signal processing circuit 82.

When having received a transmission signal from the transmission signal generating circuit 81 and the reception signal from the pulse compressing unit 94, the reception signal analyzing unit 95a of the signal processing circuit 82 in the object detection device 1a calculates a time difference $(T_{ra}-T_s)$ between time $T_s$ when the transmission signal is output from the transmission signal generating circuit 81 and time $T_{ra}$ when the reception signal is output from the pulse compressing unit 94, that is, delay time $T_a$ associated with the spatial propagation.

Then, the reception signal analyzing unit 95a calculates the range profile as illustrated in FIG. 16C by calculating the distance $r_a$ from the object detection device 1a to the object 2 from the delay time $T_a$ associated with the spatial propagation and the light speed c which is a propagation velocity of the transmission wave as expressed in the following equation (46) (step ST22 in FIG. 19).

$$r_a = \frac{T_a \times c}{2} \quad (46)$$

When having received the transmission signal from the transmission signal generating circuit 81 and the reception signal included in the multiplexed signal of the object detection device 1b from the demultiplexer 24, the reception signal analyzing unit 95b of the signal processing circuit 82 in the object detection device 1a calculates a time difference $(T_{rb}-T_s)$ between time $T_s$ when the transmission signal is output from the transmission signal generating circuit 81 and time $T_{rb}$ when the reception signal is output from the demultiplexer 24, that is, delay time $T_b$ associated with the spatial propagation.

Here, for the sake of simplicity of explanation, the reception signal analyzing unit 95b ignores communication time $T_1$ of the multiplexed signal transmitted from the communication device 23 of the object detection device 1b to the communication device 23 of the object detection device 1a and time $T_2$ for demultiplexing the multiplexed signal in the demultiplexer 24 connected to the object detection device 1a.

Therefore, in the reception signal analyzing unit 95b, the time $T_{rb}$ when the reception signal is output from the demultiplexer 24 and the time when the reception signal is output from the pulse compressing unit 94 of the object detection device 1b are assumed to be the same.

If the communication time $T_1$ of the multiplexed signal and the time $T_2$ of demultiplexing the multiplexed signal are known in the reception signal analyzing unit 95b, it is sufficient to regard time when the reception signal is output from the pulse compressing unit 94 of the object detection device 1b as time $(T_{rb}-(T_1+T_2))$ which is earlier than the time $T_{rb}$ when the reception signal is output from the demultiplexer 24 by the sum $(T_1+T_2)$ of the communication time $T_1$ of the multiplexed signal and the time $T_2$ for demultiplexing the multiplexed signal.

Then, the reception signal analyzing unit 95b calculates the range profile as illustrated in FIG. 16 by calculating the distance b from the object detection device 1b to the object 2 from the delay time $T_b$ associated with the spatial propagation, the light speed c which is a propagation velocity of the transmission wave, and the distance $r_a$ from the object detection device 1a to the object 2 as expressed in the following equation (47) (step ST22 in FIG. 19).

$$r_b = T_b \times c - r_a \quad (47)$$

When having received the transmission signal from the transmission signal generating circuit 81 and the reception signal included in the multiplexed signal of the object detection device 1c from the demultiplexer 24, the reception signal analyzing unit 95c of the signal processing circuit 82 in the object detection device 1a calculates a time difference $(T_{rc}-T_s)$ between time $T_s$ when the transmission signal is output from the transmission signal generating circuit 81 and time $T_{rc}$ when the reception signal is output from the demultiplexer 24, that is, delay time $T_c$ associated with the spatial propagation.

Here, for the sake of simplicity of explanation, the reception signal analyzing unit 95c ignores communication time $T_3$ of the multiplexed signal transmitted from the communication device 23 of the object detection device 1c to the communication device 23 of the object detection device 1a and time $T_2$ for demultiplexing the multiplexed signal in the demultiplexer 24 connected to the object detection device 1a.

Therefore, in the reception signal analyzing unit 95c, the time $T_{rc}$ when the reception signal is output from the demultiplexer 24 and the time when the reception signal is output from the pulse compressing unit 94 of the object detection device 1c are assumed to be the same.

If the communication time $T_3$ of the multiplexed signal and the time $T_2$ of demultiplexing the multiplexed signal are known in the reception signal analyzing unit 95c, it is sufficient to regard time when the reception signal is output from the pulse compressing unit 94 of the object detection device 1c as time $(T_{rc}-(T_3+T_2))$ which is earlier than the time $T_{rc}$ when the reception signal is output from the demultiplexer 24 by the sum $(T_3+T_2)$ of the communication time $T_3$ of the multiplexed signal and the time $T_2$ for demultiplexing the multiplexed signal.

Then, the reception signal analyzing unit 95c calculates the range profile as illustrated in FIG. 16 by calculating the distance $r_c$ from the object detection device 1c to the object 2 from the delay time $T_c$ associated with the spatial propagation, the light speed c which is a propagation velocity of the transmission wave, and the distance $r_a$ from the object detection device 1a to the object 2 as expressed in the following equation (48) (step ST22 in FIG. 19).

$$r_c = T_c \times c - r_a \quad (48)$$

The range profiles calculated by the reception signal analyzing units 95a, 95b, and 95c include not only information of amplitude or power of the reception signals but also phase information.

The search area width setting unit 92 of the signal processing circuit 82 in the object detection device 1a sets the search area width of a range using the position of the object detection device 1a indicated by the position information output from the position/velocity information outputting device 21, the positions of the object detection devices 1b and 1c indicated by the position information output from the demultiplexer 24, and detection coverages of the object detection devices 1a, 1b, and 1c (step ST23 in FIG. 19).

Figure 20:
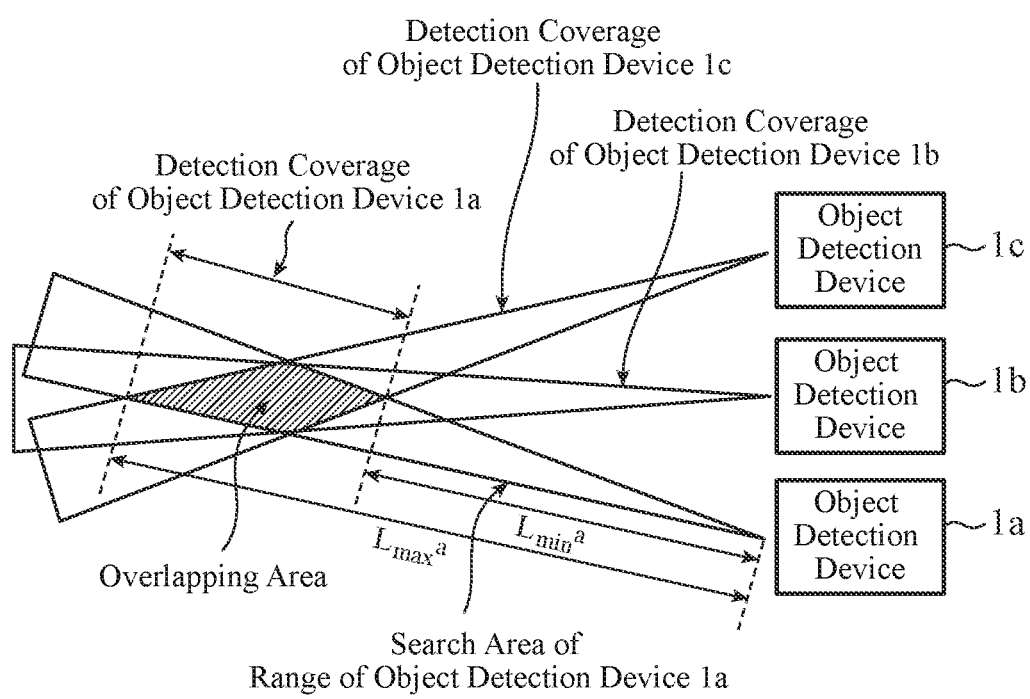

Here, FIG. 20 is an explanatory diagram illustrating a search area of a range for the object detection device 1a.

Hereinafter, processing for setting a search area width by the search area width setting unit 92 will be specifically described.

In this third embodiment, it is assumed that detection coverages of the object detection devices 1a, 1b, and 1c are known.

The detection coverages of the object detection devices 1a, 1b, and 1c are coverages over which the object detection devices 1a, 1b, and 1c can detect the object 2 and have a triangular shape in the example of FIG. 20.

The search area width setting unit 92 calculates an area where the detection coverages of the object detection devices 1a, 1b, and 1c overlap from the position of the object detection device 1a, positions of the object detection devices 1b and 1c, and the detection coverages of the object detection devices 1a, 1b, and 1c.

In the example of FIG. 20, the hatched area is the area where the detection coverages of the object detection devices $1a$, $1b$, and $1c$ overlap. Hereinafter, the area where the detection coverages of the object detection devices $1a$, $1b$, and $1c$ overlap is referred to as an overlapping area.

After calculating the overlapping area, the search area width setting unit 92 sets a search area width $\Delta R_\alpha^a$ of a range for the object detection device $1a$ from the overlapping area.

That is, the search area width setting unit 92 specifies a distance $L_{min}^a$ from the object detection device $1a$ to the position closest thereto in the overlapping area.

The search area width setting unit 92 also specifies a distance $L_{max}^a$ from the object detection device $1a$ to a position farthest therefrom in the overlapping area.

Then, the search area width setting unit 92 sets $|L_{max}^a - L_{min}^a|$ as the search area width $\Delta R_\alpha^a$ of a range for the object detection device $1a$.

Note that the distance $L_{min}^a$ corresponds to the minimum value of the search area of a range of the object detection device $1a$, and the distance $L_{max}^a$ corresponds to the maximum value of the search area of a range of the object detection device $1a$.

Moreover, the search area width setting unit 92 sets search area widths of ranges $\Delta R_\alpha^b$ and $\Delta R_\alpha^c$ for the object detection devices $1b$ and $1c$ from the overlapping area.

That is, the search area width setting unit 92 specifies distances $L_{min}^b$ and $L_{min}^c$ from the object detection devices $1b$ and $1c$ to the positions closest thereto in the overlapping area.

In addition, the search area width setting unit 92 specifies distances $L_{max}^b$ and $L_{max}^c$ from the object detection devices $1b$ and $1c$ to the positions farthest therefrom in the overlapping area.

Then, the search area width setting unit 92 sets $|L_{max}^b - L_{min}^b|$ and $|L_{max}^c - L_{min}^c|$ as the search area widths of ranges $\Delta R_\alpha^b$ and $\Delta R_\alpha^c$ of the object detection devices $1b$ and $1c$.

Note that the distance $L_{min}^b$ corresponds to the minimum value of the search area of a range of the object detection device $1b$, and the distance $L_{max}^b$ corresponds to the maximum value of the search area of a range of the object detection device $1b$. The distance $L_{min}^c$ corresponds to the minimum value of the search area of a range of the object detection device $1c$, and the distance $L_{max}^c$ corresponds to the maximum value of the search area of a range of the object detection device $1c$.

In a case where a radar device or devices other than the object detection devices $1a$, $1b$, or $1c$ can monitor the detection information of the object 2, the search area width setting unit 91 of the signal processing circuit 82 in the object detection device $1a$ acquires the detection information of the object 2 when the detection information of the object 2 is output from the demultiplexer 24 (step ST24 in FIG. 19: YES).

When acquiring the detection information of the object 2, the search area width setting unit 91 sets the search area widths of ranges of the object detection devices $1a$, $1b$, and $1c$ by using the detection information of the object 2 (step ST25 in FIG. 19).

If no detection information of the object 2 is output from the demultiplexer 24 (step ST24 in FIG. 19: NO), the search area width setting unit 91 does not perform the processing for setting the search area width of a range.

Hereinafter, processing for setting a search area width of a range by the search area width setting unit 91 will be specifically described.

From the position of the object 2 included in the detection information of the object 2 and the position of the object detection device $1a$ indicated by the position information output from the position/velocity information outputting device 21, the search area width setting unit 91 calculates the distance Ra between the object detection device $1a$ and the object 2.

From the position of the object 2 included in the detection information of the object 2 and the position of the object detection device $1b$ indicated by the position information output from the demultiplexer 24, the search area width setting unit 91 also calculates the distance Rb between the object detection device $1b$ and the object 2.

Moreover, from the position of the object 2 included in the detection information of the object 2 and the position of the object detection device $1c$ indicated by the position information output from the demultiplexer 24, the search area width setting unit 91 also calculates the distance $R_c$ between the object detection device $1c$ and the object 2.

Here, the detection information of the object 2 includes an error depending on the detection accuracy of the radar device or devices other than the object detection devices $1a$, $1b$, or $1c$.

Therefore, the search area width setting unit 91 calculates ranges of the distances $R_a$, $R_b$, and $R_c$ between the object detection devices $1a$, $1b$, and $1c$ and the object 2, respectively, considering the detection accuracy of the radar device or devices other than the object detection devices $1a$, $1b$, or $1c$ from the distances $R_a$, $R_b$, and $R_c$ between the object detection devices $1a$, $1b$, and $1c$ and the object 2, respectively.

In the third embodiment, the detection accuracy of the radar device or other devices is assumed to be known in the search area width setting unit 91.

For example, in the case where the detection accuracy of the position of the object 2 included in the detection information of the radar device or other devices is $\pm R_0$, the search area width setting unit 91 calculates ranges of the distances $R_a$, $R_b$, and $R_c$ between the object detection devices $1a$, $1b$, and $1c$ and the object 2 as $(R_a - R_0)$ to $(R_a + R_0)$, $(R_b - R_0)$ to $(R_b + R_0)$, and $(R_c - R_0)$ to $(R_c + R_0)$, respectively.

Next, the search area width setting unit 91 specifies a distance $R_{min}^a$ which is the shortest distance $R_a$ between the object detection device $1a$ and the object 2 and a distance $R_{max}^a$ which is the longest distance $R_a$ between the object detection device $1a$ and the object 2 within the range $(R_a - R_0)$ to $(R_a + R_0)$ of the distance $R_a$ between the object detection device $1a$ and the object 2.

Then, the search area width setting unit 91 sets $|R_{max}^a - R_{min}^a|$ as the search area width of a range $\Delta R_\beta^a$ of the object detection device $1a$.

Note that the distance $R_{min}^a$ corresponds to the minimum value of the search area of a range of the object detection device $1a$, and the distance $R_{max}^a$ corresponds to the maximum value of the search area of a range of the object detection device $1a$.

Furthermore, the search area width setting unit 91 specifies a distance $R_{min}^b$ which is the shortest distance $R_b$ between the object detection device $1b$ and the object 2 and a distance $R_{max}^b$ which is the longest distance $R_b$ between the object detection device $1b$ and the object 2 within the range $(R_b - R_0)$ to $(R_b + R_0)$ of the distance $R_b$ between the object detection device $1b$ and the object 2.

Then, the search area width setting unit 91 sets $|R_{max}^b - R_{min}^b|$ as the search area width of a range $\Delta R_\beta^b$ of the object detection device $1b$.

Note that the distance $R_{min}^b$ corresponds to the minimum value of the search area of a range of the object detection device $1b$, and the distance $R_{max}^b$ corresponds to the maximum value of the search area of a range of the object detection device $1b$.

Furthermore, the search area width setting unit 91 specifies a distance $R_{min}^c$ which is the shortest distance $R_c$ between the object detection device 1c and the object 2 and a distance $R_{max}^c$ which is the longest distance R, between the object detection device 1c and the object 2 within the range ($R_c - R_0$) to ($R_c + R_0$) of the distance $R_c$ between the object detection device 1c and the object 2.

Then, the search area width setting unit 91 sets $|R_{max}^c - R_{min}^c|$ as the search area width of a range $\Delta R_\beta^c$ of the object detection device 1c.

Note that the distance $R_{min}^c$ corresponds to the minimum value of the search area of a range of the object detection device 1c, and the distance $R_{max}^c$ corresponds to the maximum value of the search area of a range of the object detection device 1c.

When having received the range profile from the reception signal analyzing unit 95a, that is, the range profile calculated from the reception signal which is an output signal of the pulse compressing unit 94 in the object detection device 1a, the synthesis target limiting unit 96a of the signal processing circuit 82 in the object detection device 1a has a range of a plurality of range components included in the range profile be r, and a range component of the range r be $R^a(r)$.

Then, the synthesis target limiting unit 96a calculates power pow($R^a(r)$) for each of the plurality of range components $R^a(r)$ of the range r. Since the processing for calculating the power pow($R^a(r)$) in the range component $R^a(r)$ is a well-known technique, detailed explanation thereof will be omitted.

When having received the range profile from the reception signal analyzing unit 95b, that is, the range profile calculated from the reception signal which is an output signal of the pulse compressing unit 94 in the object detection device 1b, the synthesis target limiting unit 96b of the signal processing circuit 82 in the object detection device 1a has a range of a plurality of range components included in the range profile be r, and a range component of the range r be $R^b(r)$.

Then, the synthesis target limiting unit 96b calculates power pow($R^b(r)$) for each of the plurality of range components $R^b(r)$ of the range r.

When having received the range profile from the reception signal analyzing unit 95c, that is, the range profile calculated from the reception signal which is an output signal of the pulse compressing unit 94 in the object detection device 1c, the synthesis target limiting unit 96c of the signal processing circuit 82 in the object detection device 1a has a range of a plurality of range components included in the range profile be r, and a range component of the range r be $R^c(r)$.

Then, the synthesis target limiting unit 96c calculates power pow($R^c(r)$) for each of the plurality of range components $R^c(r)$ of the range r.

After calculating the power pow($R^a(r)$) of the plurality of range components $R^a(r)$ of the range r, the synthesis target limiting unit 96a then compares each piece of the power pow($R^a(r)$) of the plurality of range components $R^a(r)$ of the range r and a preset threshold value.

Then, the synthesis target limiting unit 96a selects each piece of power pow($R^a(r)$) that is larger than the threshold value from among the power pow($R^a(r)$) of the plurality of range components $R^a(r)$ of the range r.

After selecting each piece of power pow($R^a(r)$) larger than the threshold value, the synthesis target limiting unit 96a outputs a range component $R^a(r)$ each having the selected power pow($R^a(r)$) to the synthesis target selecting unit 97 (step ST26 in FIG. 19).

After calculating the power pow($R^b(r)$) of the plurality of range components $R^b(r)$ of the range r, the synthesis target limiting unit 96b then compares each piece of the power pow($R^b(r)$) of the plurality of range components $R^b(r)$ of the range r and the preset threshold value.

Then, the synthesis target limiting unit 96b selects each piece of power pow($R^b(r)$) that is larger than the threshold value from among the power pow($R^b(r)$) of the plurality of range components $R^b(r)$ of the range r.

After selecting each piece of power pow($R^b(r)$) larger than the threshold value, the synthesis target limiting unit 96b outputs a range component $R^b(r)$ each having the selected power pow($R^b(r)$) to the synthesis target selecting unit 97 (step ST26 in FIG. 19).

After calculating the power pow($R^c(r)$) of the plurality of range components $R^c(r)$ of the range r, the synthesis target limiting unit 96c then compares each piece of the power pow($R^c(r)$) of the plurality of range components $R^c(r)$ of the range r and the preset threshold value.

Then, the synthesis target limiting unit 96c selects each piece of power pow($R^c(r)$) that is larger than the threshold value from among the power pow($R^c(r)$) of the plurality of range components $R^c(r)$ of the range r.

After selecting each piece of power pow($R^c(r)$) larger than the threshold value, the synthesis target limiting unit 96c outputs range components $R^c(r)$ each having the selected power pow($R^c(r)$) to the synthesis target selecting unit 97 (step ST26 in FIG. 19).

Here, although the synthesis target limiting units 96a, 96b, and 96c compare the power of the plurality of range components of the range r with the threshold value, the amplitudes of the plurality of range components of the range r may be compared to a threshold value.

The synthesis target selecting unit 97 of the signal processing circuit 82 of the object detection device 1a determines a search area of a range having the search area width set by the search area width setting unit 91 when the detection information of the object 2 is obtained or determines a search area of a range having the search area width set by the search area width setting unit 92 when the detection information of the object 2 cannot be obtained.

After determining the search areas of a range, the synthesis target selecting unit 97 selects a relatively large range component from among range components a range of which is included in the search area out of the range components $R^a(r)$, $R^b(r)$, and $R^c(r)$ selected by the synthesis target limiting units 96a, 96b, and 96c, respectively (step ST27 in FIG. 19).

Hereinafter, the selection processing of range components by the synthesis target selecting unit 97 will be specifically described.

First, the determination processing of a search area by the synthesis target selecting unit 97 when the detection information of the object 2 cannot be obtained will be described.

In the case where the detection information of the object 2 is not obtained, the synthesis target selecting unit 97 of the signal processing circuit 82 in the object detection device 1a determines search areas of a range having the search area widths $|L_{max}^a - L_{min}^a|$, $|L_{max}^b - L_{min}^b|$, and $|L_{max}^c - L_{min}^c|$ set by the search area width setting unit 92.

That is, the synthesis target selecting unit 97 determines the minimum value of the search area of a range as $L_{min}^a$ and the maximum value of the search area of a range as $L_{max}^a$ as the search area of a range of the object detection device 1a as expressed in the following inequality (49).

$$L_{min}^{a} \leq r \leq L_{max}^{a} \quad (49)$$

Moreover, the synthesis target selecting unit 97 determines the minimum value of the search area of a range as $L_{min}^{b}$ and the maximum value of the search area of a range as $L_{max}^{b}$ as the search area of a range of the object detection device 1b as expressed in the following inequality (50).

$$L_{min}^{b} \leq r \leq L_{max}^{b} \quad (50)$$

The synthesis target selecting unit 97 also determines the minimum value of the search area of a range as $L_{min}^{c}$ and the maximum value of the search area of a range as $L_{max}^{c}$ as the search area of a range of the object detection device 1c as expressed in the following inequality (51).

$$L_{min}^{c} \leq r \leq L_{max}^{c} \quad (51)$$

Next, the determination processing of a search area by the synthesis target selecting unit 97 when the detection information of the object 2 can be obtained will be described.

In the case where the detection information of the object 2 is obtained, the synthesis target selecting unit 97 determines search areas of a range having the search area widths $|R_{max}^{a} - R_{min}^{a}|$, $|R_{max}^{b} - R_{min}^{b}|$, and $|R_{max}^{c} - R_{min}^{c}|$ set by the search area width setting unit 91.

That is, the synthesis target selecting unit 97 determines the minimum value of the search area of a range as $R_{min}^{a}$ and the maximum value of the search area of a range as $R_{max}^{a}$ as the search area of a range of the object detection device 1a as expressed in the following inequality (52).

$$R_{min}^{a} \leq r \leq R_{max}^{a} \quad (52)$$

Moreover, the synthesis target selecting unit 97 determines the minimum value of the search area of a range as $R_{min}^{b}$ and the maximum value of the search area of a range as $R_{max}^{b}$ as the search area of a range of the object detection device 1b as expressed in the following inequality (53).

$$R_{min}^{b} \leq r \leq R_{max}^{b} \quad (53)$$

The synthesis target selecting unit 97 also determines the minimum value of the search area of a range as $R_{min}^{c}$ and the maximum value of the search area of a range as $R_{max}^{c}$ as the search area of a range of the object detection device 1c as expressed in the following inequality (54).

$$R_{min}^{c} \leq r \leq R_{max}^{c} \quad (54)$$

Next, selection processing of a range component by the synthesis target selecting unit 97 will be described.

After determining the search areas of ranges for the object detection devices 1a, 1b, and 1c, the synthesis target selecting unit 97 selects a range component $R^{a}(r)$ a range r of which is included in the search area of the object detection device 1a from among the one or more range components $R^{a}(r)$ selected by the synthesis target limiting unit 96a.

After selecting the one or more range components $R^{a}(r)$ a range r of which is included in the search area, the synthesis target selecting unit 97 calculates power $pow(R^{a}(r))$ of each of the one or more range components $R^{a}(r)$.

Furthermore, the synthesis target selecting unit 97 also selects a range component $R^{b}(r)$ a range r of which is included in the search area of the object detection device 1b from among the one or more range components $R^{b}(r)$ selected by the synthesis target limiting unit 96b.

After selecting the one or more range components $R^{b}(r)$ a range r of which is included in the search area, the synthesis target selecting unit 97 calculates power $pow(R^{b}(r))$ of each of the one or more range components $R^{b}(r)$.

Furthermore, the synthesis target selecting unit 97 also selects a range component $R^{c}(r)$ a range r of which is included in the search area of the object detection device 1c from among the one or more range components $R^{c}(r)$ selected by the synthesis target limiting unit 96c.

After selecting the one or more range components $R^{c}(r)$ a range r of which is included in the search area, the synthesis target selecting unit 97 calculates power $pow(R^{c}(r))$ of each of the one or more range components $R^{c}(r)$.

After calculating power $pow(R^{a}(r))$ of each of the one or more range components $R^{a}(r)$ a range r of which is included in the search area of the object detection device 1a, the synthesis target selecting unit 97 specifies the maximum power $max(pow(R^{a}(r)))$ out of those pieces of power $pow(R^{a}(r))$.

Then, the synthesis target selecting unit 97, assuming a range r of the specified maximum power $max(pow(R^{a}(r)))$ as $r^{a}_{sel}$, extracts an amplitude $a^{a}=abs(R^{a}(r^{a}_{sel}))$ of the range component $R^{a}(r)$ of the range $r^{a}_{sel}$ as well as a phase $\varphi^{a}=arg(R^{a}(r^{a}_{sel}))$ of the range $r^{a}_{sel}$.

After extracting the amplitude $a^{a}$ and the phase $\varphi^{a}$ of the range component $R^{a}(r)$ of the range $r^{a}_{sel}$, the synthesis target selecting unit 97 outputs the amplitude $a^{a}$ and the phase $\varphi^{a}$ to the coefficient determining unit 99 of the synthesizing unit 98.

In addition, the synthesis target selecting unit 97 outputs the range component $R^{a}(r^{a}_{sel})$ of the range rail to the synthesis processing unit 100 of the synthesizing unit 98.

After calculating power $pow(R^{b}(r))$ of each of the one or more range components $R^{b}(r)$ a range r of which is included in the search area of the object detection device 1b, the synthesis target selecting unit 97 specifies the maximum power $max(pow(R^{b}(r)))$ out of those pieces of power $pow(R^{b}(r))$.

Then, the synthesis target selecting unit 97, assuming a range r of the specified maximum power $max(pow(R^{b}(r)))$ as $r^{b}_{sel}$, extracts an amplitude $a^{b}=abs(R^{b}(r^{b}_{sel}))$ of the range component $R^{b}(r)$ of the range $r^{b}_{sel}$ as well as a phase $\varphi^{b}=arg(R^{b}(r^{b}_{sel}))$ of the range $r^{b}_{sel}$.

After extracting the amplitude $a^{b}$ and the phase $\varphi^{b}$ of the range component $R^{b}(r)$ of the range $r^{b}_{sel}$, the synthesis target selecting unit 97 outputs the amplitude $a^{b}$ and the phase $\varphi^{b}$ to the coefficient determining unit 99 of the synthesizing unit 98.

In addition, the synthesis target selecting unit 97 outputs the range component $R^{b}(r^{b}_{sel})$ of the range $r^{b}_{sel}$ to the synthesis processing unit 100 of the synthesizing unit 98.

After calculating power $pow(R^{c}(r))$ of each of the one or more range components $R^{c}(r)$ a range r of which is included in the search area of the object detection device 1c, the synthesis target selecting unit 97 specifies the maximum power $max(pow(R^{c}(r)))$ out of those pieces of power $pow(R^{c}(r))$.

Then, the synthesis target selecting unit 97, assuming a range r of the specified maximum power $max(pow(R^{c}(r)))$ as $r^{c}_{sel}$, extracts an amplitude $a^{c}=abs(R(r^{c}_{sel}))$ of the range component $R^{c}(r)$ of the range $r^{c}_{sel}$ as well as a phase $\varphi^{c}=arg(R^{c}(r^{c}_{sel}))$ of the range $r^{c}_{sel}$.

After extracting the amplitude $a^{c}$ and the phase $\varphi^{c}$ of the range component $R^{c}(r)$ of the range $r^{c}_{sel}$, the synthesis target selecting unit 97 outputs the amplitude $a^{c}$ and the phase $\varphi^{c}$ to the coefficient determining unit 99 of the synthesizing unit 98.

In addition, the synthesis target selecting unit 97 outputs the range component $R^{c}(r^{c}_{sel})$ of the range $r^{c}_{sel}$ to the synthesis processing unit 100 of the synthesizing unit 98.

When receiving the amplitude and the phase of two or more range components out of the amplitude $a^{a}$ and the phase $\varphi^{a}$ of the range component $R^{a}(r)$, the amplitude $a^{b}$ and the phase $\varphi^b$ of the range component $R^b(r)$, and the amplitude $a^c$ and the phase $\varphi^c$ of the range component $R^c(r)$ from the synthesis target selecting unit 97 (step ST28 in FIG. 19: greater than or equal to two), the coefficient determining unit 99 of the signal processing circuit 82 in the object detection device 1a determines weighting coefficients $w^a$, $w^b$, and $w^c$ for combining the range components $R^a(r^a_{sel})$, $R^b(r^b_{sel})$ and, $R^c(r^c_{sel})$) output from the synthesis target selecting unit 97 as expressed in the following equations (55) to (57) (step ST29 in FIG. 19).

$$w^a = \frac{a^a}{\sqrt{(a^a)^2 + (a^b)^2 + (a^c)^2}} e^{-j\varnothing^a} \quad (55)$$

$$w^b = \frac{a^b}{\sqrt{(a^a)^2 + (a^b)^2 + (a^c)^2}} e^{-j\varnothing^b} \quad (56)$$

$$w^c = \frac{a^c}{\sqrt{(a^a)^2 + (a^b)^2 + (a^c)^2}} e^{-j\varnothing^c} \quad (57)$$

In the case where the number of amplitudes or phases of range components output from the synthesis target selecting unit 97 out of the amplitude $a^a$ and the phase $\varphi^a$ of the range component $R^a(r)$, the amplitude $a^b$ and the phase $\varphi^b$ of the range component $R^b(r)$, and the amplitude $a^c$ and the phase $\varphi^c$ of the range component $R^c(r)$ is one or zero (step ST28 in FIG. 19: one or zero), the coefficient determining unit 99 does not perform processing for determining weighting coefficients $w^a$, $w^b$, or $w^c$.

When the coefficient determining unit 99 determines the weighting coefficients $w^a$, $w^b$, and $w^c$, the synthesis processing unit 100 of the signal processing circuit 82 in the object detection device 1a combines the range components $R^a(r^a_{sel})$, $R^b(r^b_{sel})$, and $R^c(r^c_{sel})$ output from the synthesis target selecting unit 97 using the weighting coefficients $w^a$, $w^b$, and $w^c$ as expressed in the following equation (58) (step ST30 in FIG. 19).

$$y(t) = w^a R^a(r^a_{sel}) + w^b R^b(r^b_{sel}) + w^c R^c(r^c_{sel}) \quad (58)$$

The synthesis processing unit 100 outputs the synthesized signal y(t) to the object detecting unit 101.

Note that, since the weighting coefficients $w^a$, $w^b$, and $w^c$ determined by the coefficient determining unit 99 are weightings for maximum ratio combining, the signal power-to-noise power ratio is increased by the synthesis processing of the equation (58).

In the case where the number of amplitudes or phases of range components output from the synthesis target selecting unit 97 out of the amplitude $a^a$ and the phase $\varphi^a$ of the range component $R^a(r)$, the amplitude $a^b$ and the phase $\varphi^b$ of the range component $R^b(r)$, and the amplitude $a^c$ and the phase q C of the range component $R^c(r)$ is one (step ST28 in FIG. 19: one), the synthesis processing unit 100 outputs the range component output from the synthesis target selecting unit 97, to the object detecting unit 101 as a synthesized signal y (t).

For example, in a case where a range component output from the synthesis target selecting unit 97 is a range component $R^a(r^a_{sel})$, the synthesis processing unit 100 outputs the range component $R^a(r^a_{sel})$ to the object detecting unit 101 as the synthesized signal y(t).

For example, in a case where a range component output from the synthesis target selecting unit 97 is a range component $R^b(r^b_{sel})$, the synthesis processing unit 100 outputs the range component $R^b(r^b_{sel})$ to the object detecting unit 101 as the synthesized signal y(t).

For example, in a case where a range component output from the synthesis target selecting unit 97 is a range component $R^c(r^c_{sel})$, the synthesis processing unit 100 outputs the range component $R^c(r^c_{sel})$ to the object detecting unit 101 as the synthesized signal y(t).

When having received the synthesized signal y(t) from the synthesis processing unit 100, the object detecting unit 101 of the signal processing circuit 82 in the object detection device 1a detects the object 2 by performing the CFAR processing on the synthesized signal y(t) (step ST31 in FIG. 19).

That is, if range components of a plurality of ranges included in the range profile of the synthesized signal y(t) include a range component larger than or equal to the CFAR threshold value externally provided thereto, the object detecting unit 101 determines that the object 2 to be detected is present.

If the range components of the plurality of ranges included in the range profile do not include a range component larger than or equal to the CFAR threshold value, the object detecting unit 101 determines that the object 2 to be detected is not present.

When it is determined that the object 2 to be detected is present, the object detecting unit 101 outputs the range of the range component larger than or equal to the CFAR threshold value to the operation unit 102.

When having received the range from the object detecting unit 101, the operation unit 102 of the signal processing circuit 82 in the object detection device 1a sets the range as the distance $R_a$ from the object detection device 1a to the object 2 (step ST32 in FIG. 19).

The operation unit 102 outputs the distance $R_a$ from the object detection device 1a to the object 2 to the detected object information displaying device 25 and the object monitoring unit 3.

When having received the distance $R_a$ from the object detection device 1a to the object 2 from the operation unit 102, the detected object information displaying device 25 connected to the object detection device 1a displays the distance $R_a$ on a display.

When having received the distance $R_a$ from the object detection device 1a to the object 2 from the operation unit 102, the object monitoring unit 3 connected to the object detection device 1a performs monitoring processing of the object 2 using the distance $R_a$.

The monitoring processing of the object 2 by the object monitoring unit 3 includes monitoring the change in position of the object 2 while recording the distance $R_a$ to the object 2 detected by the object detection device 1a as well as prediction processing for predicting the future position of the object 2.

As is clear from the above description, according to the third embodiment, the search area width setting unit 91 for setting a search area width having a range corresponding to a range component of the object 2 by using the detection information of the object 2 is included, and the signal component selecting unit 93 determines a search area having the search area width set by the search area width setting unit 91 and selects a range component a range of which is included in the search area from each of the signal received by the signal receiving unit 14 and signals received by the object detection devices 1b and 1c. Therefore, an increase in the probability of false detection of the object 2 can be suppressed even in a case where the reception signals have low signal power-to-noise power ratios.

That is, according to the third embodiment, since the detection information of the object 2 is used when the search area width setting unit 91 sets the search area width of a range, the search area width of a frequency becomes narrower than the search area width set by the search area width setting unit 92, thereby enabling the search area width of a range to be strictly set. Therefore, since the signal component selecting unit 93 can determine a more appropriate search area of a range, an increase in the probability of false detection of the object 2 can be suppressed even in a case where a reception signal has a low signal power-to-noise power ratio.

Moreover, according to the third embodiment, the signal component selecting unit 93 determines a search area having the search area width set by the search area width setting unit 91 when the detection information of the object 2 is obtained or determines a search area having the search area width set by the search area width setting unit 92 when the detection information of the object 2 cannot be obtained, so even in a situation where the detection information of the object 2 cannot be obtained, the detection probability of the object 2 can be enhanced.

Fourth Embodiment

In the first and second embodiments, the example in which the search area width setting unit 31 sets a search area width of a frequency corresponding to the spectral component of the object 2 using the detection information of the object 2 output from the demultiplexer 24 has been described.

In a fourth embodiment, an example in which a search area width setting unit 130 sets a search area width of a frequency corresponding to a spectral component of an object 2 using detection information of the object 2 output from an object monitoring unit 3 will be described.

Figure 21:
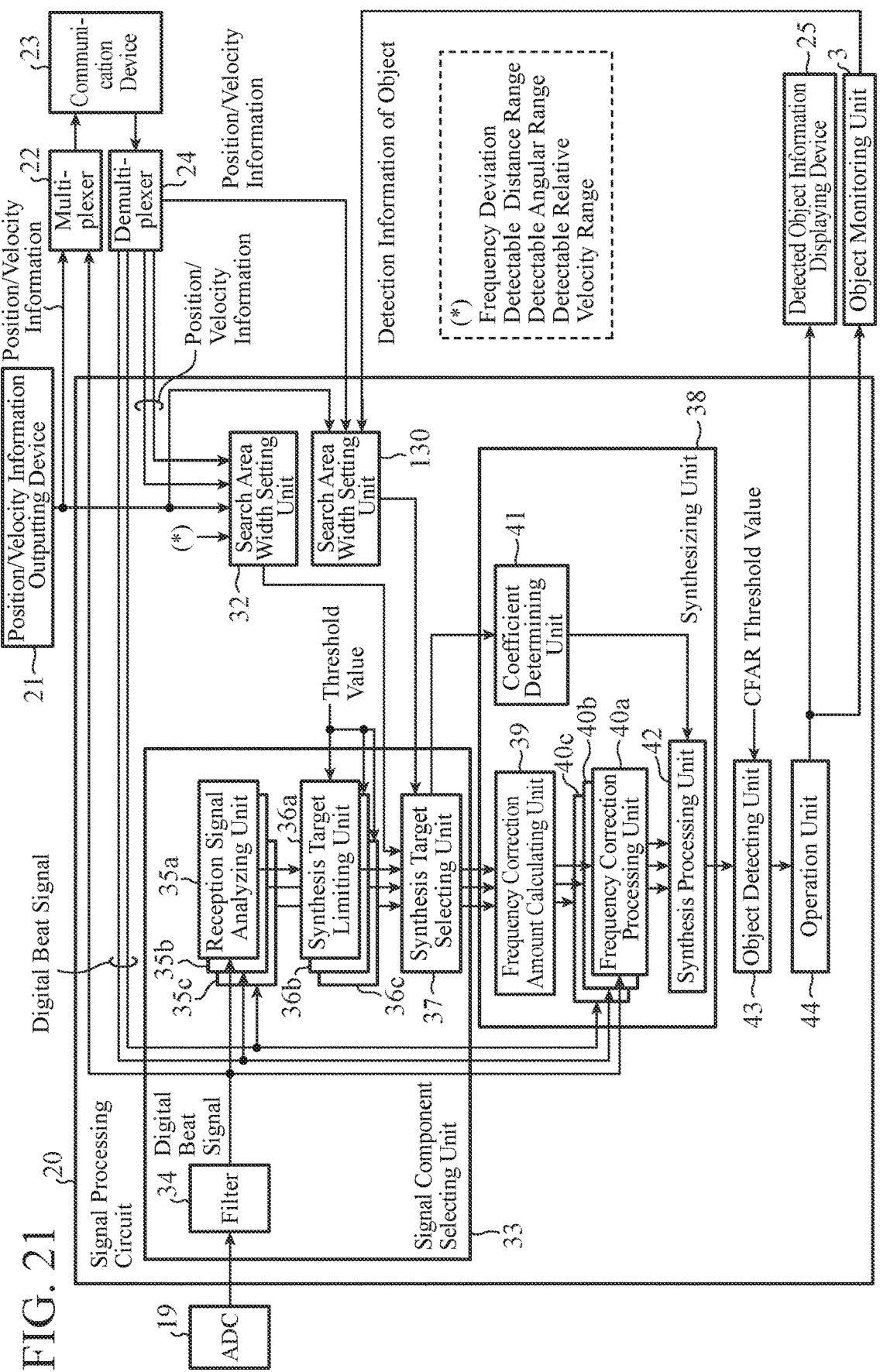
FIG. 21 is a hardware configuration diagram of a signal processing circuit 20 of an object detection device 1a according to a fourth embodiment of the invention.

FIG. 21 is a configuration diagram illustrating a signal processing circuit 20 of an object detection device 1a according to the fourth embodiment of the present invention. In FIG. 21, the same symbol as that in FIG. 5 or 13 represents the same or a corresponding part and thus descriptions thereon are omitted.

The search area width setting unit 130 is implemented by a search area width setting circuit 51 illustrated in FIG. 6, for example.

The search area width setting unit 130 is a first search area width setting unit for setting a search area width of a frequency corresponding to the spectral component (signal component) of the object 2 using the detection information of the object 2 output from the object monitoring unit 3.

That is, the search area width setting unit 130 obtains the distances between the object detection device 1a and the object detection devices 1b and 1c from the position of the object detection device 1a indicated by the position/velocity information output from the position/velocity information outputting device 21 and the position of the object detection devices 1b and 1c indicated by the position/velocity information output from the demultiplexer 24.

Then, the search area width setting unit 130 sets the search area width of a frequency of the object detection devices 1a, 1b, and 1c using the distances between the object detection device 1a and the object detection devices 1b and 1c, the velocity of the object detection device 1a indicated by the position/velocity information output from the position/velocity information outputting device 21, the velocities of the object detection devices 1b and 1c indicated by the position/velocity information output from the demultiplexer 24, and the position and velocity of the object 2 indicated by the detection information of the object 2 output from the object monitoring unit 3.

Although the configuration of the signal processing circuit 20 of the object detection device 1a will be described below, it is assumed that configuration diagrams of the signal processing circuits 20 of the object detection devices 1b and 1c, which are the other object detection devices, are those illustrated in FIG. 21 like the object detection device 1a.

In FIG. 21, the example in which the search area width setting unit 130 is applied to the signal processing circuit 20 in FIG. 5 is illustrated, however, the search area width setting unit 130 may be applied to the signal processing circuit 20 in FIG. 13.

Next, the operation will be described.

When having received the distance $R_a$ from the object detection device 1a to the object 2 and the relative velocity $v_r$ between the object detection device 1a and the object 2 from the operation unit 44 of the object detection device 1a, the object monitoring unit 3 connected to the object detection device 1a performs monitoring processing of the object 2 using the distance $R_a$ and the relative velocity $v_r$.

The monitoring processing of the object 2 by the object monitoring unit 3 includes monitoring the change in the position or velocity of the object 2 while recording the distance $R_a$ to the object 2 detected by the object detection device 1a or the relative velocity $v_r$, as well as prediction processing for predicting the future position and velocity of the object 2.

The object monitoring unit 3 connected to the object detection device 1a outputs detection information of the object 2 indicating the position and velocity of the object 2 to the search area width setting unit 130.

When the object monitoring unit 3 connected to the object detection device 1a can monitor detection information of the object 2, the search area width setting unit 130 of the signal processing circuit 20 in the object detection device 1a acquires the detection information of the object 2 when the detection information of the object 2 is output from the object monitoring unit 3.

When acquiring the detection information of the object 2, the search area width setting unit 130 sets the search area widths of a frequency of the object detection devices 1a, 1b, and 1c by using the detection information of the object 2.

If no detection information of the object 2 is output from the object monitoring unit 3, the search area width setting unit 130 does not perform the processing for setting the search area width of a frequency.

The setting processing of the search area width of a frequency in the search area width setting unit 130 is similar to that of the search area width setting unit 31 in the first and second embodiments, therefore detailed description thereof will be omitted.

The processing other than that of the search area width setting unit 130 is similar to that of the first and second embodiments.

As is clear from the above description, according to the fourth embodiment, the search area width setting unit 130 for setting a search area width having a frequency corresponding to a spectral component of the object 2 by using the detection information of the object 2 is included, and the signal component selecting unit 33 determines a search area having the search area width set by the search area width setting unit 130 and selects a spectral component a frequency of which is included in the search area from each of the signal received by the signal receiving unit 14 and signals received by the object detection devices 1b and 1c.

Therefore, an increase in the probability of false detection of the object 2 can be suppressed even in a case where the reception signals have low signal power-to-noise power ratios.

That is, according to the fourth embodiment, since the detection information of the object 2 is used when the search area width setting unit 130 sets the search area width of a frequency, the search area width of a frequency becomes narrower than the search area width set by the search area width setting unit 32, thereby enabling the search area width of a frequency to be strictly set. Therefore, since the signal component selecting unit 33 can determine a more appropriate search area having a frequency, an increase in the probability of false detection of the object 2 can be suppressed even in a case where a reception signal has a low signal power-to-noise power ratio.

Fifth Embodiment

In the third embodiment, the example in which the search area width setting unit 91 sets a search area width of a range corresponding to the range component of the object 2 using the detection information of the object 2 output from a demultiplexer 24 has been described.

In a fifth embodiment, an example in which a search area width setting unit 140 sets a search area width of a range corresponding to a range component of an object 2 using detection information of the object 2 output from an object monitoring unit 3 will be described.

Figure 22:
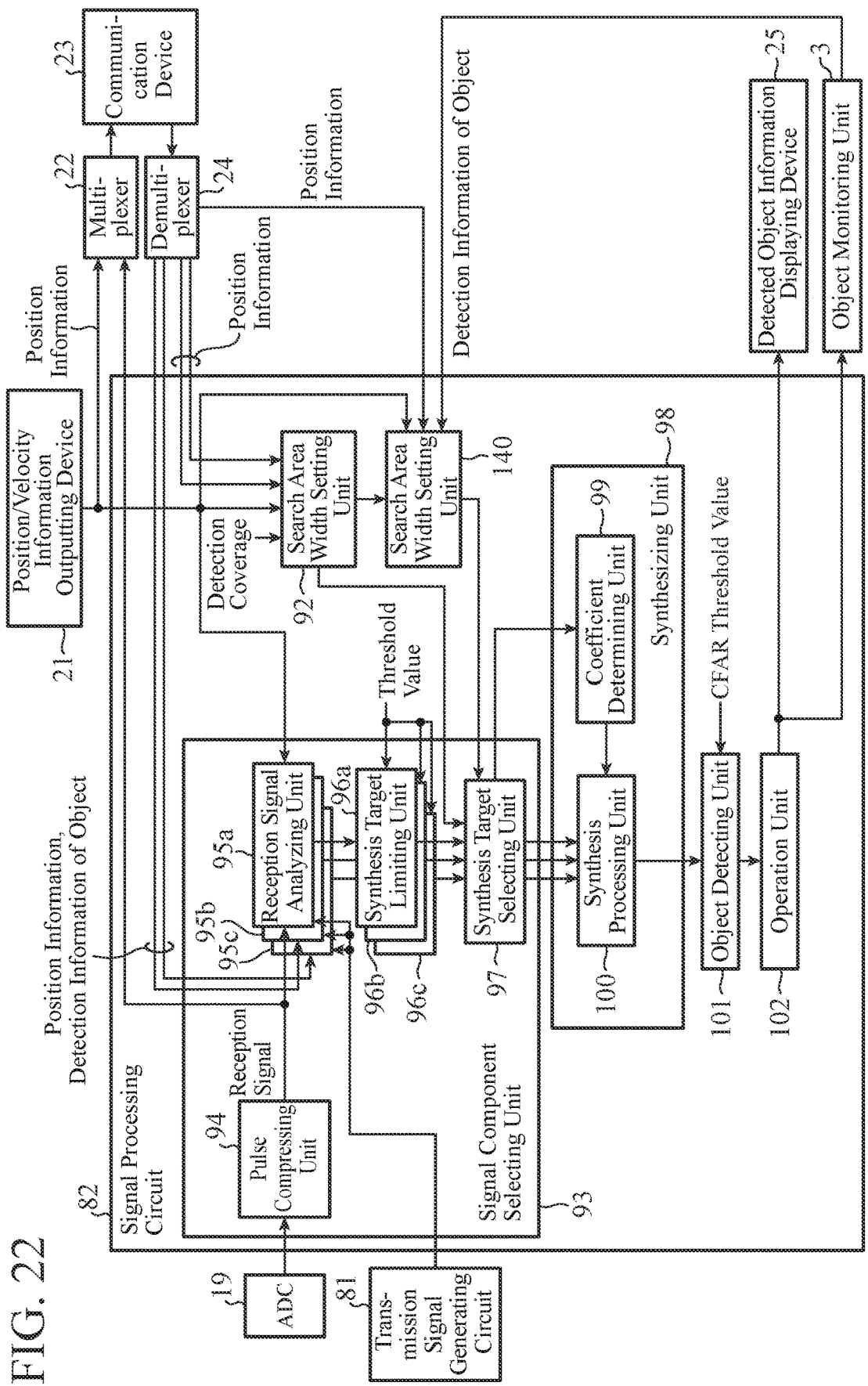
FIG. 22 is a configuration diagram illustrating a signal processing circuit 82 of an object detection device 1a according to a fifth embodiment of the invention.

FIG. 22 is a configuration diagram illustrating a signal processing circuit 82 of the object detection device 1a according to the fifth embodiment of the present invention. In FIG. 22, the same symbol as that in FIG. 17 represents the same or a corresponding part and thus descriptions thereon are omitted.

The search area width setting unit 140 is implemented by a search area width setting circuit 111 illustrated in FIG. 18, for example.

The search area width setting unit 140 is a first search area width setting unit for setting a search area width of a range corresponding to a range component (signal component) of the object 2 using detection information of the object 2 output from the object monitoring unit 3.

That is, the search area width setting unit 140 sets the search area width of a range corresponding to a range component of the object 2 using the position of the object detection device 1a indicated by position information output from the position/velocity information outputting device 21, the positions of the object detection devices 1b and 1c indicated by position information output from a demultiplexer 24, and the position of the object 2 indicated by the detection information of the object 2 output from the object monitoring unit 3.

Although the configuration of the signal processing circuit 82 of the object detection device 1a will be described below, it is assumed that configuration diagrams of the signal processing circuits 80 of the object detection devices 1b and 1c, which are the other object detection devices, are those illustrated in FIG. 22 like the object detection device 1a.

Next, the operation will be described.

When having received the distance $R_a$ from the object detection device 1a to the object 2 from the operation unit 102 of the object detection device 1a, the object monitoring unit 3 connected to the object detection device 1a performs monitoring processing of the object 2 using the distance $R_a$.

The monitoring processing of the object 2 by the object monitoring unit 3 includes monitoring the position of the object 2 while recording the distance $R_a$ to the object 2 detected by the object detection device 1a as well as prediction processing for predicting the future position of the object 2.

The object monitoring unit 3 connected to the object detection device 1a outputs the detection information of the object 2 indicating the position of the object 2 to the search area width setting unit 140.

When the object monitoring unit 3 connected to the object detection device 1a can monitor detection information of the object 2, the search area width setting unit 140 of the signal processing circuit 82 in the object detection device 1a acquires the detection information of the object 2 when the detection information of the object 2 is output from the object monitoring unit 3.

When acquiring the detection information of the object 2, the search area width setting unit 140 sets the search area widths of a range of the object detection devices 1a, 1b, and 1c by using the detection information of the object 2.

If no detection information of the object 2 is output from the object monitoring unit 3, the search area width setting unit 140 does not perform the processing for setting the search area width of a range.

The setting processing of the search area width of a range in the search area width setting unit 140 is similar to that of the search area width setting unit 91 in the third embodiment, and thus detailed description thereof will be omitted.

The processing other than that of the search area width setting unit 140 is similar to that of the third embodiment.

As is clear from the above description, according to the fifth embodiment, the search area width setting unit 140 for setting a search area width having a range corresponding to a range component of the object 2 by using the detection information of the object 2 is included, and the signal component selecting unit 93 determines a search area having the search area width set by the search area width setting unit 140 and selects a range component a range of which is included in the search area from each of the signal received by the signal receiving unit 14 and signals received by the object detection devices 1b and 1c. Therefore, an increase in the probability of false detection of the object 2 can be suppressed even in a case where the reception signals have low signal power-to-noise power ratios.

That is, according to the fifth embodiment, since the detection information of the object 2 is used when the search area width setting unit 140 sets the search area width of a range, the search area width of a frequency becomes narrower than the search area width set by the search area width setting unit 92, thereby enabling the search area width of a range to be strictly set. Therefore, since the signal component selecting unit 93 can determine a more appropriate search area of a range, an increase in the probability of false detection of the object 2 can be suppressed even in a case where a reception signal has a low signal power-to-noise power ratio.

INDUSTRIAL APPLICABILITY

The present invention is suitable for an object detection device, an object detection method, and a sensor device for detecting an object present in a space.

REFERENCE SIGNS LIST

1a, 1b, 1c: Object detection device, 2: Object to be detected, 3: Object monitoring unit, 11: Transmission signal generating circuit, 12: Transmission high-frequency circuit, 13: Transmission antenna, 14: Signal receiving unit, 15: Reception antenna, 16: Reception high-frequency circuit, 17: Beat signal extracting circuit, 18: Reception signal processing unit, 19: ADC, 20: Signal processing circuit, 21: Position/velocity information outputting device, 22: Multiplexer, 23: Communication device, 24: Demultiplexer, 25: Detected object information displaying device, 31: Search area width setting unit (first search area width setting unit), 32: Search area width setting unit (second search area width setting unit), 33: Signal component selecting unit, 34: Filter, 35*a*, 35*b*, 35*c*: Reception signal analyzing unit, 36*a*, 36*b*, 36*c*: Synthesis target limiting unit, 37: Synthesis target selecting unit, 38: Synthesizing unit, 39: Frequency correction amount calculating unit, 40*a*, 40*b*, 40*c*: Frequency correction processing unit, 41: Coefficient determining unit, 42: Synthesis processing unit, 43: Object detecting unit, 44: Operation unit, 45: Sample data thinning unit, 51, 52: Search area width setting circuit, 53: Filter circuit, 54: Reception signal analyzing circuit, 55: Synthesis target limiting circuit, 56: Synthesis target selecting circuit, 57: Frequency correction amount calculating circuit, 58: Frequency correction processing circuit, 59: Coefficient determining circuit, 60: Synthesizing circuit, 61: Object detecting circuit, 62: Operation circuit, 63: Sample data thinning circuit, 71: Memory, 72: Processor, 81: Transmission signal generating circuit, 82: Signal processing circuit, 91: Search area width setting unit (first search area width setting unit), 92: Search area width setting unit (second search area width setting unit), 93: Signal component selecting unit, 94: Pulse compressing unit, 95*a*, 95*b*, 95*c*: Reception signal analyzing unit, 96*a*, 96*b*, 96*c*: Synthesis target limiting unit, 97: Synthesis target selecting unit, 98: Synthesizing unit, 99: Coefficient determining unit, 100: Synthesis processing unit, 101: Object detecting unit, 102: Operation unit, 111, 112: Search area width setting circuit, 113: Pulse compressing circuit, 114: Reception signal analyzing circuit, 115: Synthesis target limiting circuit, 116: Synthesis target selecting circuit, 117: Coefficient determining circuit, 118: Synthesizing circuit, 119: Object detecting circuit, 120: Operation circuit, 130, 140: Search area width setting unit (first search area width setting unit).

The invention claimed is:

1. An object detection device comprising:
a processor; and
a memory that stores instructions, when executed by the processor, causing the processor to perform a process to:
(a) receive a signal reflected by an object to be detected;
(b) calculate a minimum value and a maximum value of a frequency or a range that is a signal component of the object by using detection information of a position of the object, a velocity of the object, and an angle indicating a moving direction of the object and an error included in the detection information and set a difference between the minimum value and the maximum value as a search area width of the frequency or the range corresponding to the signal component of the object;
(c) determine a search area having the search area width set by the process (b) and select the signal component of the frequency or the range of which is included in the search area from each of the signal received by the process (a) and a signal received by another object detection device executing the process (a);
(d) perform processing for combining one or more signal components selected by the process (c) or perform processing for combining the signal received by the process (a) and the signal received by the other object detection device by using one or more signal components selected by the process (c) ; and
(e) detect the object from the one or more signal components combined by the process (d) or the signals combined by the process (d).

2. The object detection device according to claim 1, further comprising the process to:
(f) the search area width of the frequency corresponding to the signal component of the object by using position/ velocity information indicating positions and velocities of a plurality of object detection devices,
wherein the process (c):
determines the search area having the search area width of the frequency set by the process (b) in a case where the detection information is obtained, and in a case where the detection information is not obtained, determines the search area having the search area width of the frequency set by the process (f); and
selects the signal component the frequency of which is included in the determined search area from each of the signal received by the process (a) and the signal received by the other object detection device.

3. The object detection device according to claim 1,
wherein the process (b)sets the search area width of the frequency corresponding to a spectral component that is the signal component of the object by using the detection information and the error included in the detection information,
the process (c) analyzes each of a spectrum of a beat signal corresponding to the signal received by the process (a) and a spectrum of a beat signal corresponding to the signal received by the other object detection device, determines the search area having the search area width set by the process (b), and selects the spectral component the frequency of which is included in the search area from each of the plurality of spectra having been separately analyzed,
the process (d) corrects each of the frequency of the beat signal corresponding to the signal received by the process (a) and the frequency of the beat signal corresponding to the signal received by the other object detection device by using the frequency of one or more spectral components selected by the process (c) and combines the plurality of beat signals frequencies of which have been separately corrected, and
the process (e) detects the object from the plurality of beat signals combined by the process (d).

4. The object detection device according to claim 1, further comprising the process to:
(f) set the search area width of the range corresponding to the signal component of the object by using position information indicating positions of a plurality of object detection devices and detection coverages of the plurality of object detection devices,
wherein the process (c):
determines the search area having the search area width of the range set by the process (b) in a case where the detection information is obtained, and determines the search area having the search area width of the range set by the process (f) in a case where the detection information is not obtained; and selects a range component the range of which is included in the determined search area from each of the signal received by the process (a) and the signal received by the other object detection device.

5. The object detection device according to claim 1, wherein the process (b) sets the search area width of the range corresponding to the range component which is the signal component of the object by using the detection information and the error included in the detection information, the process (c) calculates a range profile that is a signal power system in a range direction from the signal received by the process (a), calculates the range profile from the signal received by the other object detection device, determines the search area having the search area width set by the process (b), and selects the range component the range of which is included in the search area from each of the plurality of range profiles having been separately calculated, the process (d) combines one or more range components selected by the process (c), and the process (e) detects the object from the one or more range components combined by the process (d).

6. An object detection method comprising:

receiving, by a signal receiving unit, a signal reflected by an object to be detected;

calculating, by a first search area width setting unit, a minimum value and a maximum value of a frequency or a range that is a signal component of the object by using detection information of a position of the object, a velocity of the object, and an angle indicating a moving direction of the object and an error included in the detection information and setting a difference between the minimum value and the maximum value as a search area width of the frequency or the range corresponding to the signal component of the object;

determining, by a signal component selecting unit, a search area having the search area width set by the first search area width setting unit and selecting the signal component of the frequency or the range of which is included in the search area from each of the signal received by the signal receiving unit and a signal received by another object detection device;

performing, by a synthesizing unit, processing for combining one or more signal components selected by the signal component selecting unit or performing, by the synthesizing unit, processing for combining the signal received by the signal receiving unit and the signal received by the other object detection device by using one or more signal components selected by the signal component selecting unit; and detecting, by an object detecting unit, the object from the one or more signal components combined by the synthesizing unit or the signals combined by the synthesizing unit.

7. A sensor device comprising:

a processor; and a memory that stores instructions, when executed by the processor, causing the processor to perform a process to:

(a) receive a signal reflected by an object to be detected;

(b) calculate a minimum value and a maximum value of a frequency or a range that is a signal component of the object by using detection information of a position of the object, a velocity of the object, and an angle indicating a moving direction of the object and an error included in the detection information and set a difference between the minimum value and the maximum value as a search area width of the frequency or the range corresponding to the signal component of the object;

(c) determine a search area having the search area width set by the process (b) and select the signal component of the frequency or the range of which is included in the search area from each of the signal received by the process (a) and a signal received by another object detection device;

(d) perform processing for combining one or more signal components selected by the process (c) or perform processing for combining the signal received by the process (a) and the signal received by the other object detection device by using one or more signal components selected by the process (c);

(e) detect the object from the one or more signal components combined by the process (d) or the signals combined by the process (d); and (f) monitor the object detected by the process (e).

* * * * *